United States Patent
Ionel

(10) Patent No.: US 7,932,658 B2
(45) Date of Patent: Apr. 26, 2011

(54) INTERIOR PERMANENT MAGNET MOTOR INCLUDING ROTOR WITH FLUX BARRIERS

(75) Inventor: Dan M. Ionel, Fox Point, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 120 days.

(21) Appl. No.: 12/050,087

(22) Filed: Mar. 17, 2008

(65) Prior Publication Data

US 2008/0224558 A1 Sep. 18, 2008

Related U.S. Application Data

(60) Provisional application No. 60/895,075, filed on Mar. 15, 2007.

(51) Int. Cl.
*H02K 21/12* (2006.01)

(52) U.S. Cl. ......... 310/156.52; 310/156.33; 310/156.37; 310/156.51; 310/156.53; 310/156.59; 310/156.65

(58) Field of Classification Search ............ 310/156.38–156.49, 156.51–156.65
See application file for complete search history.

(56) References Cited

U.S. PATENT DOCUMENTS

| | | | |
|---|---|---|---|
| 2,643,350 A | 6/1953 | Merrill | |
| 2,927,229 A | 3/1960 | Merrill | |
| 3,157,809 A | 11/1964 | Bekey | |
| 3,492,520 A | 1/1970 | Yates | |
| 4,139,790 A | 2/1979 | Steen | |
| 4,322,648 A | 3/1982 | Ray et al. | |
| 4,324,996 A | 4/1982 | Adelski et al. | |
| 4,476,408 A | 10/1984 | Honsinger | |
| 4,486,678 A | 12/1984 | Olson | |
| 4,568,846 A | 2/1986 | Kapadia | |
| 4,658,165 A | 4/1987 | Vanderschaeghe | |
| 4,672,253 A | 6/1987 | Tajima et al. | |
| 4,742,258 A | 5/1988 | Earle et al. | |
| 4,795,936 A | 1/1989 | Crosetto et al. | |
| 4,841,186 A | 6/1989 | Feigel et al. | |
| 4,922,152 A | 5/1990 | Gleghorn et al. | |
| 5,097,166 A * | 3/1992 | Mikulic | 310/156.83 |

(Continued)

FOREIGN PATENT DOCUMENTS

CN 1949628 A * 4/2007

(Continued)

OTHER PUBLICATIONS

Derwent Translation (Abstract) CN1949628A.*

(Continued)

*Primary Examiner* — Quyen Leung
*Assistant Examiner* — Jose A Gonzalez Quinones
(74) *Attorney, Agent, or Firm* — Michael Best & Friedrich LLP

(57) ABSTRACT

An electric machine includes a stator, and a rotor positioned adjacent the stator and configured to rotate with respect to the stator. The rotor includes a plurality of laminations having an outside diameter and stacked in a stackwise direction. Each lamination includes a plurality of non-linear slots positioned inward of the outside diameter. Each non-linear slot includes an inner portion spaced a first distance from the outside diameter and two end portions disposed a second distance from the outside diameter. The second distance is smaller than the first distance. The rotor also includes a plurality of permanent magnets. Each magnet is disposed in one of the non-linear slots.

65 Claims, 38 Drawing Sheets

U.S. PATENT DOCUMENTS

| | | | |
|---|---|---|---|
| 5,250,867 A | 10/1993 | Gizaw | |
| 5,369,325 A | 11/1994 | Nagate et al. | |
| 5,581,140 A * | 12/1996 | Futami et al. | 310/156.53 |
| 5,672,926 A * | 9/1997 | Brandes et al. | 310/181 |
| 5,731,647 A | 3/1998 | Schuller et al. | |
| 6,008,559 A | 12/1999 | Asano et al. | |
| 6,218,753 B1 | 4/2001 | Asano et al. | |
| 6,329,734 B1 | 12/2001 | Takahashi et al. | |
| 6,340,857 B2 | 1/2002 | Nishiyama et al. | |
| 6,353,275 B1 | 3/2002 | Nishiyama et al. | |
| 6,486,581 B2 | 11/2002 | Miyashita et al. | |
| 6,525,442 B2 | 2/2003 | Koharagi et al. | |
| 6,664,688 B2 | 12/2003 | Naito et al. | |
| 6,700,270 B2 | 3/2004 | Yanashima et al. | |
| 6,717,314 B2 | 4/2004 | Horst et al. | |
| 6,727,623 B2 | 4/2004 | Horst et al. | |
| 6,727,627 B1 | 4/2004 | Sasaki et al. | |
| 6,734,592 B2 | 5/2004 | Tajima et al. | |
| 6,737,783 B2 | 5/2004 | Yanashima et al. | |
| 6,774,523 B2 * | 8/2004 | Ahn et al. | 310/216.023 |
| 6,794,784 B2 | 9/2004 | Takahashi et al. | |
| 6,844,652 B1 | 1/2005 | Chu et al. | |
| 6,849,981 B2 | 2/2005 | Kojima et al. | |
| 6,876,117 B2 | 4/2005 | Tajima et al. | |
| 6,876,119 B2 | 4/2005 | Sasaki et al. | |
| 6,891,300 B2 | 5/2005 | Noda et al. | |
| 6,917,133 B2 | 7/2005 | Koharagi et al. | |
| 6,936,945 B2 * | 8/2005 | Murakami et al. | 310/156.56 |
| 6,946,766 B2 | 9/2005 | Gary et al. | |
| 6,987,341 B2 | 1/2006 | Chang et al. | |
| 7,038,345 B2 | 5/2006 | Fratta | |
| 7,095,152 B2 | 8/2006 | Weihrauch | |
| 7,105,971 B2 | 9/2006 | Asai et al. | |
| 7,183,685 B2 | 2/2007 | Weihrauch | |
| 7,183,686 B2 | 2/2007 | Sasaki et al. | |
| 7,230,359 B2 * | 6/2007 | Iles-Klumpner | 310/156.53 |
| 7,233,090 B2 | 6/2007 | Evans et al. | |
| 7,282,827 B2 | 10/2007 | Futami | |
| 2003/0071533 A1 | 4/2003 | Kikuchi et al. | |
| 2005/0269888 A1 | 12/2005 | Utka | |
| 2006/0028082 A1 | 2/2006 | Asagara et al. | |
| 2007/0126304 A1 * | 6/2007 | Ito et al. | 310/156.53 |
| 2007/0132330 A1 | 6/2007 | Fei et al. | |
| 2007/0138892 A1 * | 6/2007 | Horst | 310/156.53 |
| 2007/0138893 A1 | 6/2007 | Son | |
| 2007/0138894 A1 | 6/2007 | Shin | |
| 2007/0145851 A1 | 6/2007 | Kikuchi et al. | |
| 2007/0152527 A1 | 7/2007 | Yura et al. | |
| 2007/0252467 A1 | 11/2007 | Hoemann et al. | |

FOREIGN PATENT DOCUMENTS

| | | | |
|---|---|---|---|
| JP | 09163647 A * | 6/1997 | |
| JP | 10309051 A * | 11/1998 | |
| JP | 11098736 A | 4/1999 | |
| JP | 11243653 A | 9/1999 | |
| JP | 2005245148 A * | 9/2005 | |
| JP | 2006014450 A * | 1/2006 | |
| KR | 1019990065127 A1 | 8/1999 | |
| WO | 2004075378 A1 | 9/2004 | |

OTHER PUBLICATIONS

Machine Translation JP10309051 (1998), JP2005245148 (2005), JP2006014450 (2006), JP09163647 (1997).*

Machine TranslationJP09163647 (1997).*

Finite Element Analysis of Brushless DC Motors for Flux Weakening Operation, Dan M. Ionel et al., Research Institute for Electrical Machines, University of Bath, Sep. 5, 1996.

Finite Element Analysis of an Interior-Magnet Brushless D.C. Machine, with a Step=Skewed Rotor, Eastham et al., University of Bath, Mar. 2, 1997.

Design Considerations for Permanent Magnet Synchronous Motors for Flux Weakening Applications, Ionel et al., May 1, 1998.

Pending U.S. Appl. No. 12/114,460, filed May 2, 2008.

* cited by examiner

US 7,932,658 B2

INTERIOR PERMANENT MAGNET MOTOR INCLUDING ROTOR WITH FLUX BARRIERS

RELATED APPLICATION DATA

The present application claims the benefit of co-pending provisional patent application Ser. No. 60/895,075, filed Mar. 15, 2007, the subject matter of which is hereby fully incorporated by reference.

BACKGROUND

The invention relates to a motor rotor that includes interior permanent magnets and to a motor that includes such a rotor. More particularly, the present invention relates to a motor rotor that includes interior permanent magnets and one or more flux barriers.

Permanent magnet motors can be manufactured using rotors that include surface mounted permanent magnets of internally mounted permanent magnets. However, the power provided to a motor having surface mounted magnets cannot be used efficiently with motors that include a rotor having internally mounted magnets.

SUMMARY

The present invention provides a permanent magnet motor that includes a rotor having internally-mounted magnets. The rotor also includes a plurality of flux barriers that are arranged such that the motor will operate using the same inputs as a prior motor that includes surface mounted magnets. In one construction, the motor includes flux barriers arranged such that opposite poles are symmetric with one another but are not symmetric with any other poles. In one construction, the flux barriers are arranged such that the harmonic content of the air-gap mmf and flux density is reduced. In one construction the flux barriers and designed such that the motor can exhibit a magnetic saliency and a reluctance torque when excited with a current containing a d-axis component.

In one construction, the invention provides an electric machine that includes a stator, and a rotor positioned adjacent the stator and configured to rotate with respect to the stator. The rotor includes a plurality of laminations having an outside diameter and stacked in a stackwise direction. Each lamination includes a plurality of non-linear slots positioned inward of the outside diameter. Each non-linear slot includes an inner portion spaced a first distance from the outside diameter and two end portions disposed a second distance from the outside diameter. The second distance is smaller than the first distance. The rotor also includes a plurality of permanent magnets. Each magnet is disposed in one of the non-linear slots.

In another construction, the invention provides a rotor for an electric machine. The rotor includes a plurality of laminations having a plurality of apertures and stacked in a stackwise direction. Each lamination defines an even number of pie-shaped pole portions. At least one pole portion includes a magnet slot. The plurality of apertures is arranged such that each pole portion is symmetric to an opposite pole portion and is asymmetric with respect to an adjacent pole portion. The invention also includes a plurality of permanent magnets. Each permanent magnet is disposed in one of the magnet slots of the pie-shaped pole portions.

In yet another construction, the invention provides a rotor for an electric machine. The rotor includes a first core portion formed from a first plurality of first laminations stacked in a stackwise axial direction. Each first lamination defines an even number of pie-shaped pole portions that each includes a magnet slot. A first of the pie-shaped pole portions is different than an adjacent second pie-shaped pole portion. A second core portion is formed from a second plurality of first laminations stacked in a stackwise direction. The second core portion is connected to the first core portion such that the second pie-shaped pole portions of the second core portion are aligned in the stackwise direction with the first pie-shaped pole portions of the first core portion.

In still another construction, the invention provides a rotor for an electric machine. The rotor includes a first core portion formed from a first plurality of first laminations. Each first lamination has a first substantially planar side, a second substantially planar side, a plurality of magnet slots, and a plurality of apertures. The first laminations are stacked in a stackwise direction such that the first substantially planar surface faces in a first direction. A second core portion is formed from a second plurality of first laminations stacked in a stackwise direction such that the second substantially planar sides of the second plurality of first laminations faces in the first direction. The second core portion is connected to the first core portion such that the slots are substantially aligned and substantially all of the plurality of apertures are misaligned.

In another construction, the invention provides a rotor for an electric machine. The rotor includes a plurality of rotor laminations each having an outer surface and stacked in a stackwise direction. Each lamination includes a first pole portion that includes a first slot that cooperates with the outer surface to define a first space. The first space defines a first central aperture and a first side aperture. A second pole portion, different from the first pole portion, includes a second slot that cooperates with the outer surface to define a second space. The second space defines a second central aperture and a second side aperture.

BRIEF DESCRIPTION OF THE DRAWINGS

FIG. 11 is a partially exploded view of a rotor core including the laminations of FIG. 9 and FIG. 10;

FIG. 16 is an end view of the rotor core of FIG. 15 illustrating an offset between two rotor core portions;

DETAILED DESCRIPTION

Figure 1:
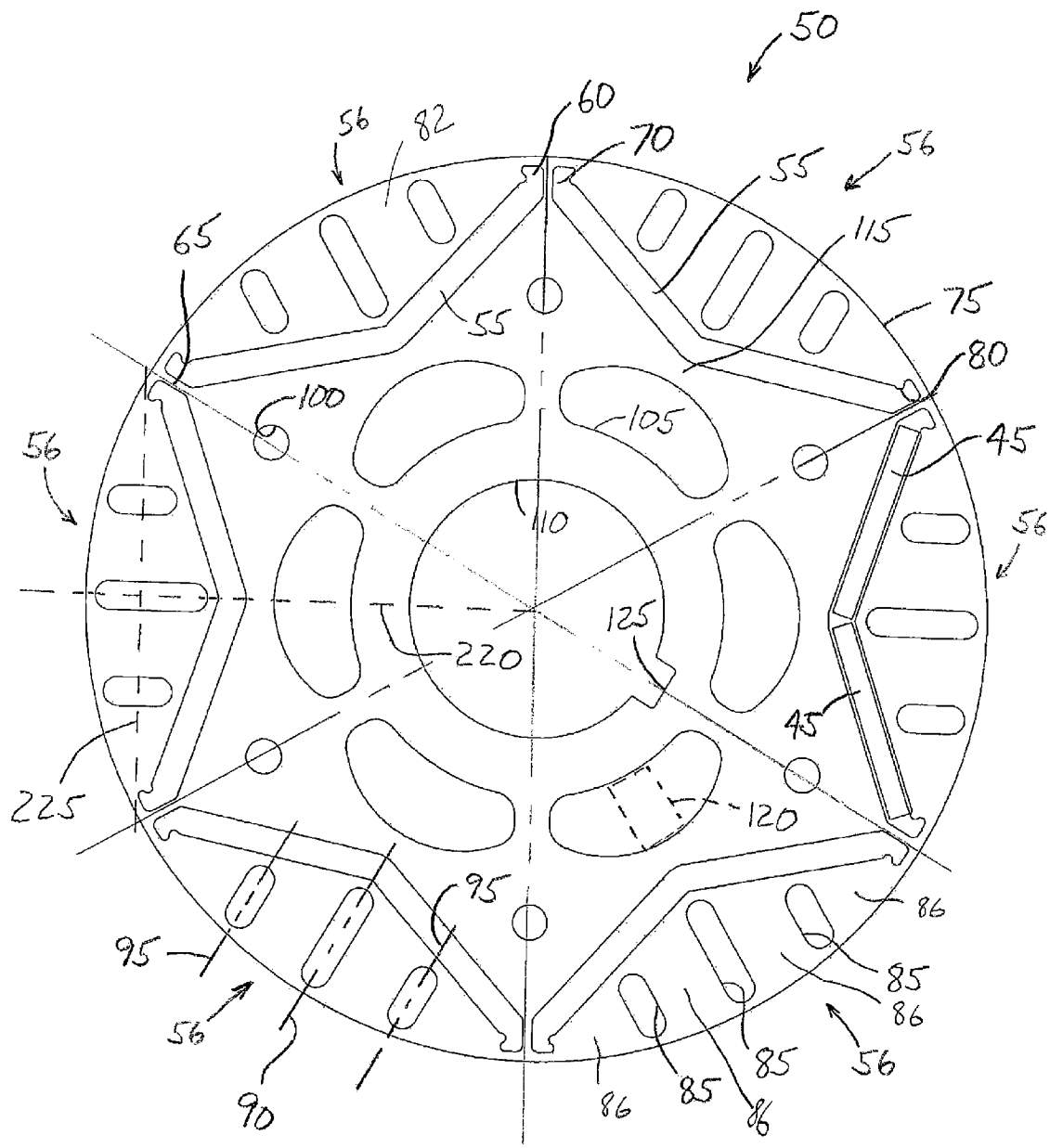
FIG. 1 is an end view of a rotor lamination of the IPM (interior permanent magnet) type with flux barriers suitable for use in forming the rotor of FIG. 7.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

One typical rotor construction for permanent magnet synchronous motors (also known as brushless PM motors) consists of a substantially cylindrical core of ferromagnetic material, such as laminated steel, with arc magnets attached to the surface facing the motor air-gap and the stator. From a magnetic point of view, such a motor is substantially non-salient, the values of the d and q axis inductances being approximately the same. When driven by an electronic controller, a motor of this construction is preferably operated so that the phasor of the stator current is aligned with the q axis in order to deliver maximum torque per ampere.

Other typical rotor constructions, known to those skilled in the art, are of the interior type, where the magnets are inserted within the rotor core and magnetized radially, in a configuration typically denoted as IPM (interior permanent magnet), or magnetized tangentially in a configuration typically referred to as "spoke", because of the resemblance of the magnets position with the spokes of a wheel. From a magnetic point of view, such a motor is substantially salient as the value of the unsaturated q-axis inductance is larger than the value of the d-axis inductance. When driven by an electronic controller, a motor of this construction is preferably operated so that the phasor of the stator current has, in addition to the q-axis current component, a demagnetizing d-axis component in order to take advantage of the reluctance torque and further improve the torque output. However, it is known that the saturation of the q-axis armature flux path, which tends to be rather high in conventional IPM motors, reduces the q-axis inductance and the reluctance torque.

It is largely recognized that, especially when built with high energy rare earth permanent magnets, such as NdFeB, the IPM constructions have advantages over the surface mounted magnet designs in terms of improved performance and manufacturability as well as reduced cost. However, for various reasons, including legacy manufacturing lines, some of the motors already in production or operating in the field are of the surface mounted magnet type.

Generally, a surface mounted permanent magnet rotor cannot be replaced with an IPM rotor as the motor controls are not necessarily compatible and the motor parameters and the optimal operation points differ between the two motors, as previously explained. The present rotor is configured to allow an existing controller that, for example, only commands the q-axis current to control the new IPM rotor and motor. The present rotor can also be employed in motors controlled with "square wave" currents, typically referred to as brushless DC motors. The IPM motor has substantially the same values for some of the parameters, e.g. back-emf and d-axis inductance, as a motor with a surface mounted PM rotor. Other parameters, such as the q-axis inductance, the stator winding resistance, and the rotor inertia, can be different between the two motor constructions in order to improve motor performance. Thus, the IPM motor can be made fully interchangeable with a legacy product incorporating a surface mounted permanent magnet rotor (SPM).

Both the IPM and the SPM motor typically employ a stator with a core built of ferromagnetic material, such as laminated electric steel (cold rolled electric motor steel) and a winding that can be of the distributed or the concentrated type. The stators that are employed in conjunction with the IPM and the SPM rotor, respectively, can be different, e.g. can have different dimensions, number of slots, grade of steel etc. It is preferable that the type of winding, distributed or concentrated, is the same for the two motors as this influences the range of values for the inductances.

Typically, a relative axial skew is provided between the stator and the rotor. In the SPM motor the magnets or the magnetization are skewed, while for the IPM motor the stator core can be skewed. In the preferred embodiment, the mechanical air-gap length, defined as the minimum radial distance between the stator core and the magnet or the rotor core is the same for the two different motor constructions.

Figure 7:
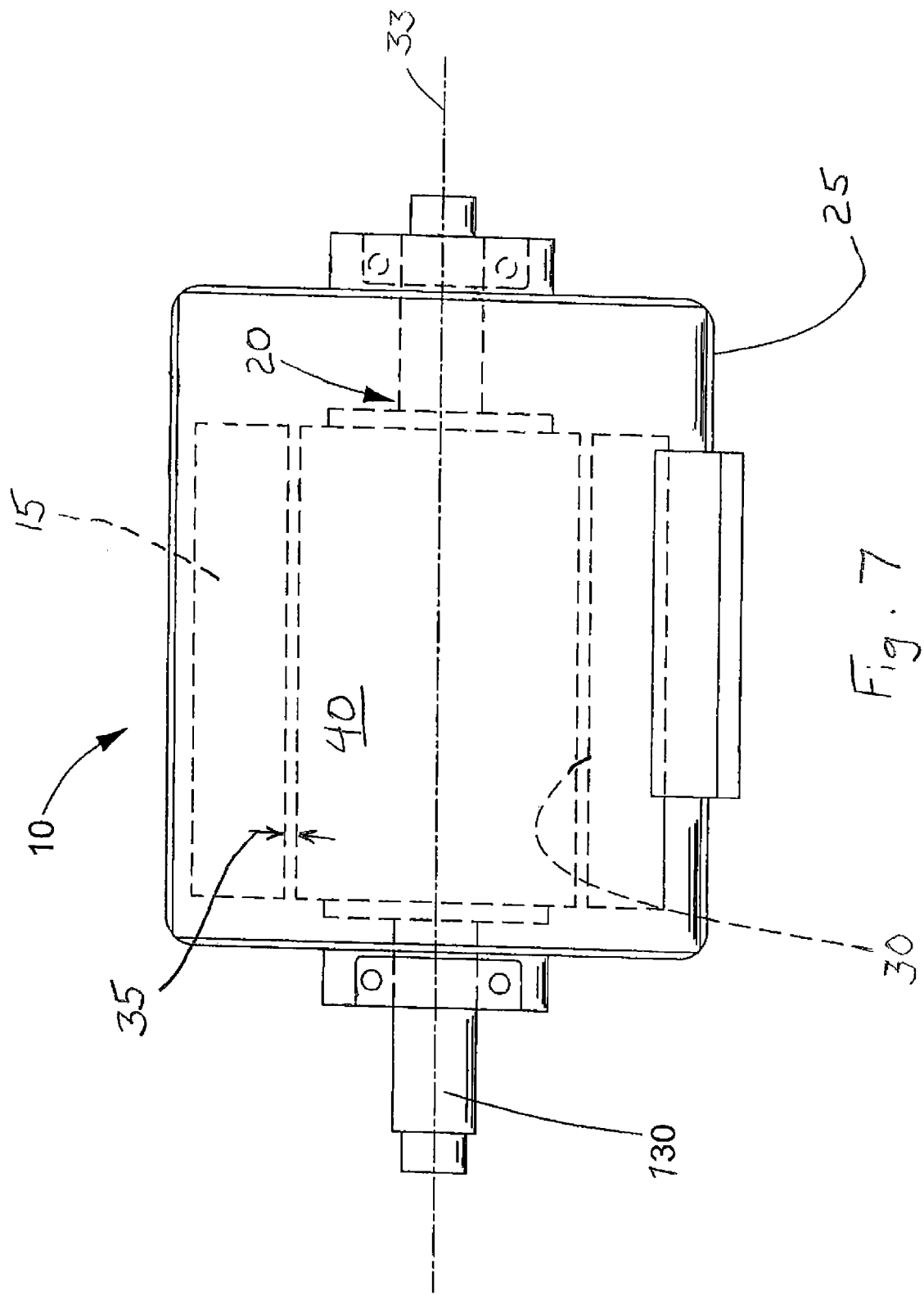
FIG. 7 is a schematic illustration of a motor including a rotor embodying the present invention.

FIG. 7 illustrates a motor 10 that includes a stator 15 and a rotor 20. The stator 15 is supported within a housing 25 and defines a rotor opening 30 sized to receive the rotor 20 and define a desired air gap 35 therebetween. The rotor 20 includes a core 40 that supports permanent magnets 45 configured to induce rotation of the rotor 20 in response to a flow of electrical current through the stator 15.

In preferred constructions, the core 40 of the IPM rotor 20 includes a plurality of laminations 50 stacked in a lengthwise or stackwise direction 33 to define the core 40. FIG. 1 illustrates one lamination 50 suited for use in forming the core 40. The lamination 50 includes several V-shaped magnet slots 55 with each magnet slot 55 sized to receive permanent magnet material such as two substantially rectangular magnets 45. The illustrated construction includes six V-shaped slots 55, thus defining six pole portions 56 with more or fewer being possible depending on the motor design. The construction in FIG. 1 employs two magnets 45 per pole portion 56 with fewer magnets 45 or more magnets 45 per pole portion 56 being suitable for use if desired. It should be noted that the magnets 45 are illustrated as being artificially small for purposes of illustration. However, as one of ordinary skill will realize, the magnets 45 are generally sized to tightly fit within the slots 55 to inhibit unwanted movement of the magnets 45.

The extremities 60 of the slots 55 are typically not filled with permanent magnet material and they are profiled to inhibit the magnets 45 from moving within the slot 55 and are designed to define a bridge 65 between two adjacent slots 55 to reduce the magnet leakage flux. Specifically, the extremities 60 include an angled portion 70 that is arranged in a direction that is substantially normal to an outer surface 75 of the lamination 50 adjacent the extremity 60. In addition, a protrusion 80 extends into the V-shaped slot 55 to narrow the slot width adjacent each of the extremities 60 and inhibits movement of the magnets 45 into the extremities 60. In addition, non-magnetic material could be positioned or injected into the extremities 60 to inhibit unwanted movement of the magnets 45.

The V-shaped slots 55 cooperate with the outer circular surface 75 of the lamination 50 to define a space 82. Each space 82 defines several apertures 85, or flux barriers, that extend through the lamination 50. In the illustrated construction, the apertures 85 are each shaped like elongated ovals with rectangular, elliptical, or other shaped apertures also being suitable for use. The apertures 85 define flux passages 86 on either side thereof and thereby operate to guide the magnetic flux in the desired direction.

In the construction illustrated in FIG. 1, three apertures 85 are formed in each space 82. The middle of the three apertures 85 is longer than the two outer apertures 85 with all three apertures 85 having a similar width. The middle aperture 85 defines a long axis 90 that is substantially radial. That is to say, the long axis 90 is substantially coincident with a radial axis 220 of the lamination 50. The two outer apertures 85 each define long axes 95 that are substantially parallel to the long axis 90 of the middle aperture 85. The outer apertures 85 of each space 82 are disposed an equal distance from the middle aperture 85.

The lamination 50 of FIG. 1 also includes a plurality of circular apertures 100 disposed radially inward of the slots 55. The apertures 100 can be used to improve the mechanical integrity of the core such as by receiving a tie bolt, can be left empty, can be filled with non-magnetic material, or can be omitted entirely.

The construction of FIG. 1 also includes irregular or kidney-shaped holes 105 placed between a shaft aperture 110 and the slots 55. These irregular holes 105 are optional and have the main function of creating a bridge 115 between the irregular holes 105 and the slots 55, which can magnetically saturate under the influence of the magnetic flux produced by the q-axis armature reaction. The size of the irregular holes 105 can vary, and the shape can be modified to assure that the magnetic saturation of the bridge 115 is achieved. For example, the irregular hole 105 can follow the substantially rectangular contour 120 drawn with a dotted line and still have a comparable electromagnetic effect on the performance of the motor 10. However, the use of larger holes 105 reduces the weight and inertia of the rotor.

It should be noted that the shaft aperture 110 illustrated in FIG. 1 includes a key slot 125. The key slot 125 cooperates with a key and a second key slot formed as part of a shaft 130 (shown in FIG. 7) to assure that the lamination does not rotate with respect to the shaft 130. As one of ordinary skill will realize other systems and methods could be employed to inhibit unwanted relative rotation.

Before proceeding, it should be noted that the term stackwise direction 33 is used herein to describe the direction in which a rotor core grows as additional laminations are stacked thereon. As such, the stackwise direction 33 generally extends along the axis of rotation or the central axis of the shaft 130 on which the laminations are attached.

Figure 2:
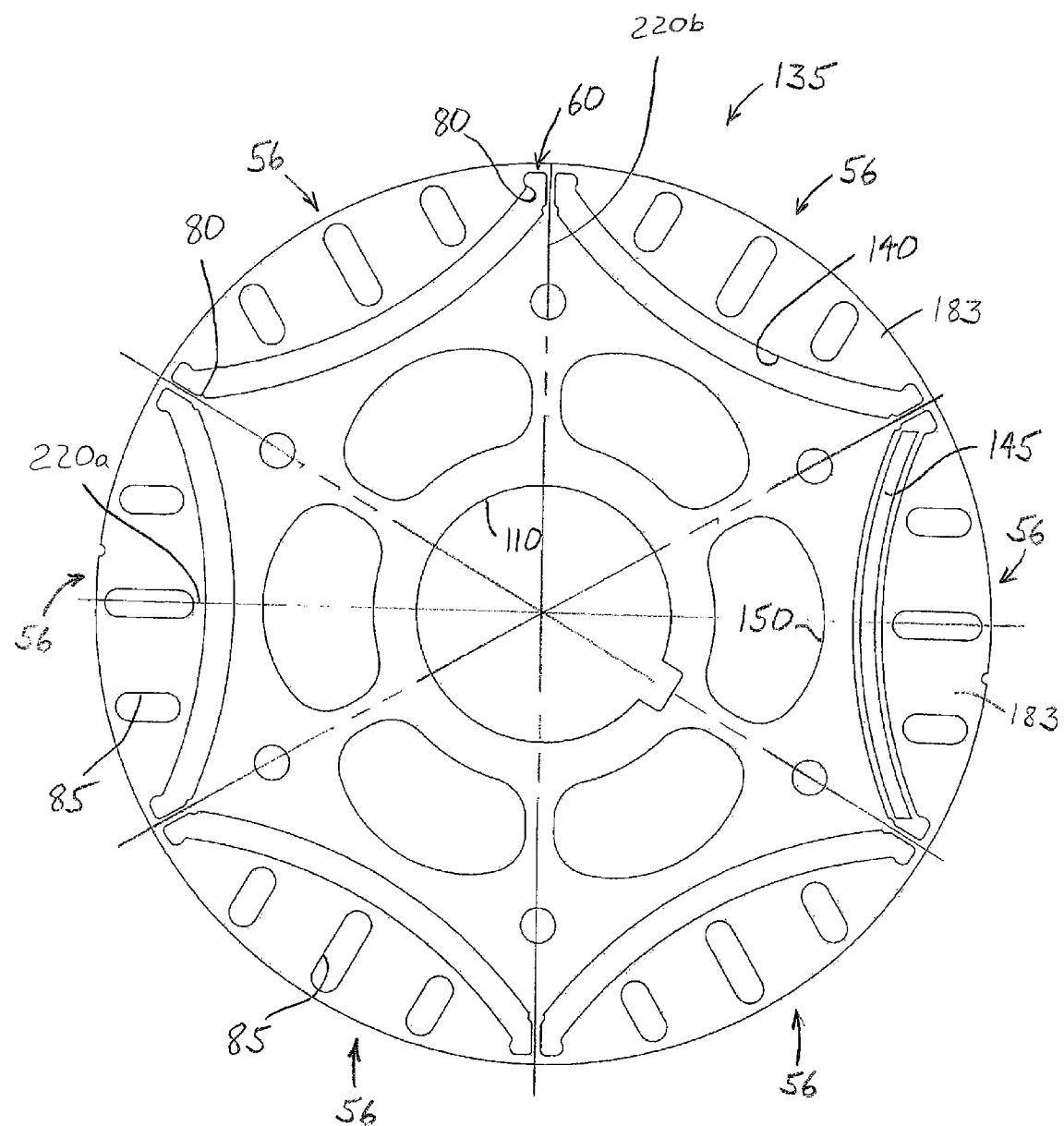
FIG. 2 is an end view of another rotor lamination of the IPM (interior permanent magnet) type with flux barriers.

FIG. 2 illustrates another lamination 135 suitable for use in forming the core 40 of the internal magnet rotor 20 of FIG. 7. The lamination 135 of FIG. 2 is similar to the lamination 50 of FIG. 1. However, the lamination 135 illustrated in FIG. 2 includes magnet slots 140 that are arcuate rather than V-shaped. In addition, a single arcuate magnet 145 is positioned within the arcuate slots 140, rather than two rectangular magnets 45 as illustrated in FIG. 1. Of course, other constructions could employ two or more magnets 45 within each slot 140.

It should be noted that the magnet slots 55, 140 of FIG. 1 and FIG. 2 respectively are each non-linear slots. While linear magnets could be placed in the slots 55, 140, the slots themselves include a bend or turn that makes them non-linear. On a general basis, the magnet slot edges, the collection of which constitutes the boundary between the slot and the ferromagnetic material of the lamination, follow a geometrically non-linear trajectory or profile. Of course other non-linear shapes as well as linear (e.g., rectangular) slots could be employed if desired.

The lamination 135 of FIG. 2 includes pole portions 56 that include irregular apertures 150 positioned between a shaft bore 110 and arcuate slots 140. The irregular apertures 150 of FIG. 2 are larger than those of FIG. 1 but are positioned for the same reason as the irregular apertures 105 of FIG. 1.

Figure 6:
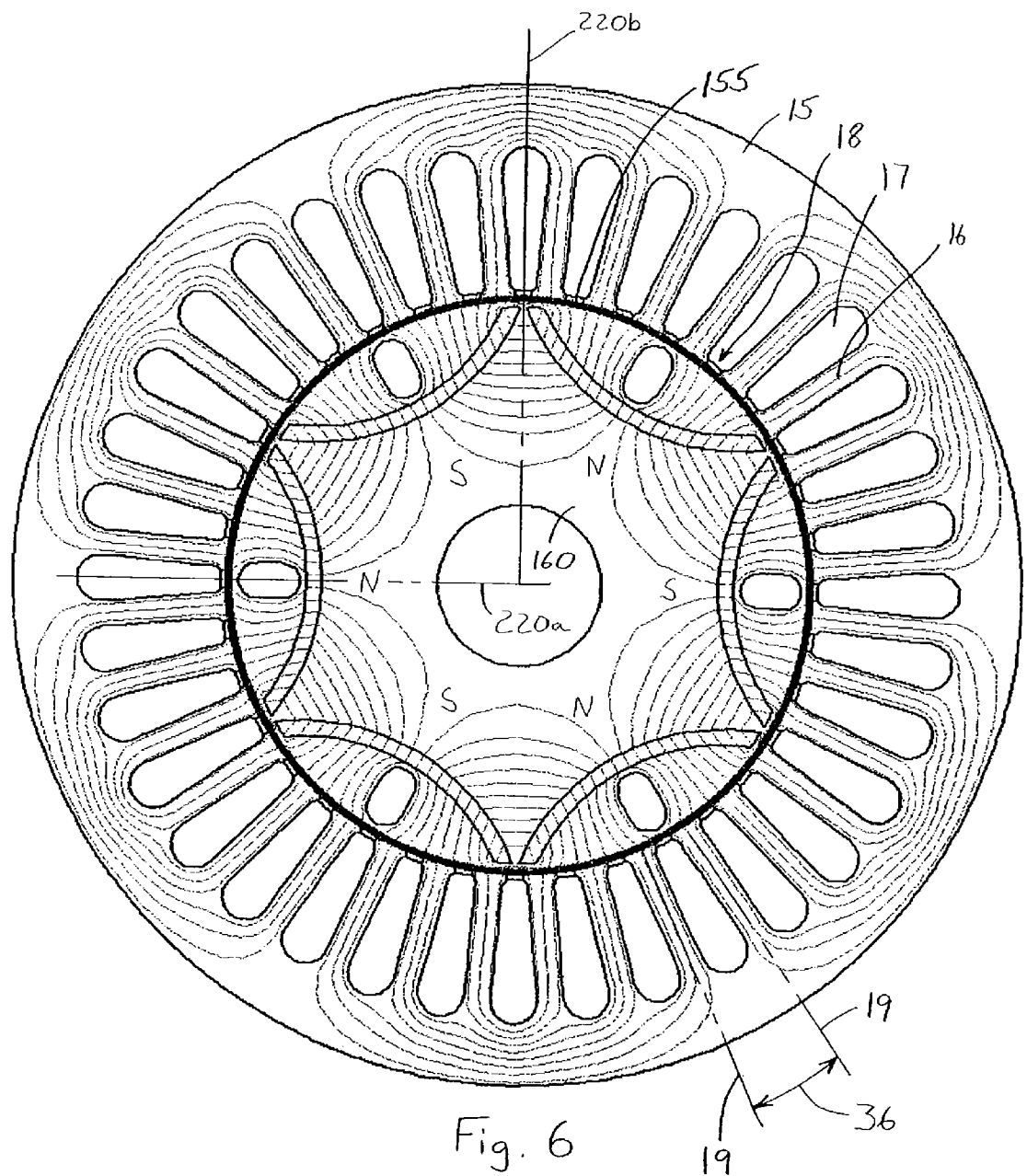
FIG. 6 is a plot of the magnetic field lines in the cross-section of a motor with a rotor of the IPM type and a single flux barrier per pole.

FIG. 6 illustrates a rotor 155 including laminations 160 similar to the one of FIG. 2 positioned within the stator 15. As can be seen, the laminations 160 of FIG. 6 do not include any apertures, other than the shaft bore 110, positioned between the shaft bore 110 and the arcuate slots 140. In addition, only a single oval aperture 85 is employed between the outer circular surface 75 of the laminations 160 and the arcuate slots 140. Before proceeding, it should be noted that the stator 15 of FIG. 6 defines a stator tooth 16, a stator slot 17 and a stator slot opening 18 towards the motor air-gap 35. The angle measured between the axes 19 of two adjacent teeth is defined as the stator slot pitch 36. For the example stator 15 of FIG. 6, which includes 36 equidistant slots 17, the stator slot pitch 36 is equal to 10 degrees. These definitions follow the terminology commonly employed by those skilled in the art.

Figure 3:
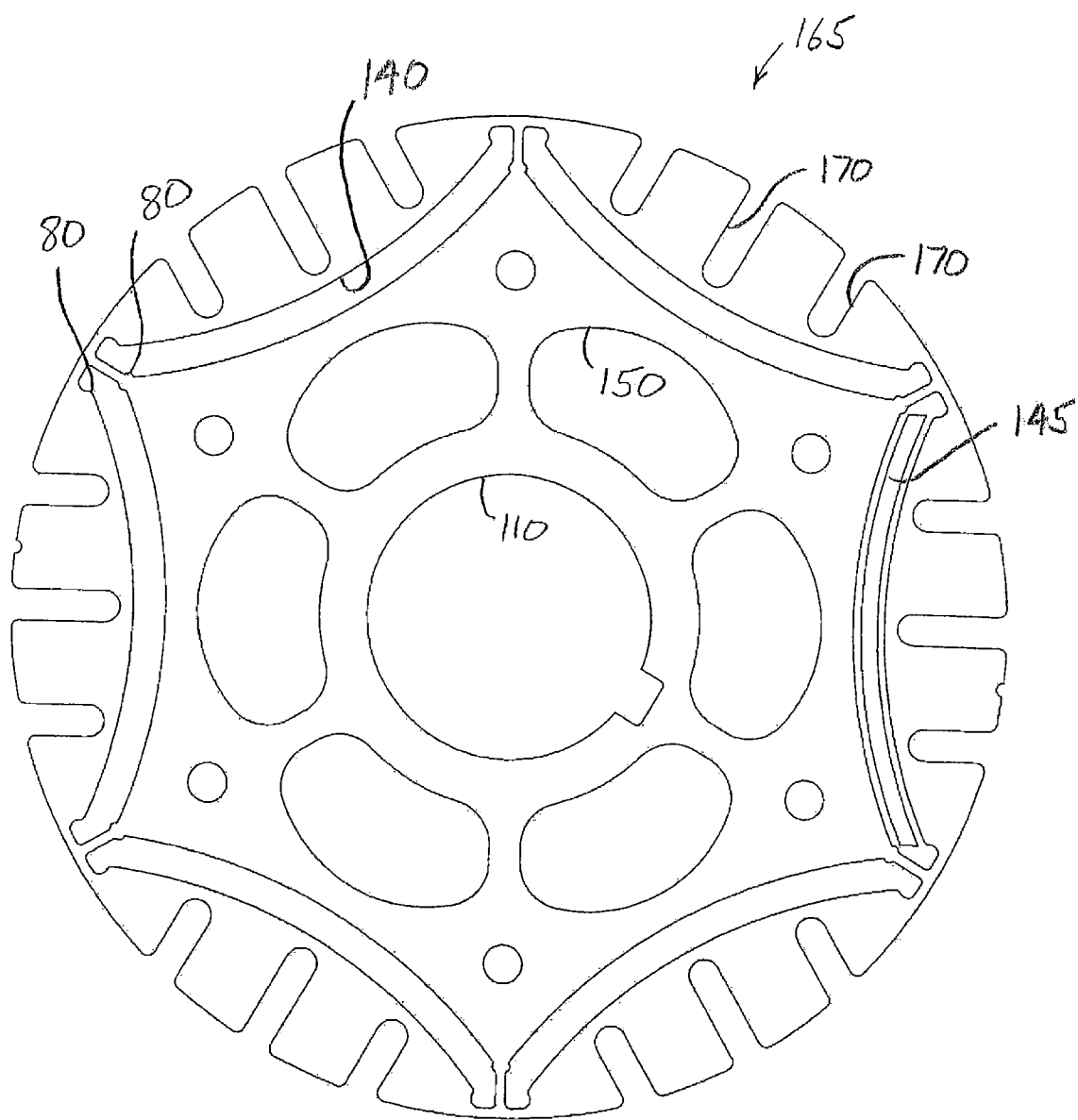
FIG. 3 is an end view of another rotor lamination of the IPM (interior permanent magnet) type with flux barriers.

FIG. 3 illustrates another lamination 165 that is suitable for use in forming the core 40 of the rotor 20 of FIG. 7. The lamination 165 of FIG. 3 is substantially the same as the lamination 135 of FIG. 2. However, the elongated apertures 170 or flux barriers of the lamination 165 of FIG. 3 extend through the outer circular surface 75 of the lamination 165 such that the apertures 170 are open on one end.

Figure 4:
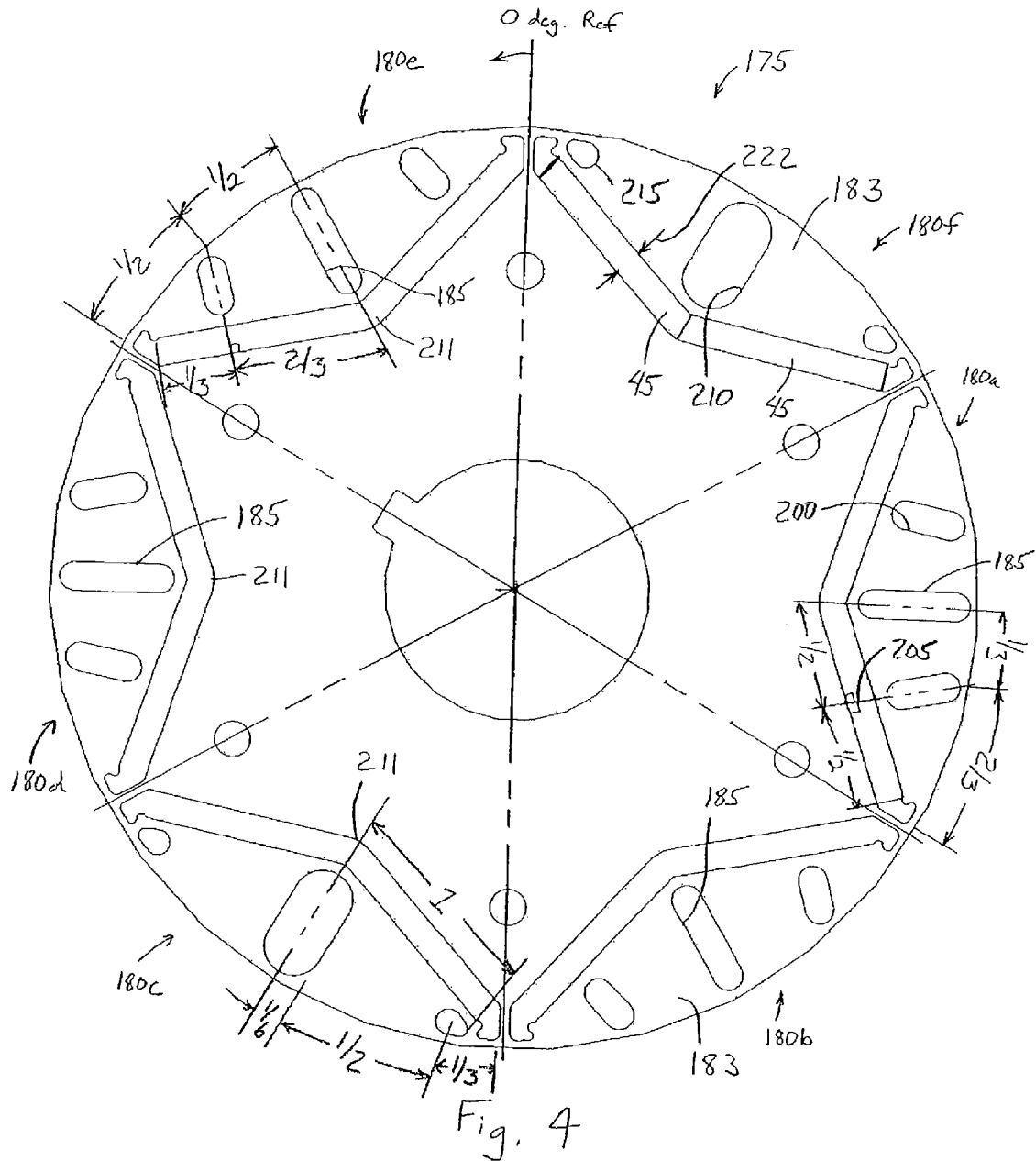
FIG. 4 is an end view of another rotor lamination of the IPM (interior permanent magnet) type with flux barriers.
Figure 5:
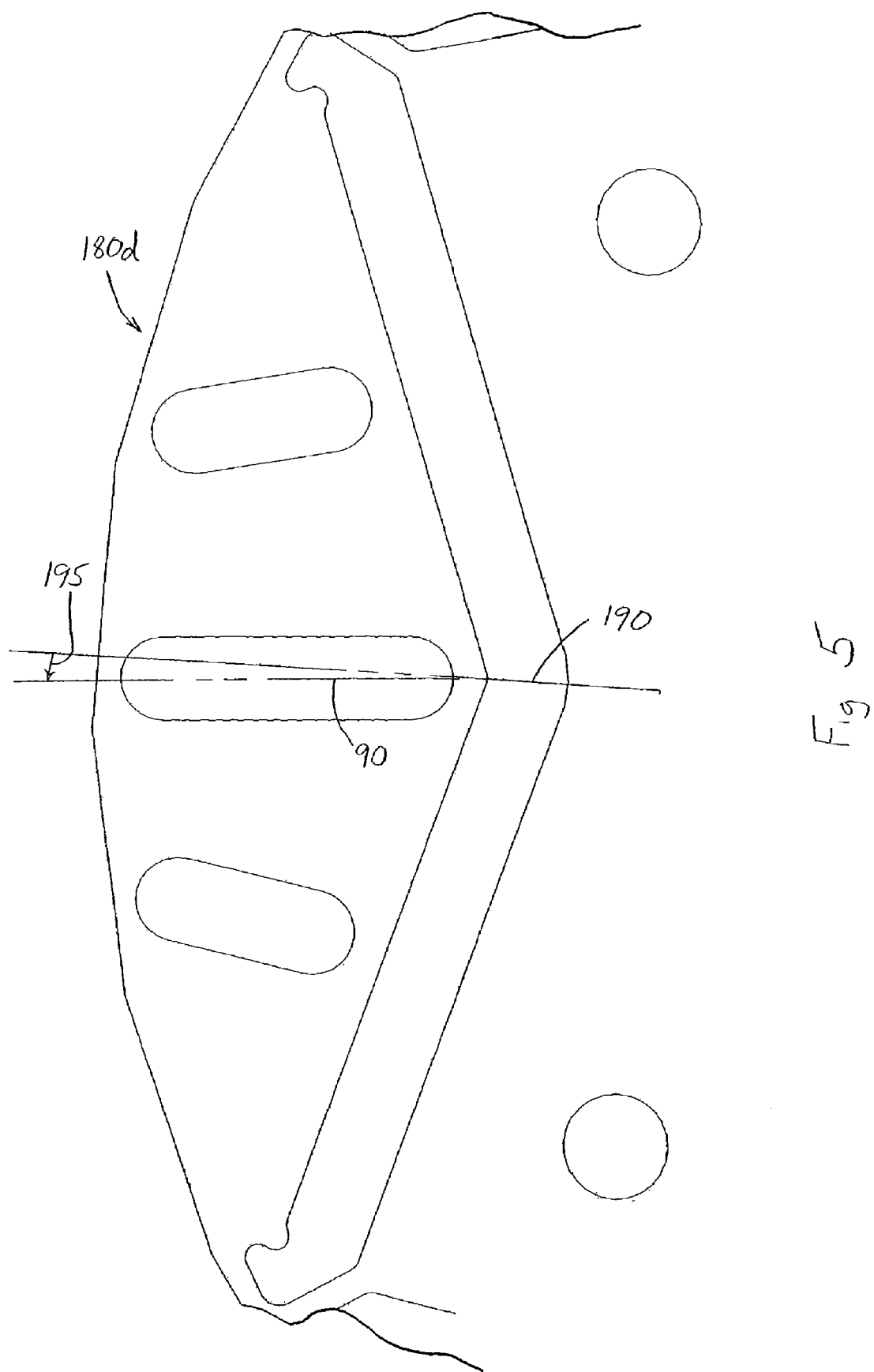
FIG. 5 is an enlarged end view of a portion of a lamination similar to that of FIG. 4 but having a flux barrier skewed with respect to a radial direction.

FIGS. 4 and 5 illustrate another construction of a lamination 175 suitable for use in forming the core 40 of the rotor 20 of FIG. 7. With reference to FIG. 4, the lamination 175 includes V-shaped magnet slots 55 similar to those of FIG. 1. The V-shaped magnet slots 55 define six pole portions 180a-180f that each defines a space 183 between the V-shaped slots 55 and the outer circular surface 75 of the lamination 175. Of course, other constructions could include fewer or more pole portions 180 and V-shaped slots 55 as required.

Before proceeding, it should be noted that the term pole portion is used to define the substantially pie-shaped portions of the laminations or rotors that include one complete magnet slot. The pole portions may be geometrically similar and may include some asymmetry or may be different all together. In addition, the number of pole portions is not indicative of the number of magnetic poles defined by the rotor as will be described in more detail with regard to FIGS. 21-30.

In addition, the lamination 175 includes a shaft bore 110 similar to that of FIG. 1 and a plurality of circular apertures 100 between the shaft bore 110 and the V-shaped slots 55. Again, differently shaped or arranged apertures 100, as well as different quantities could be employed if desired. Additionally, a different shaft bore arrangement could be employed if desired. It should also be noted that the irregular-shaped apertures 105, 150 of the laminations 50, 135 of FIGS. 1 and 2 have been omitted from the construction of FIG. 4. However, these irregular-shaped apertures 105, 150 could be added if desired.

Each of the pole portions 180a-180f includes a plurality of apertures that act as magnetic flux barriers. Unlike the prior constructions, the flux barriers are not identical, i.e. they are different, in each pole portions 180a-180f. However, they are substantially the same for diametrically opposite pole portions 180a-180f. For example, the pole portions at the three o' clock position 180a and the nine o' clock position 180d are similar, the pole portions at the five o' clock position 180b and the eleven o' clock position 180c are similar, and the pole portions at the one o' clock position 180c and the seven o' clock position 180f are similar.

The first set of pole portions (three o' clock position 180a and the nine o' clock position 180d) illustrated in FIG. 5 includes a central oval aperture or flux barrier 185 that is skewed slightly with respect to a radial line 190 that passes through the aperture 185 and intersects the long axis 90. In the illustrated construction, the skew 195 is about 2.5 degrees with other skews 195 being possible. The use of skew 195 is optional and is mainly employed in order to reduce the cogging and ripple torque. Not only the central aperture 185, but also the other apertures or flux barriers from the pole pieces, such as side apertures 200 and large aperture 210 can be skewed. In addition the rotor laminations 175 can be axially flipped by 180 degrees and, for example, by doing so only once at the middle of the rotor stack, the equivalent of a one-step axial stagger skew is produced. The optimal choice of the skew (angle) and means of implementation will be further discussed for example in connection with FIGS. 9-13 and FIGS. 36-38.

The two oval side apertures or flux barriers 200 are positioned at either side of the central aperture 185 and are generally shorter than the central aperture 185. Both side apertures 200 are skewed with respect to the center aperture 185. The skews are such that a longitudinal axis 205 extending through each of the side apertures extends through the outer circular surface 75 at about one-third of the distance from the center of the pole portion 180a, 180d to the side of the pole portion 180a, 180d. In addition, the axis 205 crosses the V-shaped slot 55 in a position that is about one-half the distance between the vertex 211 of the V-shaped slot 55 and the extremity or end 60 of the V-shaped slot 55.

Each of the second group of pole portions (five o' clock position 180b and the eleven o' clock position 180c) also includes a central oval aperture or flux barrier 185 similar to the one in the first group of pole portions 180a, 180d. In addition, the central aperture 185 of the second group of pole portions 180b, 180c can be skewed similarly to the skew 195 of central aperture 185 of the first group of pole portions 180a, 180d. The second group also includes two shorter oval side apertures of flux barriers 200 that are spaced apart from the central aperture 185.

The side apertures 200 of the second group are positioned and skewed differently from those of the first group such that an axis 205 that extends through each of the side apertures 200 crosses the outer circular surface 75 about half way between the center of the pole portion 180b, 180c and the end of the pole portion 180b, 180c. The axis 205 also crosses the V-shaped slot 55 at a position that is about two-thirds of the distance between the vertex 211 and the extremity or end 60.

Figure 8:
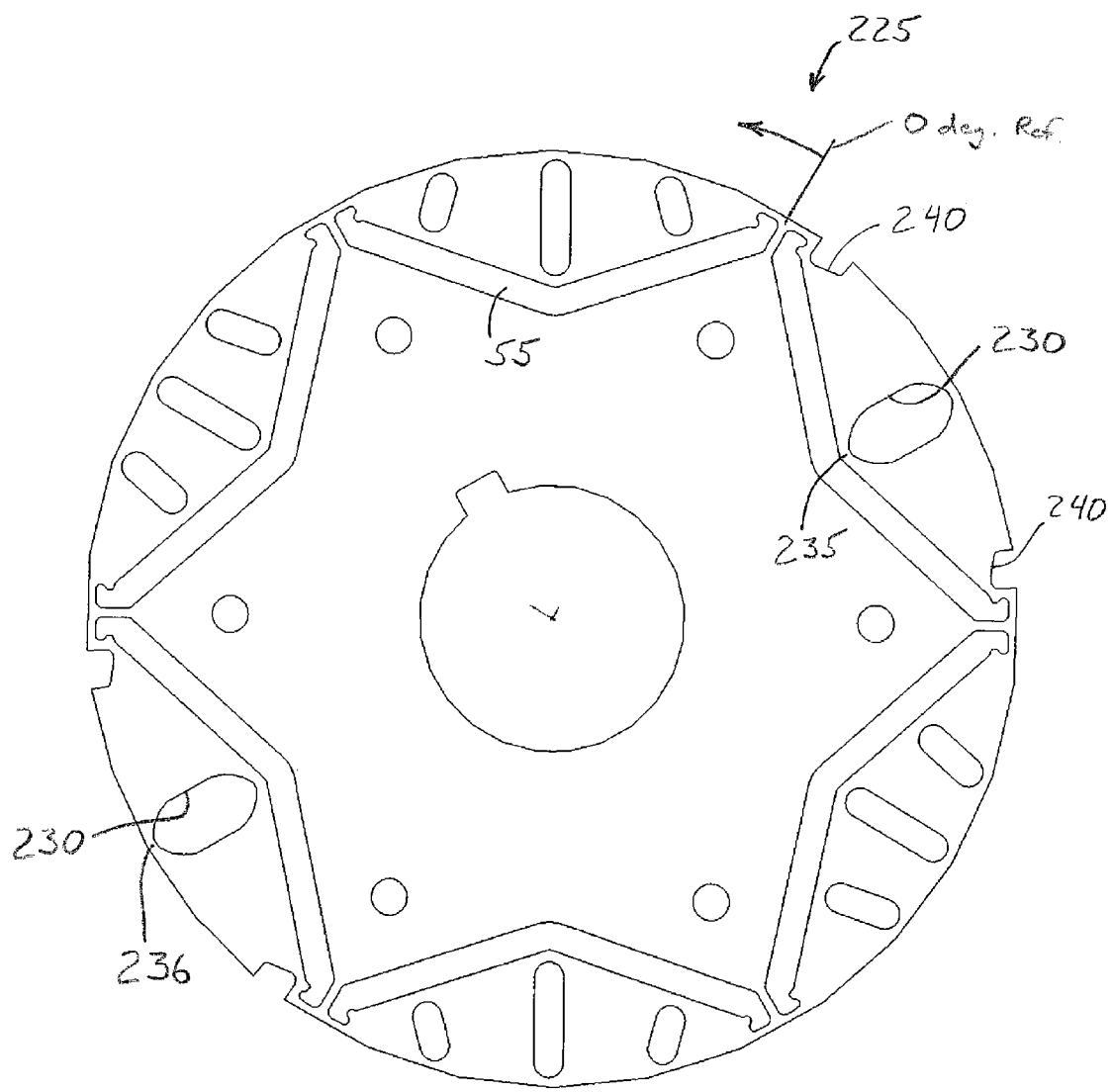
FIG. 8 is an end view of another rotor lamination of the IPM-type with flux barriers.
Figure 9:
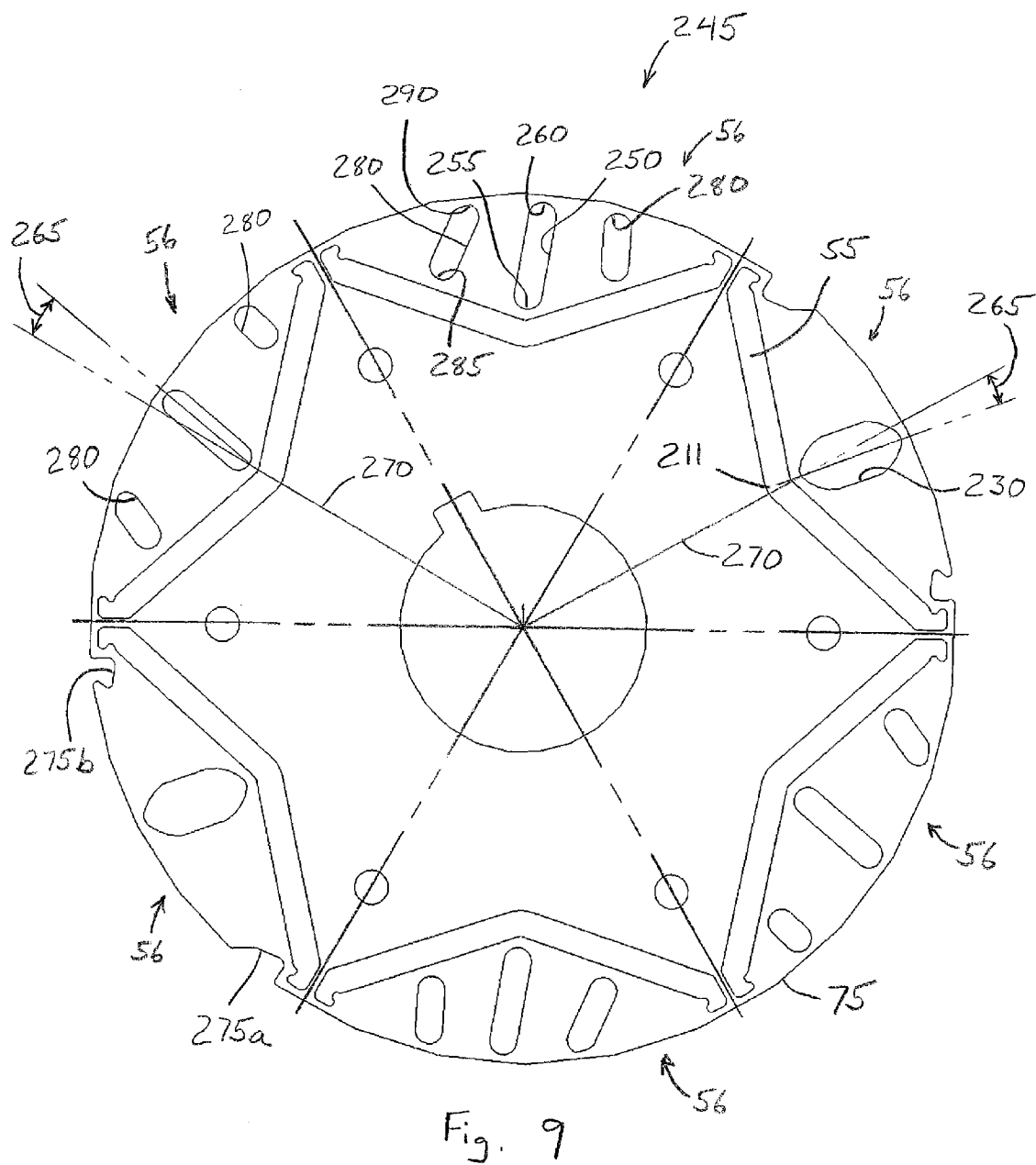
FIG. 9 is an end view of another rotor lamination of the IPM-type with flux barriers skewed in a first direction.
Figure 10:
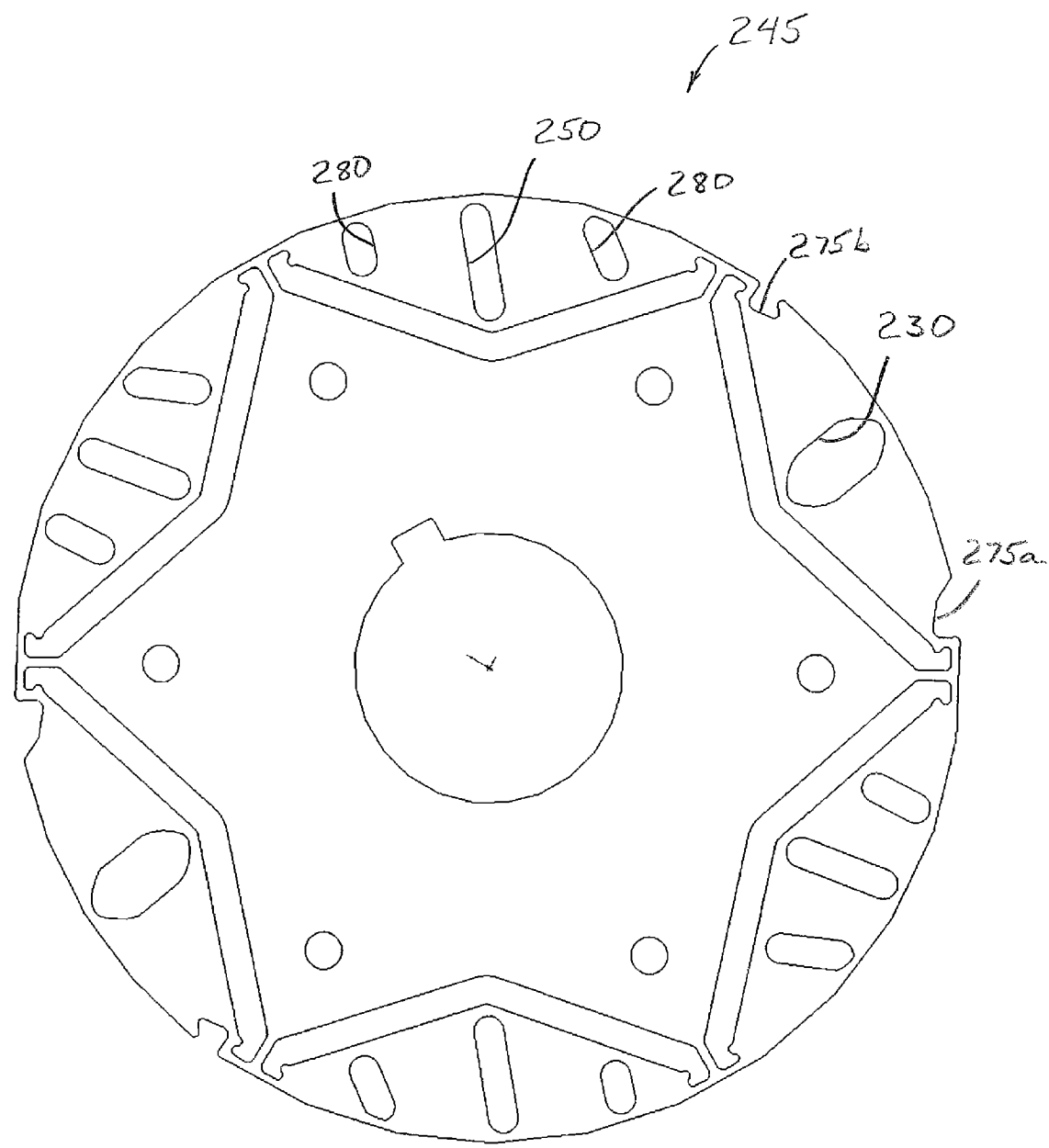
FIG. 10 is an opposite end view of the rotor lamination of FIG. 9.
Figure 77:
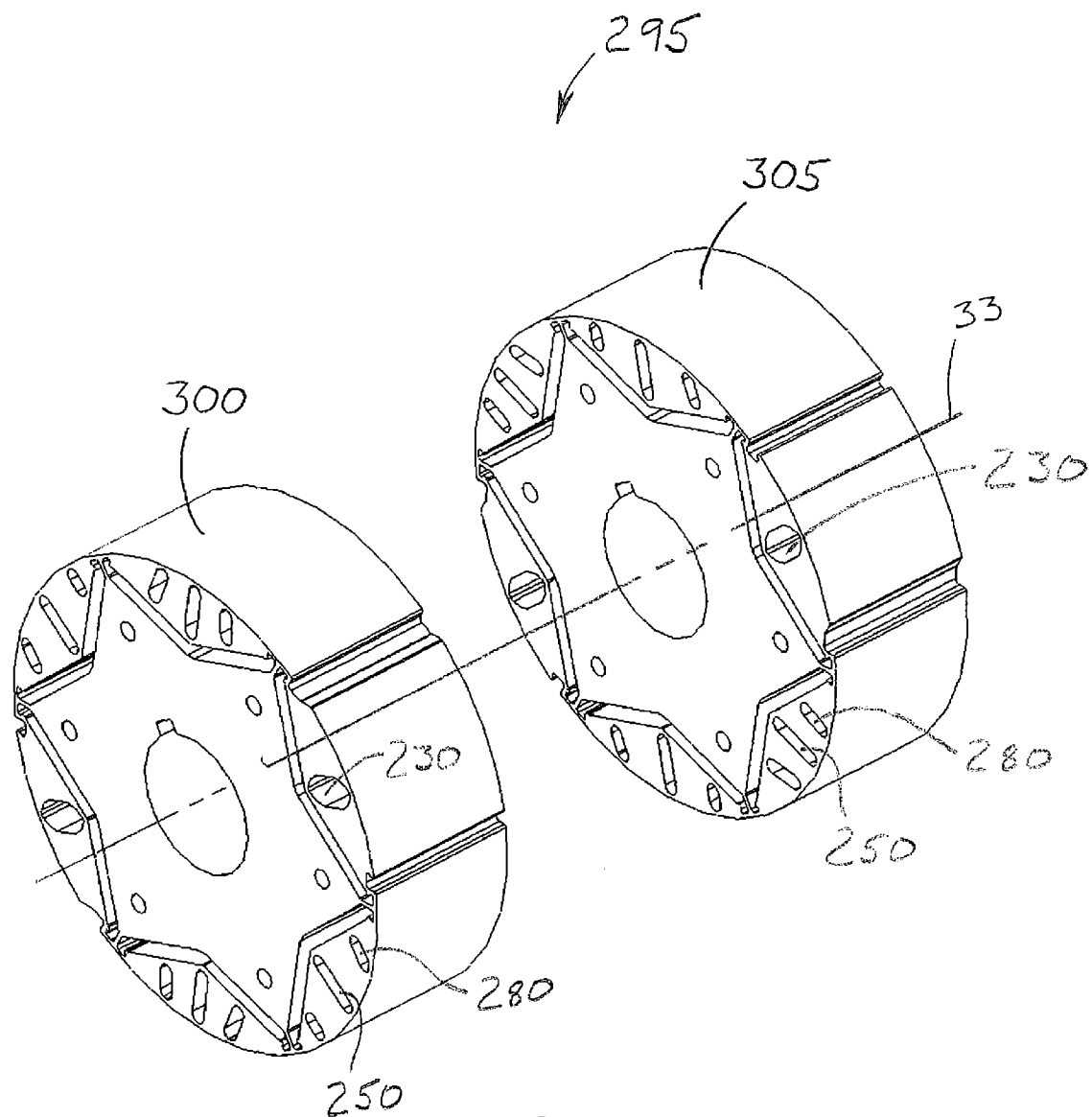

Each of the third group of pole portions (seven o' clock position 180c and the one o' clock position 180f) includes a central oval aperture 210 that is substantially wider than the width of the central apertures or flux barrier 185 of the first group of pole portions 180a, 180d and the second group of pole portions 180b, 180c. Again, the aperture 210 can be skewed in a manner similar to that of the first group of pole portions 180a, 180d and the second group of pole portions 180b, 180c if desired. Each pole portion 180c, 180f of the third group of pole portions includes two side apertures or flux barriers 215 spaced apart from the central aperture 210 such that the center of each aperture 215 is approximately one-third of the distance between the center and end of the pole portions 180c, 180f from the end of the pole portion 180c, 180f. In addition, the center of the side aperture 215 is at about the end of the V-shaped slot 55 and thus is adjacent the extremity or end 60. FIG. 4 illustrates one possible example for the geometrical proportions of the flux barriers positioning with respect to magnets and to the rotor outer surface. The dimensions are defined in a per unit (p.u.) system with reference to the length of one magnet out of the two positioned in each slot. As it will be described in the following, the p.u. dimensions correspond to a preferred construction that enhances motor performance. Variations of plus and minus 10 percent of the defined dimensions as well as relatively small variations of shape, as shown for example in FIGS. 8-10 are of course possible.

The positioning of the flux barriers 85, 185, 200, 210, 215 with respect to the magnet slots 55 and the rotor outside surface 75, as previously explained with reference to FIG. 4, contributes to shaping the air-gap flux density to bring it closer to a desired waveform, such as a sinusoid. For further improvements, the rotor stack can be, optionally, built with a number of axial sections, for example three, in the six-pole motor embodiment. A first axial section is built with all the laminations 175 positioned as shown in FIG. 4, a second axial section has all the laminations rotated by one pole pitch and the third (last) section has all the laminations rotated by a further one-pole pitch, i.e. two pole pitches with respect to the first section. In the example construction, the three sections are of equal length. With the dimensional proportions noted in FIG. 4 and taking into account practical effects such as flux leakage and the magnetic non-linearity of the steel, it was found that the resultant air-gap flux density waveform is quasi-sinusoidal, having, below the $23^{rd}$ harmonic order, only the $11^{th}$ and the $13^{th}$ harmonic with magnitudes larger than 5%, but nevertheless smaller than 10%, of the fundamental. Following the procedure previously described, it is possible to virtually eliminate undesirable harmonics, make the motor back emf more sinusoidal, reduce the radial forces and overall improve motor performance. Within the general scope of the invention, the selection of other relative geometrical dimensions for a lamination 175 is also possible in order to improve certain targeted aspects of motor performance, such as cogging and torque ripple.

The apertures 85, 185, 200, 210, 215 also act as barriers in the flux path of the armature reaction due to the q-axis stator current and therefore can be referred to as "q-axis flux barriers". With reference to FIG. 1 an imaginary line 220 is drawn along a radius of the rotor through the center of a pole portion 56 and of the central q-axis flux barrier 85. This line coincides with the rotor d-axis as known from the motor electromagnetic theory. Another imaginary line 225 is drawn to be perpendicular to the line 220 and intersects it at approximately the middle of the radial dimension of the side flux barrier 85. The shape and size of the flux barriers 85 can vary. For example, in one construction, the flux barriers 85 extend all the way to the rotor surface 75 facing the air-gap as shown in FIG. 3. The flux barriers 85, 185, 200, 210, 215 are typically empty but they can be filled with a non-magnetic material (such as epoxy or plastic) in order to enhance the mechanical strength of the rotor 20.

The q-axis flux barriers 85 have limited influence on the d-axis armature reaction flux path. The shape, size, position and number of the q-axis flux barriers can vary and in the preferred embodiment they are designed such that the q-axis inductance is substantially equal to the d-axis inductance of the motor 10. Furthermore, it is preferable, although not an absolute requirement that the inductance value is comparable with that of the SPM motor which is targeted for replacement. In order to achieve this objective, it was found that the total (cumulated) width of the q-axis flux barriers along the line 225 should be approximately between two (2) and four (4) times the radial width 222 of the permanent magnet 45, which in turn is substantially equal to the radial width of the slot 55. For the practical applications studied, it was found three (3) q-axis flux barriers 85, positioned approximately equidistantly in the pole portion 180, are satisfactory from a motor performance and manufacturability point of view. In one construction, each of the flux barriers 85 has a width equal to the slot width or magnet width 222.

FIG. 6 shows a plot of the magnetic flux in the cross-section of an IPM motor with arc magnets and a single flux barrier 85 per pole portion 180 operating in open-circuit. This graph, which also shows a cross-section of the stator, was produced with the use of the SPEED software PC-BDC and PC-FEA. The magnet North and South polarity are marked using the typical convention employing the capital N and S letters, respectively. The (center) pole geometrical axis 220a (see also FIG. 2) of the rotor corresponds to the magnetic rotor d-axis for which the rotor and the air-gap flux are maximum. The inter-polar geometrical axis 220b corresponds to the separation between two adjacent North and South magnetic poles.

The flux barriers 85, 185, 200, 210, 215 can be conveniently employed to design IPM motors having an unconventional saliency with the q-axis inductance smaller, or even substantially smaller, than the d-axis inductance. Such motors could be advantageous, for example, when designed for very high electromagnetic loadings and/or used with a controller that only commands the q-axis current. Another example of controller for which such a motor would be beneficial, will command a magnetizing component of the d-axis current (and not the typical demagnetizing d-axis current used with conventional IPMs) in order to, for example, enhance the stability of an open-loop system and/or take advantage of the motor reluctance torque.

FIG. 8 illustrates another design of a lamination 225 suitable for use in constructing an IPM rotor. The lamination 225 is similar to the lamination 175 of FIG. 4 with several exceptions. The shape of the apertures 230 is slightly different than the shape of the apertures 210 of FIG. 4 in order to provide, between the aperture 230 and the permanent magnet slots 55, a bridge 235 shaped such as to cause less interference with the typical magnetic flux path at open-circuit operation (see for example FIG. 6). The bridge 236 defined between the aperture 230 and the outer surface of the rotor lamination 225 is shaped to enhance the rotor magnetic and mechanical performance. In addition, the apertures 240 are open to the outer surface of the lamination, rather than closed as the apertures 215 illustrated in FIG. 4. The opening of the apertures 240 is substantially the same as the magnetically-equivalent opening of the bridge formed in between the closed apertures 215 and the outside surface of the lamination 175 of FIG. 4, provided that the bridge is fully saturated by the magnetic flux. The profile of the lower part of the apertures 240 (i.e. the surface closest to the magnet slot 55) is such as to cause less interference with the typical magnetic flux path at open-circuit operation. From a manufacturing point of view, the apertures 240 are preferable because they eliminate the need for thin bridges between apertures 215 and the outer surface and therefore enhance manufacturability and increase the life of the punching tooling. The illustrated lamination 225 includes an armature-reaction flux barrier substantially centrally positioned in each of the pole portions. The geometry of lamination 225 has a symmetrical periodical structure with an angular (circumferential) periodicity of 180 mechanical degrees, which contributes to the balancing of mechanical and magnetic forces.

FIG. 9 illustrates yet another IPM rotor lamination 245 and its features can be explained through geometrical morphism of the lamination 225 shown in FIG. 8. The apertures or flux barriers 250 of FIG. 9 each include a first end 255 that is positioned adjacent a vertex 211 of the magnet slot 55 in the respective pole portion 56 of the lamination 245. Unlike the aperture 230 of FIG. 8, the aperture 250 includes a second end 260 that is tipped in a first direction (clockwise) by an angle 265 (see for example 195 in FIG. 5) with respect to a radial line 270 that passes through the center of the lamination 245 and the vertex 211. In this construction, the radial line 270 is substantially aligned with the (center) pole geometrical axis and the rotor magnetic d-axis. The lower profile and the sides of the apertures 275a, 275b are very similar to those of apertures 240 of FIG. 8. Through the geometrical morphism the slot opening of one aperture 275a is substantially increased by the angle 265 and the slot opening of the other aperture 275b is substantially decreased by the same angle 265.

In order to minimize the effect of parasitic harmonics, such as the slotting harmonics, the value of the angle 265 is selected in a certain relationship with the number of stator slots and by taking into account other design features, such as rotor module staggering, which will be latter described. For example, the value of angle 265 can be selected as a fraction of the slot angular pitch, e.g. one-quarter, one-third, one-half or two-thirds, or can be equal to the stator slot angular pitch. A rotor core built with laminations 245 would have the flux barriers effectively skewed, while the inter-polar axes would remain in the same position as shown in FIG. 8. As a result, the motor performance would be improved and the ripple and cogging torque reduced. The apertures 275a, 275b of FIG. 9 are open to the outer surface 75 of the lamination 245, rather than closed as illustrated in FIG. 4. The apertures 275a, 275b are also shaped differently than the apertures 215 of FIG. 4. In the example shown in FIG. 9, all the apertures or flux barriers 230, 250, 275, 280 are tipped or skewed by the same angle 265 and in the same direction. In other constructions, only some of the flux barriers are skewed and/or some of the barriers are skewed with a different angle and/or in a different direction as will be discussed.

The lamination 245 of FIG. 9 includes a plurality of pole portions 56 with several of the pole portions 56 including flux barriers in the form of a central aperture or flux barrier 250 and two side apertures or flux barriers 280. Like the lamination 175 of FIG. 4 and the lamination 225 of FIG. 8, the lamination 245 of FIG. 9 includes six pole portions 56 with opposite pairs of pole portions 56 being similar to one another but different from the other pairs of pole portions 56.

The central apertures 250 are similar to the central apertures 185 of the lamination 175 of FIG. 4. The first end 255 of each of the central apertures 250 is positioned adjacent the vertex 211 or inner most point of the slot 55 of the pole portion 56. The second end 260 of the central aperture 250 is rotated in a first direction (clockwise) with respect to a radial line 270 that passes through the center of the lamination 245 and the vertex 211 of the slot 55. Thus, the central apertures 250 of FIG. 9 are tipped when compared to the central apertures 185 of FIG. 4.

Like the central apertures 250, the side apertures 280 include first ends 285 that are positioned in much the same way as the first ends of the side apertures 200 of FIG. 4. A second end 290 of each of the side apertures 280 is tipped slightly in the first direction when compared to the side apertures 200 of FIG. 4 much like the second end 260 of the central apertures 250. Thus, the spatial relationship illustrated in FIG. 4 is substantially maintained, while the orientation of the apertures 250, 280 is changed.

The first pair of pole portions 56 includes the pole portions 56 positioned at the 2 o'clock and the 8 o'clock positions in FIG. 9. The second pair of pole portions 56 includes the pole portions 56 positioned at the 12 o'clock and the 6 o'clock positions. These pole portions 56 include apertures 250, 280 having inner most ends 255, 285 arranged like the inner most ends of the apertures 185, 200 located at the 3 o'clock and 9 o'clock positions of the lamination 175 of FIG. 4. The third pair of pole portions 56 includes the pole portions 56 positioned at the 4 o'clock and the 10 o'clock positions. These pole portions 56 include apertures 250, 280 having inner most ends 255, 285 arranged like the inner most ends of the apertures 185, 200 located at the 5 o'clock and 11 o'clock positions of the lamination 175 of FIG. 4. However, the skew introduced in the lamination 245 of FIG. 9 changes the position of the outermost ends 260, 290 of the apertures 250, 280 when compared to those of the apertures 185, 200 of FIG. 4. In summary, the lamination 245 of FIG. 9 can be obtained through geometrical transformations from the lamination 175 of FIG. 4 by incorporating the skew first defined in FIG. 5 and by opening the apertures 215 and "morphing" them from the apertures or notches 240 of lamination 225 of FIG. 8.

FIG. 10 illustrates the lamination of FIG. 9 from the opposite side. As such, the apertures, 250, 280, and 230 appear to be tipped in the opposite direction. In other constructions, for the convenience and quality of manufacturing, the lamination of FIG. 10 can be punched with a separate punching tool (die) than the one used for lamination of FIG. 9.

FIG. 11 illustrates a rotor core 295 formed using the laminations 245 of FIG. 9 and arranged as illustrated in FIG. 9 and FIG. 10. The rotor core 295 includes a first core portion 300 that is formed by stacking rotor laminations 245 in a stackwise direction 33 while oriented as illustrated in FIG. 9. A second core portion 305 is formed by stacking rotor laminations 245 in a stackwise direction 33 while oriented as illustrated in FIG. 10. When the two core portions 300, 305 are assembled, the magnet slots 55 align with one another but the apertures 250, 280, and 230 are slightly misaligned. The misalignment is largest at the end toward the rotor surface 75 where the misalignment is equal to twice the value of the angle 265. By selecting the axial core length of the portion (module) 300 to be equal to the axial core length of the portion or module 305 and the value of the angle 265 to be about equal to a quarter of the stator slot pitch angle, the two module rotor construction of FIG. 11 has the effect of a single-step approximation of a one slot pitch continuous axial skew of the apertures 250, 280, and 230. This construction reduces the effect of parasitic harmonics, reduces torque ripple and improves motor performance.

Figure 12:
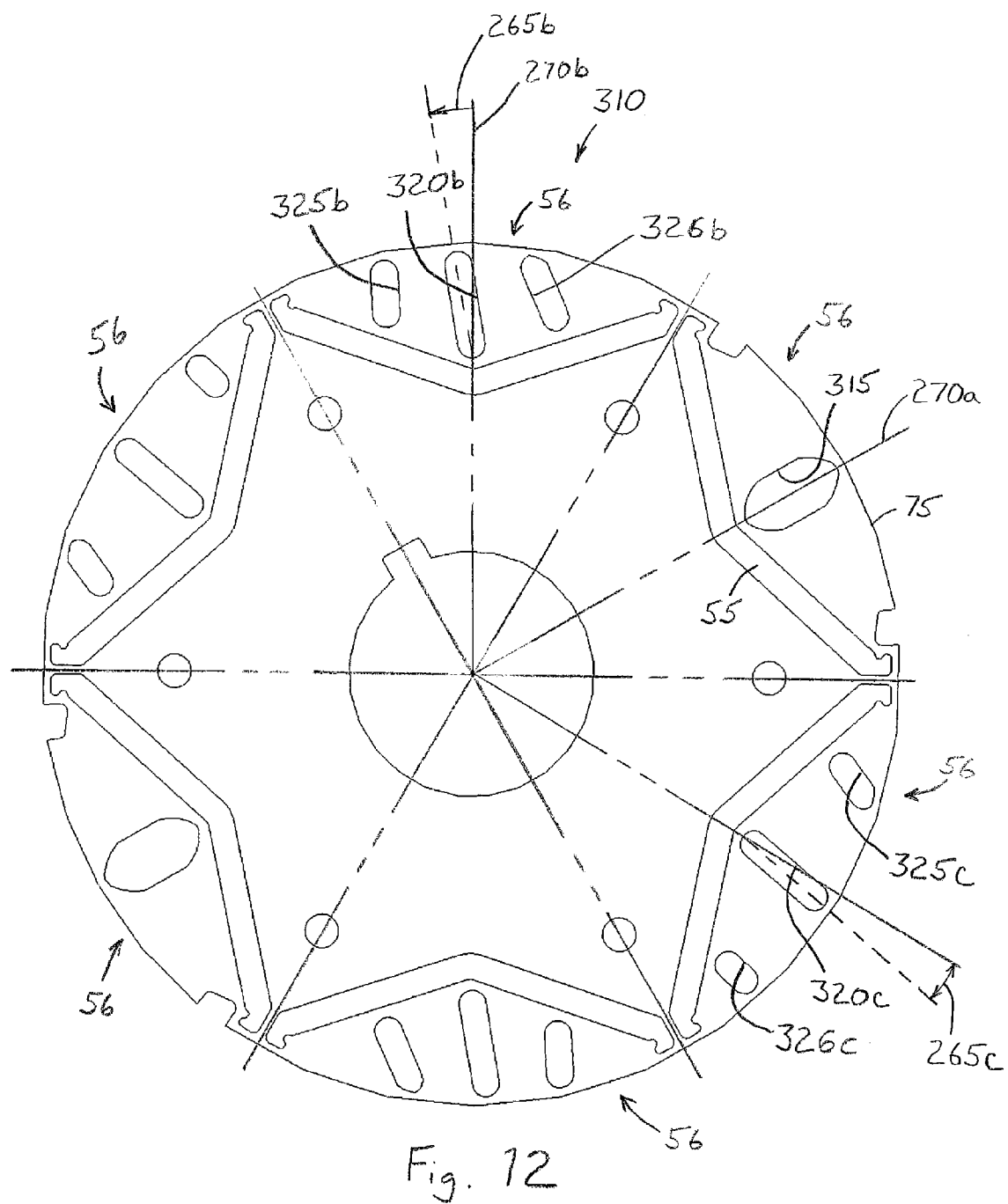
FIG. 12 is an end view of another rotor lamination of the IPM-type with flux barriers skewed in a first direction and a second direction.

FIG. 12 illustrates another lamination 310 that is similar to the lamination 175 of FIG. 4. Like the lamination 175 of FIG. 4, the lamination 310 of FIG. 12 includes six pole portions 56 with opposite pairs of pole portions 56 being similar to one another but different from the other pairs of pole portions 56. The first pair of pole portions 56 includes the pole portions 56 positioned at the 2 o'clock and the 8 o'clock positions. These pole portions 56 include an aperture 315 that is shaped like the aperture 230 of FIG. 9 but oriented like the aperture 210 of FIG. 4. Specifically, the aperture 315 is substantially aligned with the center pole radial line 270a.

The second pair of pole portions 56 includes the pole portions 56 positioned at the 12 o'clock and the 6 o'clock positions in FIG. 12. These pole portions 56 include apertures 320b, 325b, 326b arranged like the apertures 250, 280 located at the 10 o'clock and 4 o'clock positions of the lamination of FIG. 10. Specifically, the apertures 320b, 325b, 326b are tipped in a counterclockwise direction by an angle 265b with respect to a radial center line 270b.

The remaining pole portions 56 include apertures 320c, 325c, 326c that are tipped by an angle 265c in a clockwise direction with respect to a radial center line 265c and are arranged much like the apertures 250, 280 positioned at the 10 o'clock and 4 o'clock positions of the lamination 245 of FIG. 9. Thus, the lamination 310 of FIG. 12 includes pole portions 56 with non-tipped (radially-aligned) apertures 315, apertures 320b, 325b, 326b tipped in the clockwise direction, and apertures 320c, 325c, 326c tipped in the counterclockwise direction. By selecting the value of the angle 265b to be equal to the value of the angle 265c and equal to two thirds of the stator slot pitch, lamination 310 can be axially stacked to build rotor cores that have, from the flux barriers point of view, an axial skew equivalent to a two-step three-module approximation of a one stator slot pitch skew, thus reducing torque ripple and improving motor performance.

Figure 13:
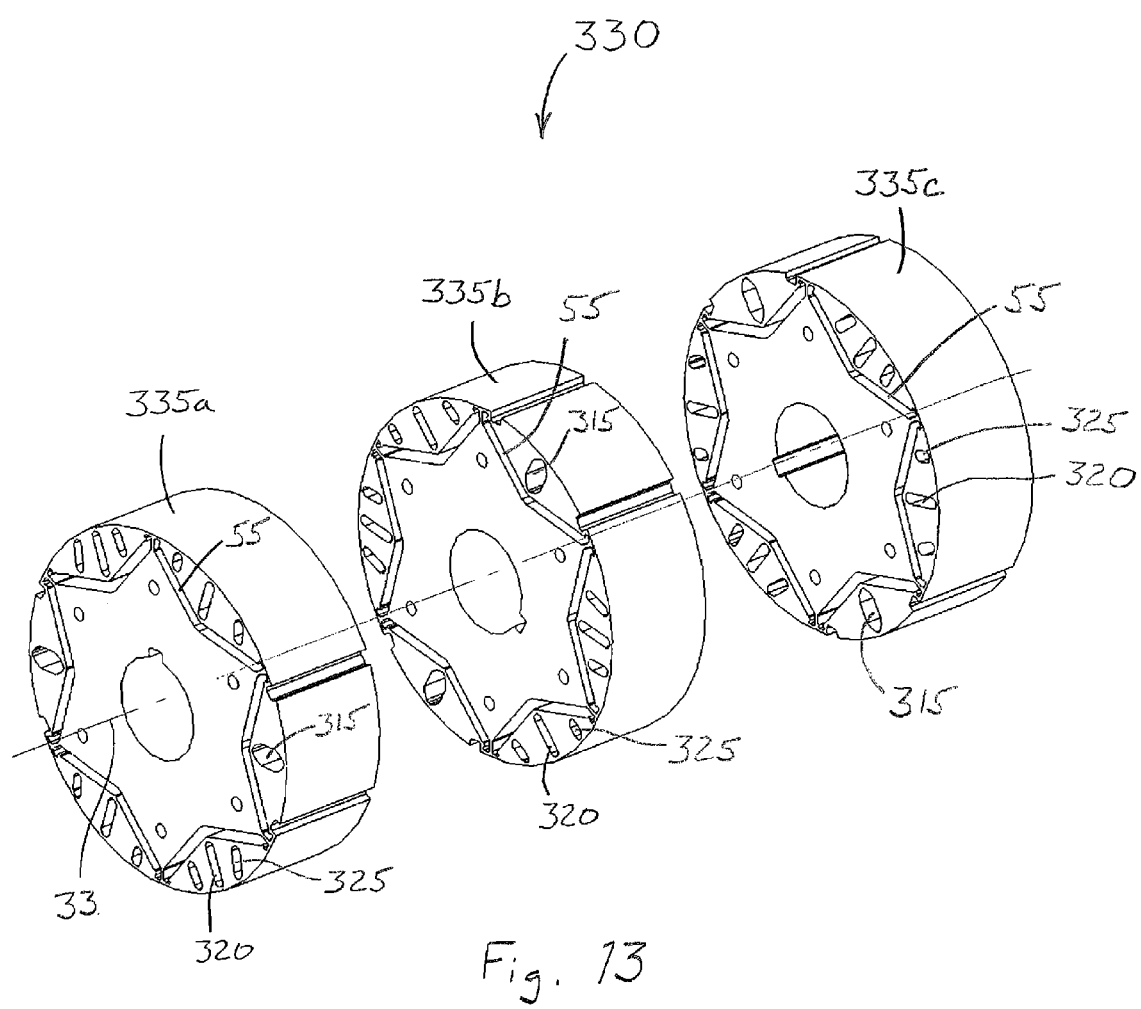
FIG. 13 is a partially exploded view of a rotor core including the laminations of FIG. 12.

FIG. 13 illustrates a rotor core 330 manufactured using the laminations 310 of FIG. 12. The rotor core 330 includes three core portions 335a, 335b, 335c each formed by stacking a number of the laminations 310 of FIG. 12 in a stackwise direction 33. In each of the core portions 335a, 335b, 335c, the laminations 310 are aligned with one another such that all of the apertures and slots are aligned. To assemble the rotor core 330, a first of the three core portions 335a is positioned adjacent a second of the three core portions 335b. The second core portion 335b is rotated two pole portions 56, i.e. 120 degrees in the clockwise direction, such that the apertures 315, 320, 325 and 55 are not aligned with one another at the interface between the first core portion 335a and the second core portion 335b. A third core portion 335c is positioned adjacent the second core portion 335b and is also rotated two pole portions 56 with respect to the second core portion 335b. Thus, the apertures 315, 320, and 325, 55 of the third core portion 335c do not align with the apertures 315, 320, and 325, 55 of the second core portion 335b, or the apertures 315, 320, 325, 55 of the first core portion 335a. Rotation by other increments of a pole portion, such as 60 or 180 degrees, may be also performed if beneficial from a manufacturing point of view. From an electromagnetic point of the view, the construction shown in FIG. 13 is advantageous because at any constant angular coordinate it integrates or averages along the axial direction the effect of different pole portion geometry on the magnetic field and global motor parameters, such as back emf and inductance, and improves motor performance, for example by reducing parasitic forces, noise and vibration. The rotor construction is well suited to be used in conjunction with stators that include windings with separated parallel paths and/or with fractional slots per pole and phase and/or asymmetries, such as flats on the outer surface of stator lamination. In FIG. 13, the core modules 335a, 335b and 335c are illustrated as being substantially thick. However, it is understood that at the lower extreme the modules can be very thin containing as little as one lamination.

Figure 14:
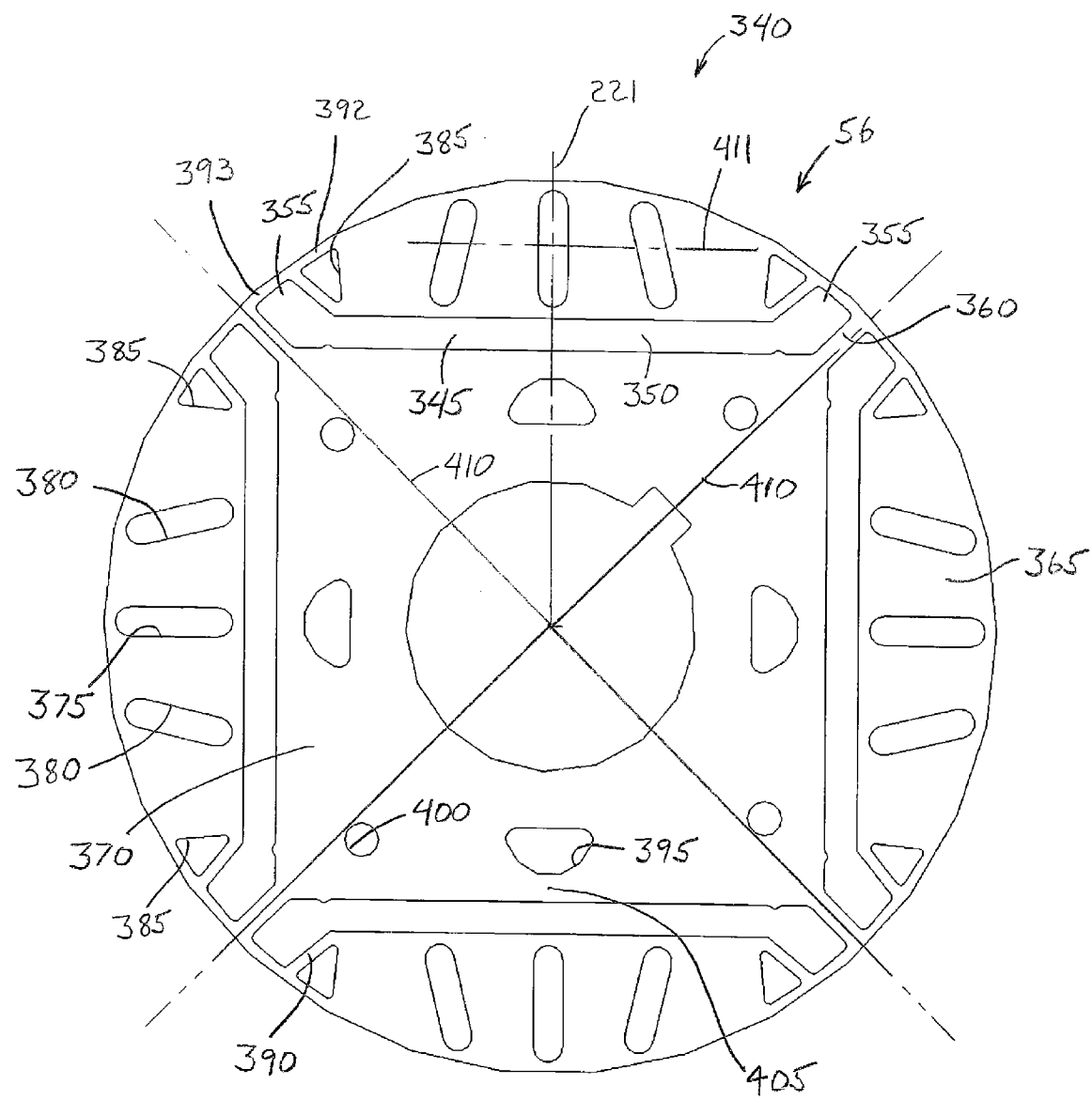
FIG. 14 is an end view of another rotor lamination of the IPM-type with flux barriers and with four magnet slots.

FIGS. 14-17 illustrate various aspects of an IPM rotor with four pole portions 56. FIG. 14 illustrates a lamination 340 for the four-pole IPM rotor. The lamination 340 includes four magnet slots 345 that are positioned to receive at least one permanent magnet or permanent magnet material. Each of the slots 345 includes an elongated portion 350 that extends across a pole portion 56 of the lamination 340 and is oriented at about ninety degrees to the adjacent slots 345. The slots 345 also include end portions 355 that are angled with regard to the elongated portions 350 and that cooperate with adjacent end portions 355 to define substantially narrow bridges 360 between the adjacent slots 355. Each of the slots 345 divides its respective pole portion 56 into an outer portion 365 and an inner portion 370.

The outer portion 365 of each pole portion 56 includes a central elongated aperture or flux barrier 375 that is positioned substantially along or coincident with a radial line. The illustrated aperture 375 is oval with other shapes also being possible. Two similarly-sized side apertures or flux barriers 380 are positioned on either side of the central aperture 375. The side apertures 380 are tipped such that their outer most ends are closer to the central aperture 375 than are the innermost ends. The positioning of the side apertures 380 is similar to the arrangement illustrated in FIG. 4. Thus, the apertures 380 also operate as flux guides concentrating the magnet flux towards the center of the rotor pole portion 56. At the same time, the apertures 375 and 380 act as flux barriers for the q-axis armature flux path. It was found that in order to produce a motor with a very low saliency, the cumulated width, measured along the line 411 that is substantial parallel to a magnet slot 345, of the apertures 375 and 380 from within one pole portion 56, has to be approximately equal to 2 to 4 times the length of the magnet slot along a radial direction 221. In other constructions, especially when used for rotors with magnetic polarities different than four, the side apertures 380 can be parallel to the apertures 375 or can be oriented outwards from the center of the rotor pole portion 56 in order to enhance the magnetic flux path.

The outer portion 365 of each pole portion 56 also includes two substantially triangularly shaped apertures 385 each positioned adjacent the end portions 355. The triangular apertures 385 function as flux barriers and cooperate with the end portions 355 to define a narrow bridge 390 therebetween. The base of the triangular apertures 385 is oriented towards the outer surface of the rotor lamination 340, thereby creating a bridge 392 that is similar to the bridge 393. In some constructions, the triangular apertures 385 are joined with the ends 355 of the magnet slot 345. It was found that a bridge 390, as shown in FIG. 14, improves the mechanical strength of the rotor lamination 340.

The inner portion 370 of each pole portion 56 may include a substantially semi-circular aperture 395 and a circular aperture 400. The semi-circular aperture 395 is positioned along the radial line that passes through the central aperture 375 of the respective pole portion 56. The semi-circular aperture 395 cooperates with the adjacent slot 345 to define a narrow bridge 405 therebetween.

The circular aperture 400 is positioned on one side of the pole portion 56 near the interface (illustrated as line 410) of an adjacent pole portion 56. The circular apertures 400 are configured to receive a connector or fastening member that facilitates the attachment of several laminations 340 to one another. For example, in one construction a tie bolt or threaded rod passes through the apertures 400 to facilitate the assembly of a rotor core using the laminations 340 of FIG. 14.

Figure 15:
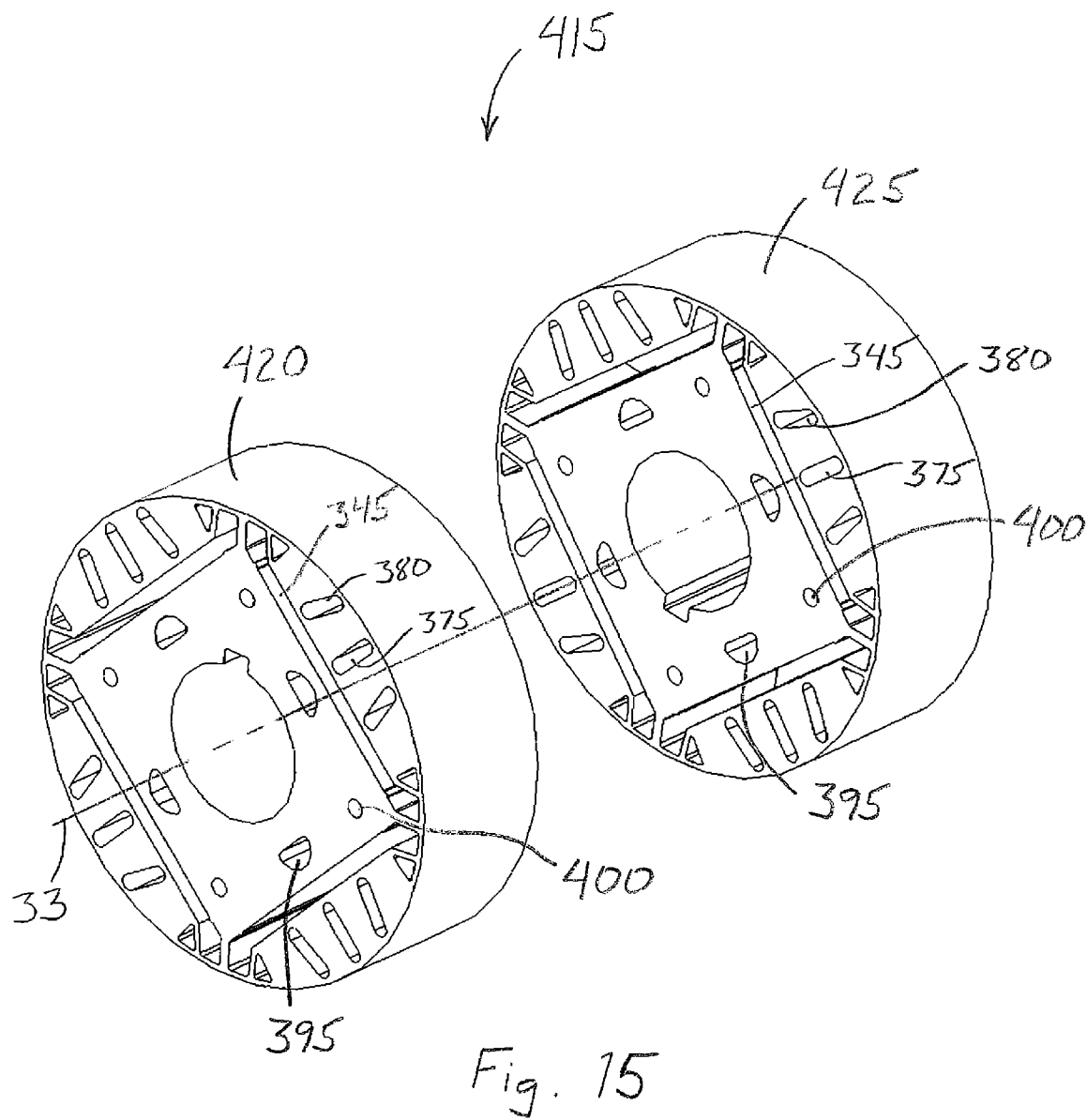
FIG. 15 is a partially exploded view of a rotor core including two portions (modules) and the laminations of FIG. 14.
Figure 76:
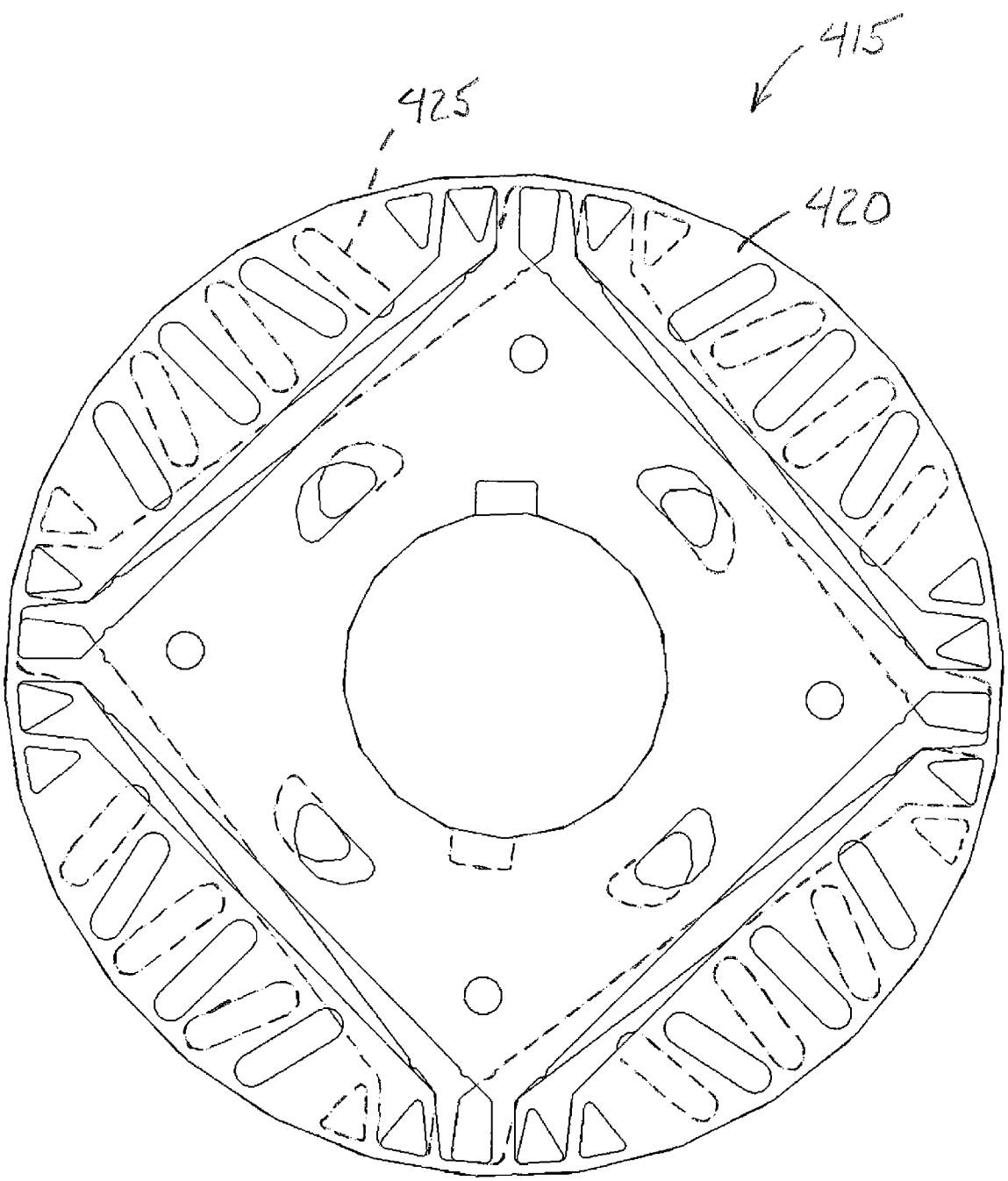

FIG. 15 illustrates a rotor core 415 that is formed using the laminations 340 of FIG. 14. The rotor core 415 includes a first core portion 420 and a second core portion 425 that are each formed by stacking the laminations 340 of FIG. 14 in a stackwise direction 33. To assemble the rotor core 415, the first core portion 420 is inverted with respect to the second core portion 425, i.e. flipped or mirrored around a plane perpendicular on the axial direction and rotated in the circumferential direction. The circular apertures 400 are then aligned with one another to allow the tie rod or bolt to pass through both the first core portion 420 and the second core portion 425. When arranged in this manner, the asymmetric positioning of the circular apertures 400 causes the slots 345, the central apertures 375, the side apertures 380, and the semicircular apertures 395 to be slightly mis-aligned at the interface between the first core portion 420 and the second core portion 425 as illustrated in FIG. 16. By selecting the angle between the aperture 400 and the axis 410 to be equal to a quarter of the stator slot pitch the resultant rotor core 415 has a step-skew angle of half a slot pitch that improves motor performance and reduces cogging and ripple torque.

Figure 17:
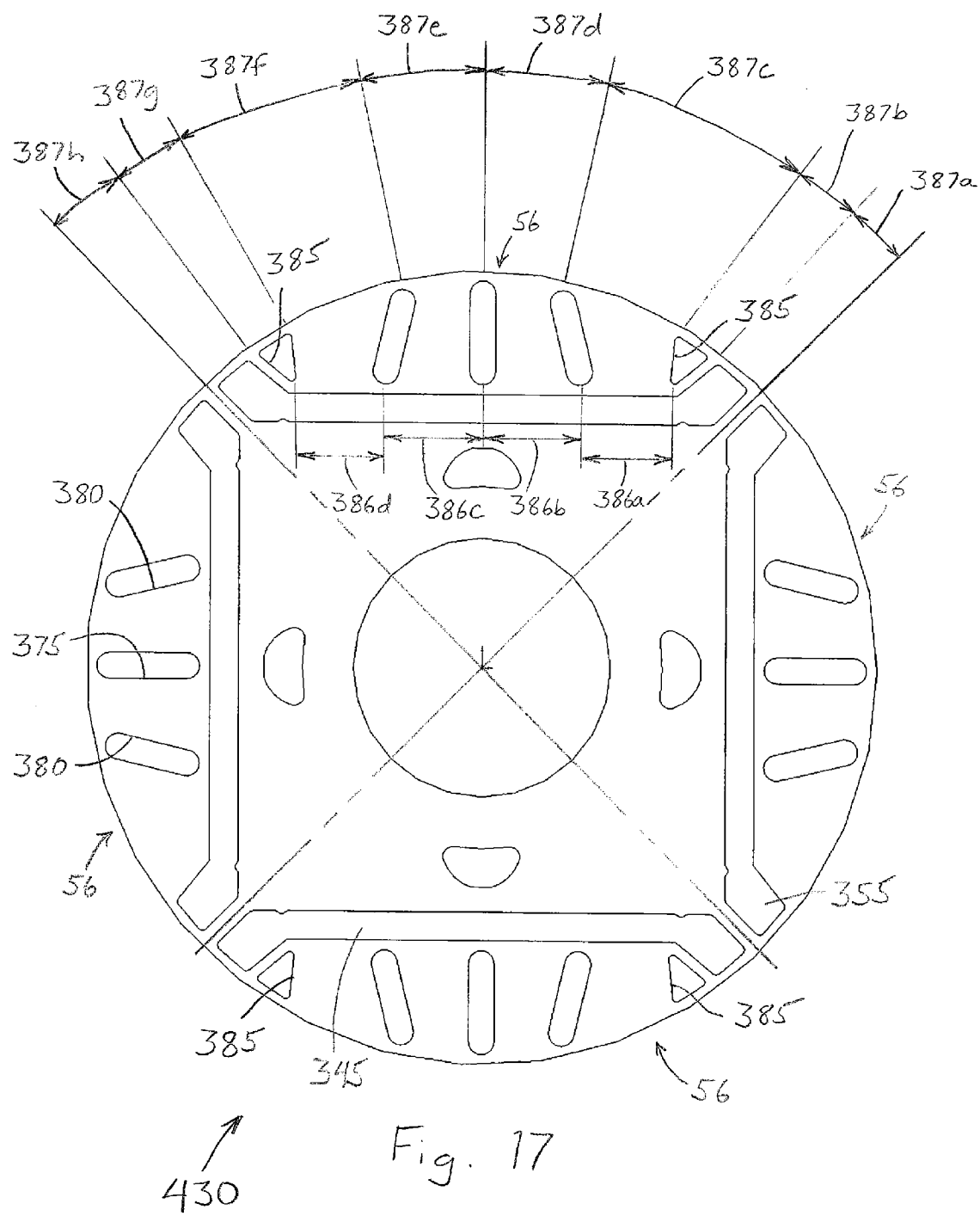
FIG. 17 is an end view of another rotor lamination of the IPM-type with flux barriers and with four magnet slots.

FIG. 17 illustrates another lamination 430 suitable for use with an IPM rotor. The lamination 430 is similar to the lamination 340 of FIG. 14 with the exception that the triangular apertures 385 in two opposite pole portions 56 are eliminated. The elimination of these two apertures 385 in two of the four pole portions 56 introduces a design controlled asymmetry in the equivalent air-gap mmf (magneto motive force), as it will be latter explained. The magnet slot 345 cooperates with the apertures 380 and 375 to define the dimensions 386a, 386b, 386c, 386d as shown. The outer surface of the pole portion 56 cooperates with the apertures 380 and 375 to define the dimensions 387a-387h as shown. The illustrated construction has a symmetry within one pole portion 56 and therefore 386a equals 386d, 386b equals 386c, 387a equals 387h, 387b equals 387g, 387c equals 387f, 387d equals 387e. The numerical values quoted in the following are in a p.u. system with reference to half of the pole portion arcuate (angular) length and half of the magnet length, respectively. The approach is similar to the one as described in relation with FIG. 4. The dimensions 387a and 387b have a direct influence on motor cogging torque and their optimal values are in a relation with the stator characteristics, more specifically with the number of slots and the slot opening. It was found that for 387a and 387b a value equal to half of the stator slot pitch reduces the cogging torque. For an example stator with twenty slots this corresponds to 7.5 mechanical degrees or 0.167 p.u. In preferred constructions, the values of 387e and 387d are substantially different then the stator slot pitch, e.g. 15 mechanical degrees or 0.334 p.u., or an integer multiple of the stator slot pitch. Through numerical calculations and practical experimentation, as it will be later described in relation to FIGS. 35-38, it was found that the preferred values of 386a, 386b, 386c, and 386d being equal to 0.5 p.u., 387a, 387b, 387g, and 387h being equal to 0.167 p.u., 387c and 387f being equal to 0.391 p.u., and 387d and 387e being equal to 0.275 p.u., improve the harmonic content of the motor electromagnetic field, make the back emf waveform more sinusoidal, reduce ripple and cogging torque, reduce noise and vibration and enhance motor performance. Variations in a range of plus and minus 10 percent from the previously quoted relative dimensions, as well as relatively small variations of shape, are of course possible. It is noted that because the geometry of the lamination 430 and, consequently, the magnetic field distribution, is different in between a North and a South pole, in the preferred construction this lamination is employed in rotor cores with two axial modules as shown in FIG. 18.

Figure 18:
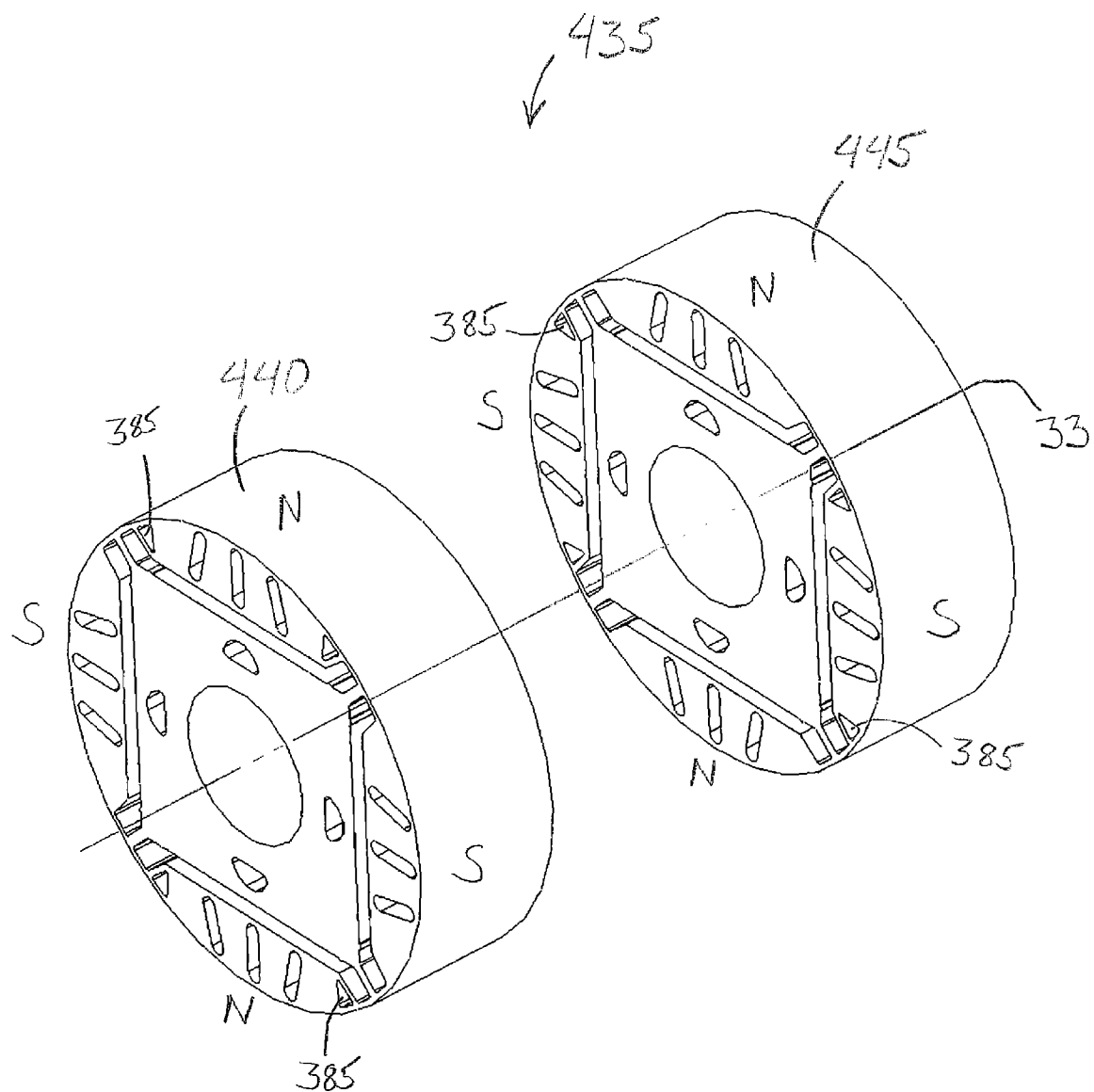
FIG. 18 is a partially exploded view of a rotor core including the laminations of FIG. 17.

FIG. 18 illustrates a rotor core 435 formed from the laminations 430 of FIG. 17. Several of the laminations 430 are stacked in a stackwise direction 33 such that the apertures and magnet slots are aligned to define a first core portion 440. A second core portion 445 is formed in much the same way as the first core portion 440 and is attached to the first core portion 440. The second core portion 445 is rotated one pole portion, or 90 degrees such that the triangular apertures 385 do not align with one another at the interface of the first core portion 440 and the second core portion 445. Also illustrated in FIG. 18 is the resultant N(orth) and S(outh) 4-pole rotor magnetic polarity, provided that one magnet is employed per each rotor slot. The construction is beneficial because, from an axial averaging point of view, it creates North and South poles with similar configuration and performance, balancing the magnetic forces and eliminating parasitic harmonics from the motor performance and parameters, such as back emf and inductance. To further enhance motor performance, this construction can be used with core modules 440 and 445 of equal axial length and a staggered (step)-skew as described with reference to FIG. 15.

Figure 19:
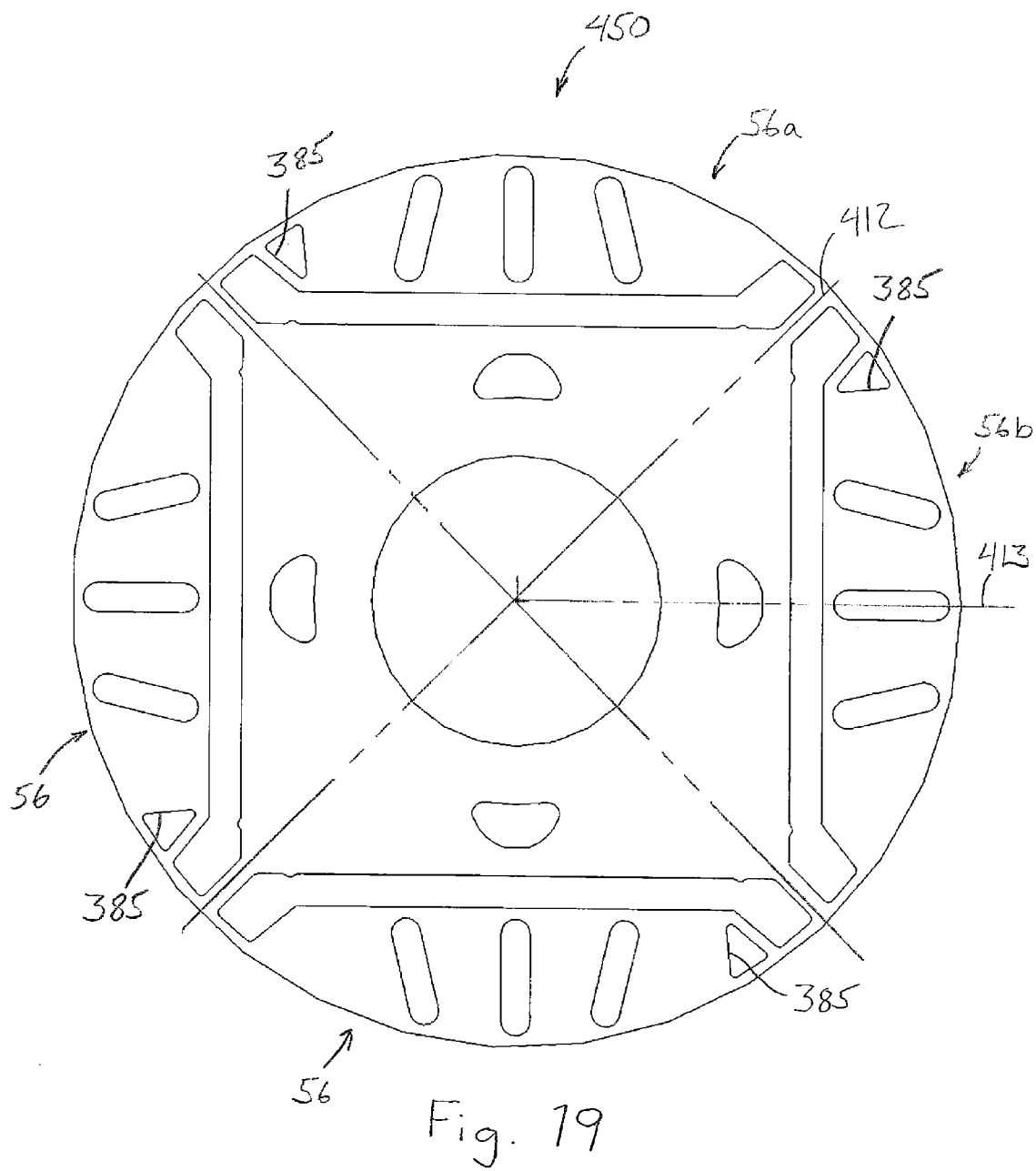
FIG. 19 is an end view of another rotor lamination of the IPM-type with flux barriers and with four magnet slots.

FIG. 19 illustrates another lamination 450 similar to the lamination 430 of FIG. 17. However, rather than eliminating both triangular apertures 385 from two of the pole portions 56, the desired magnetic asymmetry is introduced on a per pole-portion basis by eliminating one of the triangular apertures 385 in each of the pole portions 56. Thus, the pole portions 56 are structurally the same and two adjacent pole portions 56a and 56b are magnetically symmetric with respect to an axis 412. Within one pole portion 56b one half is different from the other half when separated by an imaginary center line 413.

Figure 20:
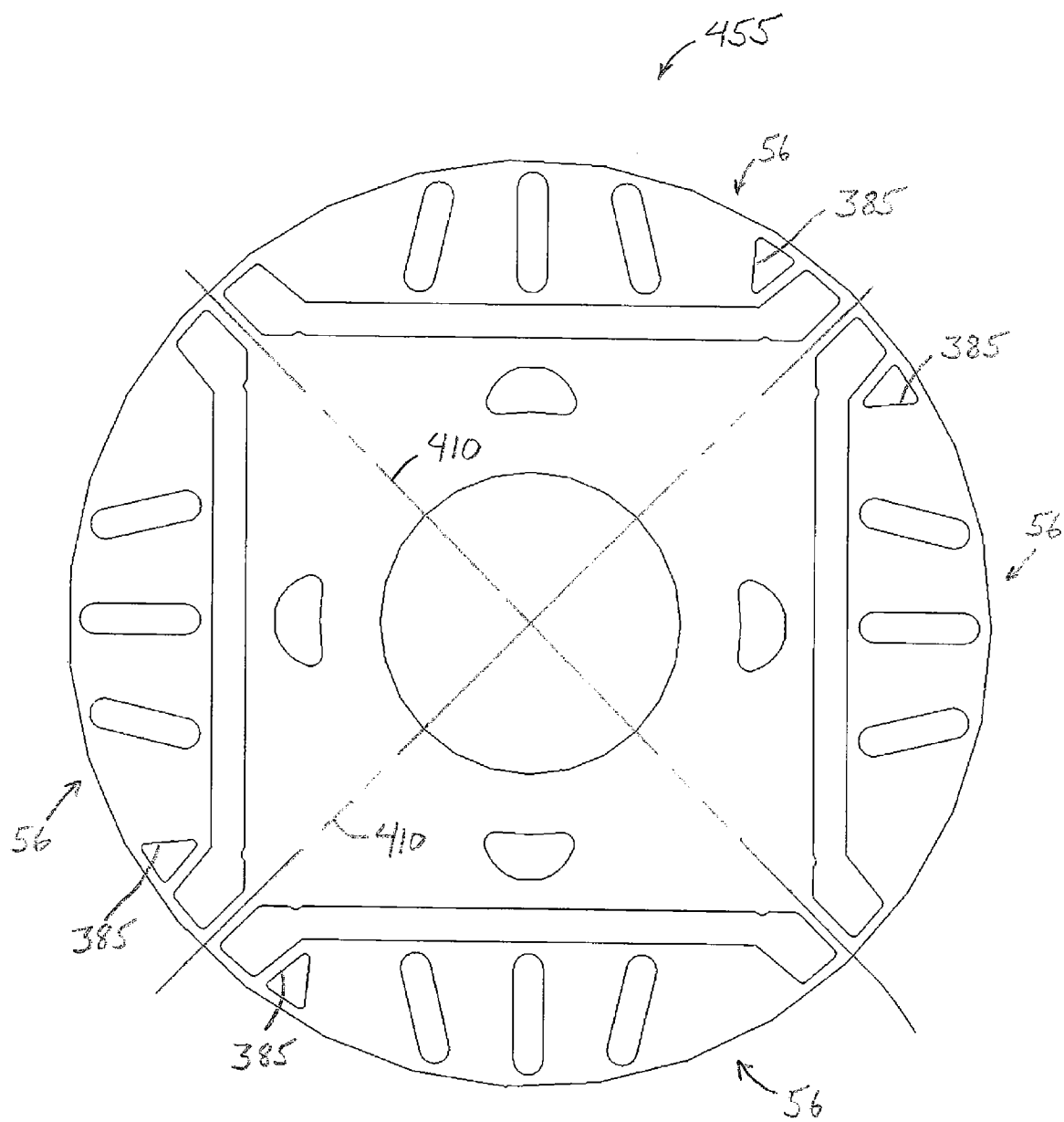
FIG. 20 is an end view of yet another rotor lamination of the IPM-type with flux barriers and with four magnet slots.

FIG. 20 illustrates another lamination 455 similar to the lamination 430 of FIG. 17. However, rather than eliminating both triangular apertures 385 from two of the pole portions 56, the desired magnetic asymmetry is introduced by eliminating one of the triangular apertures 385 in each of the pole portions 56. The triangular apertures 385 are eliminated in a pattern that results in the triangular apertures 385 being positioned adjacent one another. As such, two interfaces 410 between adjacent pole portions 56 include two triangular apertures 385 immediately adjacent the interfaces 410 and the remaining two interfaces 410 have no triangular apertures 385 adjacent them. As with other rotor lamination constructions previously described, the lamination 450 of FIGS. 19 and 455 of FIG. 20 have a symmetrical periodical structure with an angular (circumferential) periodicity of 180 mechanical degrees, which contributes to the balancing of mechanical and magnetic forces.

Figure 21:
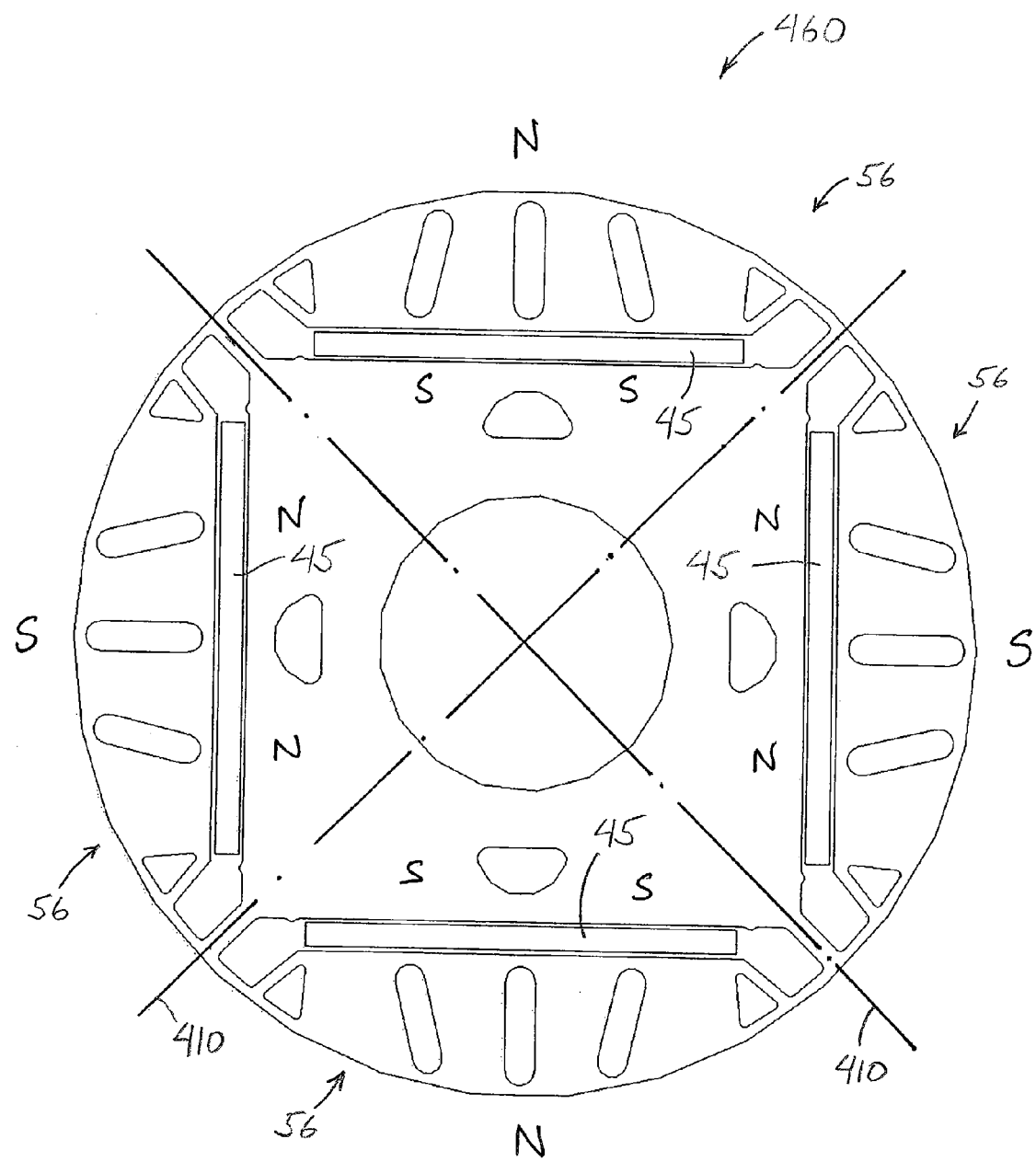
FIG. 21 is an end view of a rotor core including the laminations of FIG. 14 and with permanent magnets arranged to produce four magnetic poles.

FIGS. 21-25 illustrate rotor core portions assembled from laminations 340 similar to that illustrated in FIG. 14 (without the circular through holes 400) and including magnets 45 arranged to produce a rotor having a desired polarity. For example, FIG. 21 illustrates a rotor core 460 that includes magnets 45 arranged such that each pole portion 56 defines a single polarity, and adjacent pole portions 56 have opposite polarities. Thus, FIG. 21 illustrates a four-pole core 460 in which each pole portion 56 defines a magnetic pole.

Figure 22:
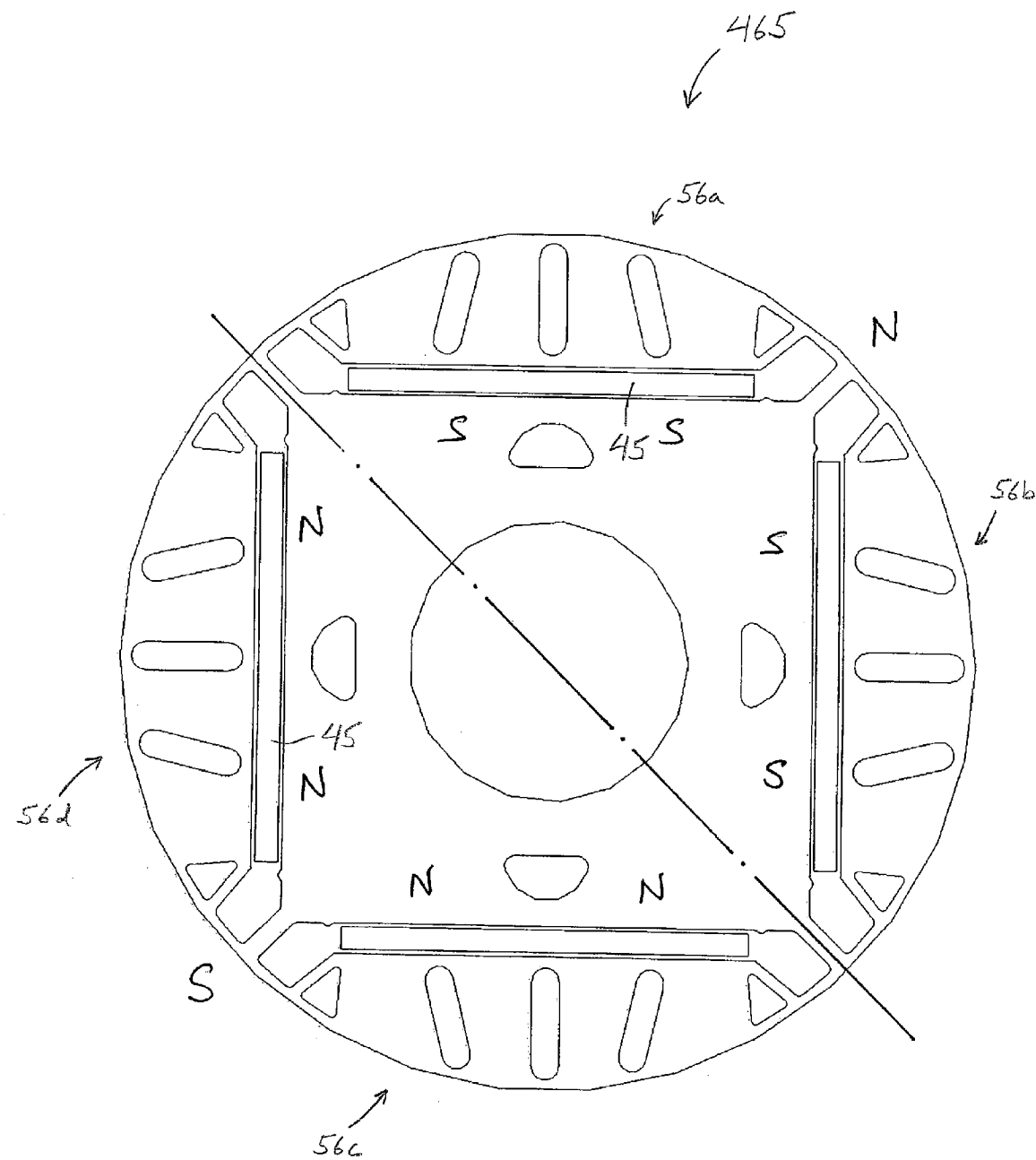
FIG. 22 is an end view of a rotor core including the laminations of FIG. 14 and with permanent magnets arranged to produce two magnetic poles.

In the construction of FIG. 22, two adjacent pole portions 56a, 56b include magnets 45 arranged to define the same polarity with the remaining two pole portions 56c, 56d including magnets 45 arranged to define the opposite polarity. Thus, the construction of FIG. 22 defines a two-pole rotor core 465.

Figure 23:
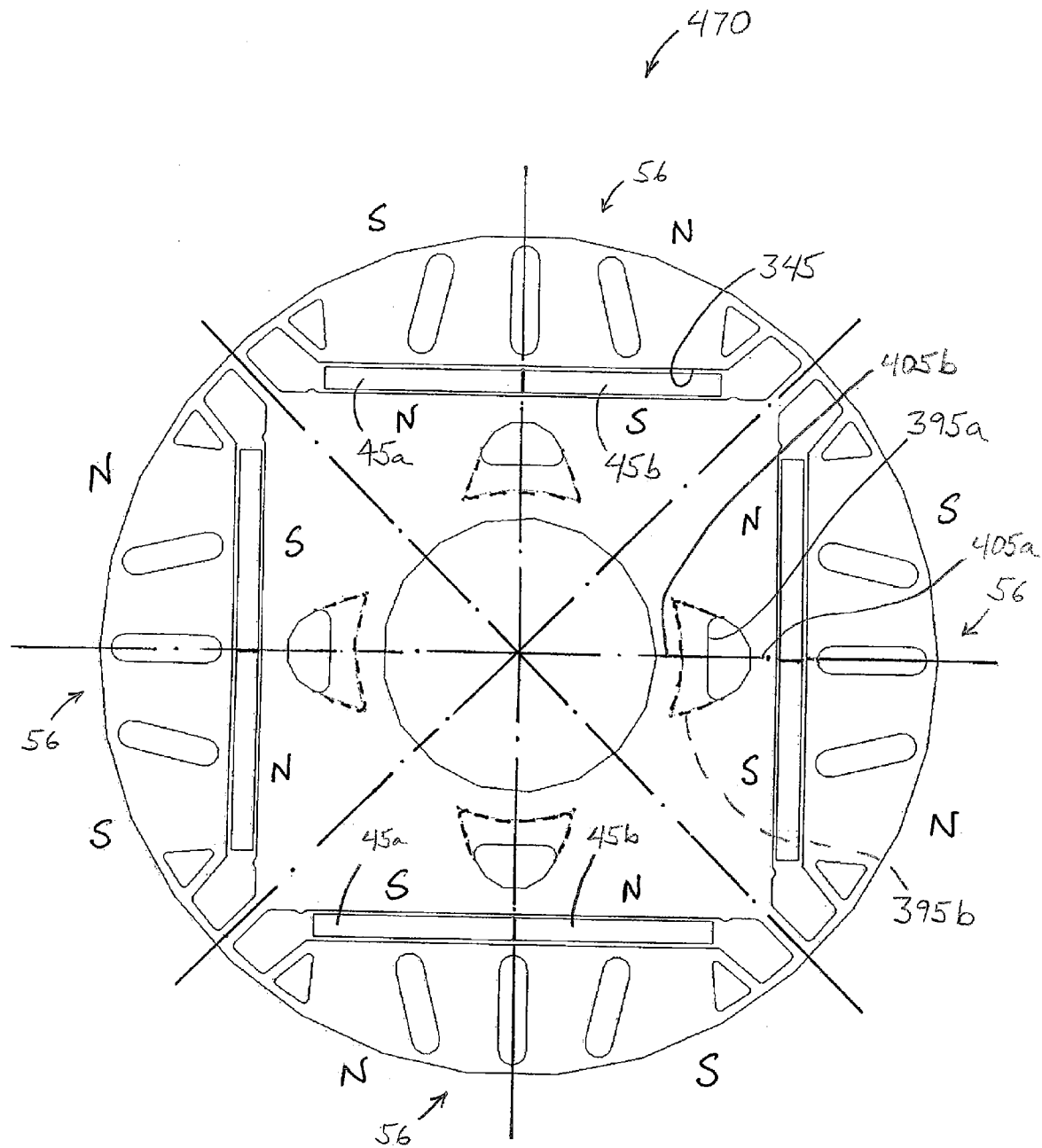
FIG. 23 is an end view of a rotor core including the laminations of FIG. 14 and with permanent magnets arranged to produce eight magnetic poles.

The construction of FIG. 23 includes two separate magnets 45a, 45b positioned in each magnet slot 345 and oriented in the opposite polarity. Thus, each pole portion 56 defines two magnetic poles and the rotor core 470 includes eight magnetic poles. Virtually the same magnetic performance can be achieved with a single magnet block occupying the entire magnet slot 345, i.e. the same physical space as magnet 45a plus magnet 45b, and magnetized with opposite polarity at the two ends. A semi-circular aperture 395a is placed below the magnet slot 345 to define a bridge 405a and a bridge 405b towards the shaft bore. The shape and the size of the aperture 395a is designed in order to enhance the magnetic flux path for a desired magnetic polarity of the rotor. Thus, in some situations a larger kidney-shaped aperture 395b as illustrated in dashed lines is employed. In still other situations, it may be desirable to eliminate some of the kidney-shaped apertures. For example, in the Construction of FIG. 25, it would be desirable to employ the largest kidney-shaped apertures 395b at the twelve o'clock and the six o'clock position, while employing the smallest kidney-shaped apertures at the three o'clock and 9 o'clock positions. In fact, it is preferred that the kidney-shaped apertures be omitted altogether at the three o'clock and 9 o'clock positions.

Figure 24:
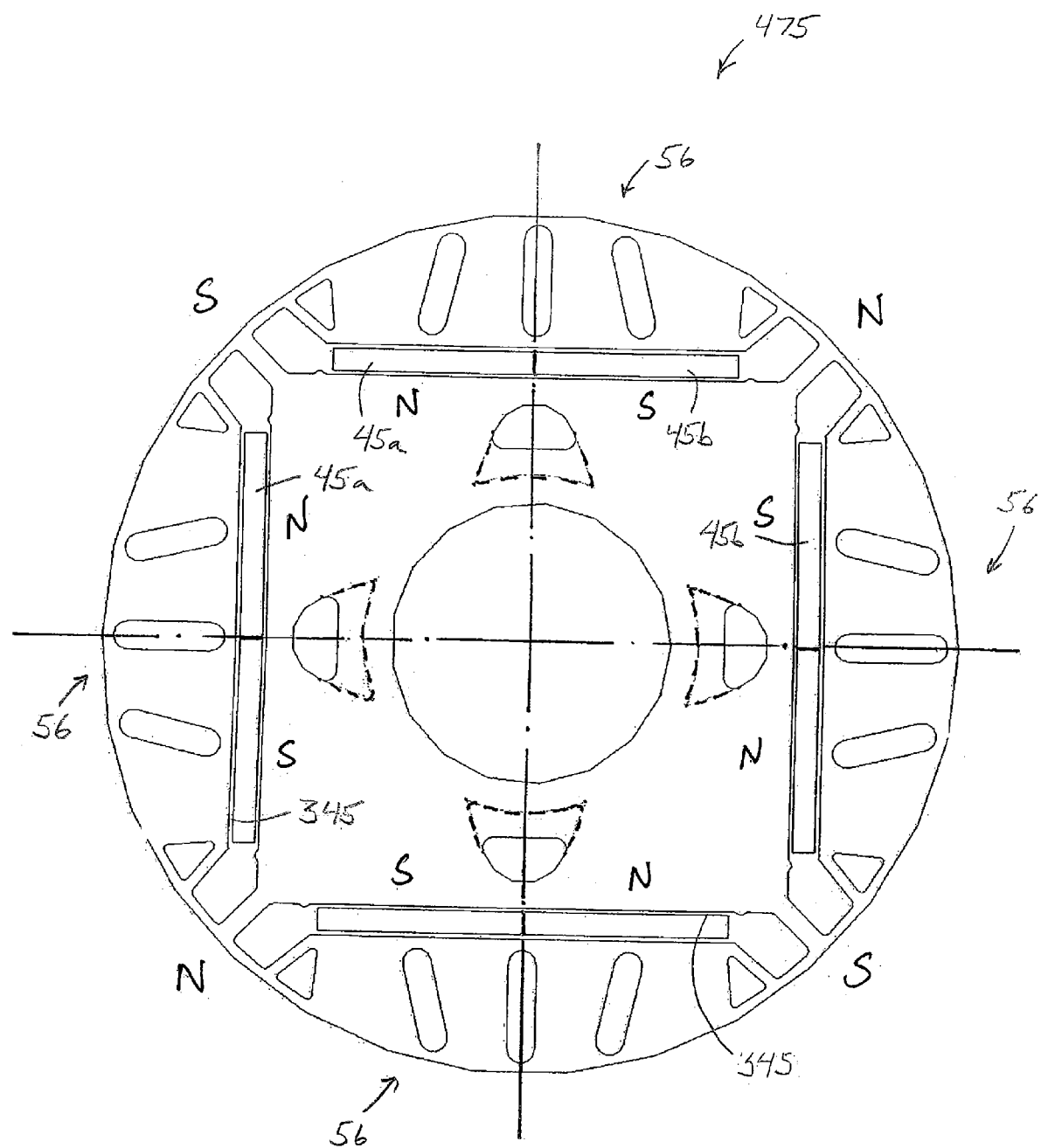
FIG. 24 is an end view of a rotor core including the laminations of FIG. 14 and with permanent magnets arranged to produce four magnetic poles.

FIG. 24 illustrates another construction arranged to produce a four-pole rotor core 475. In this arrangement, the magnet slots 345 of each pole portion 56 each include two magnets 45a, 45b arranged with the opposite polarity. The adjacent magnets 45b in the adjacent pole portions 56 are arranged such that the magnet 45b nearest the first pole portion 56 is arranged with the same polarity as the closest magnet 45b in the first pole portion 56. Thus, the pole portions 56 cooperate with adjacent pole portions 56 to define a magnetic pole of the rotor core 475. Each pole portion 56 defines half of two different magnetic poles with each half cooperating with the adjacent half of the adjacent pole portion 56 to complete the magnetic pole. This arrangement includes four magnetic poles.

Figure 25:
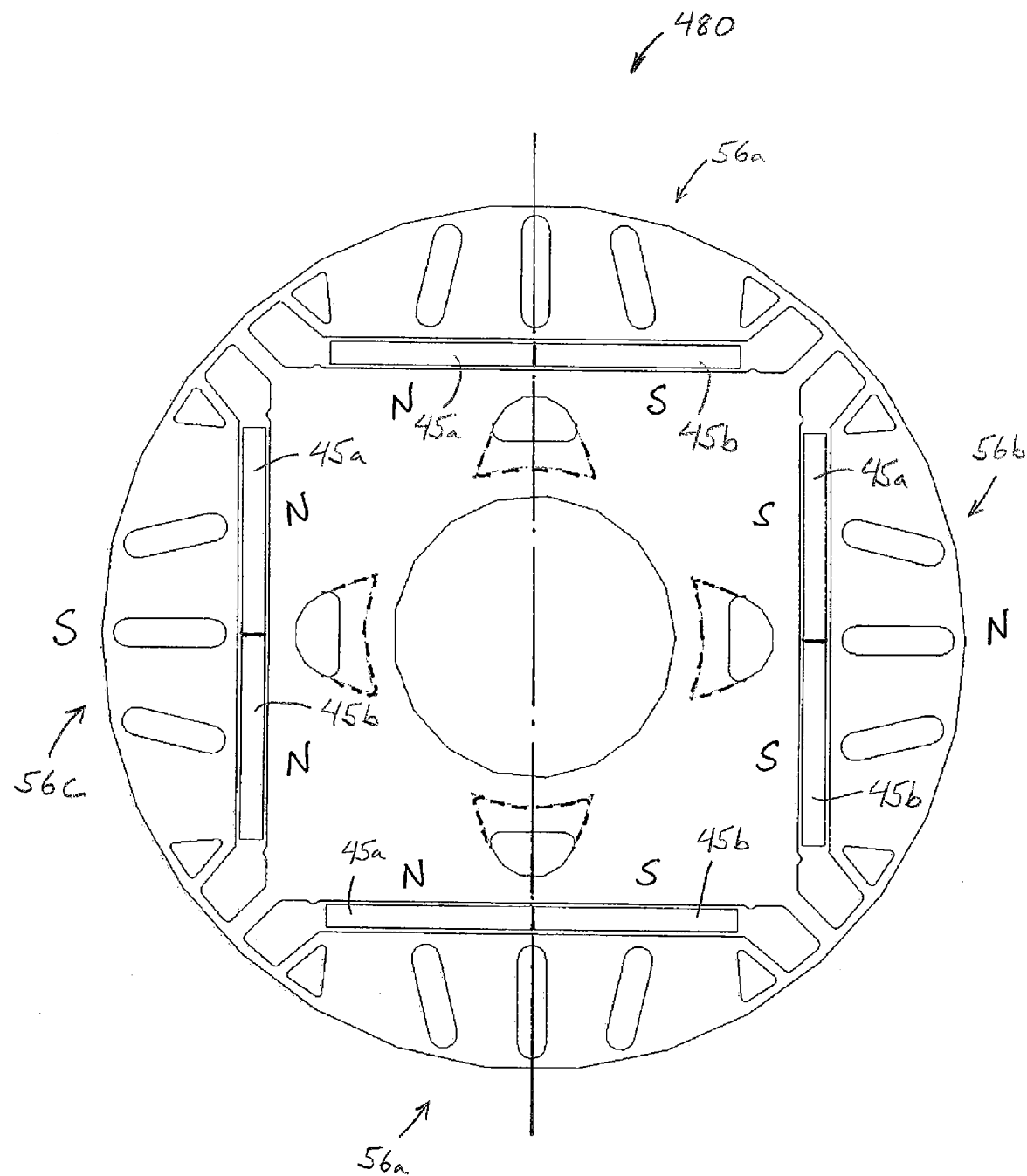
FIG. 25 is an end view of a rotor core including the laminations of FIG. 14 and with permanent magnets arranged to produce two magnetic poles.

FIG. 25 illustrates another arrangement of a rotor core 480 in which the magnets 45a, 45b are arranged to define two magnetic poles. In this construction, two opposite pole portions 56a include magnets arranged with the opposite polarity. A first of the remaining two pole portions 56b includes two magnets 45a, 45b arranged with a first polarity with the second of the remaining two pole portions 56c including two magnets 45a, 45b arranged with a second polarity opposite the first polarity. The magnets 45a, 45b are arranged such that they have the same polarity as the adjacent magnets 45a, 45b in the adjacent pole portions 56. Thus, one full pole portion 56 cooperates with half the adjacent two pole portions 56 to define one of the two magnetic poles.

Figure 26:
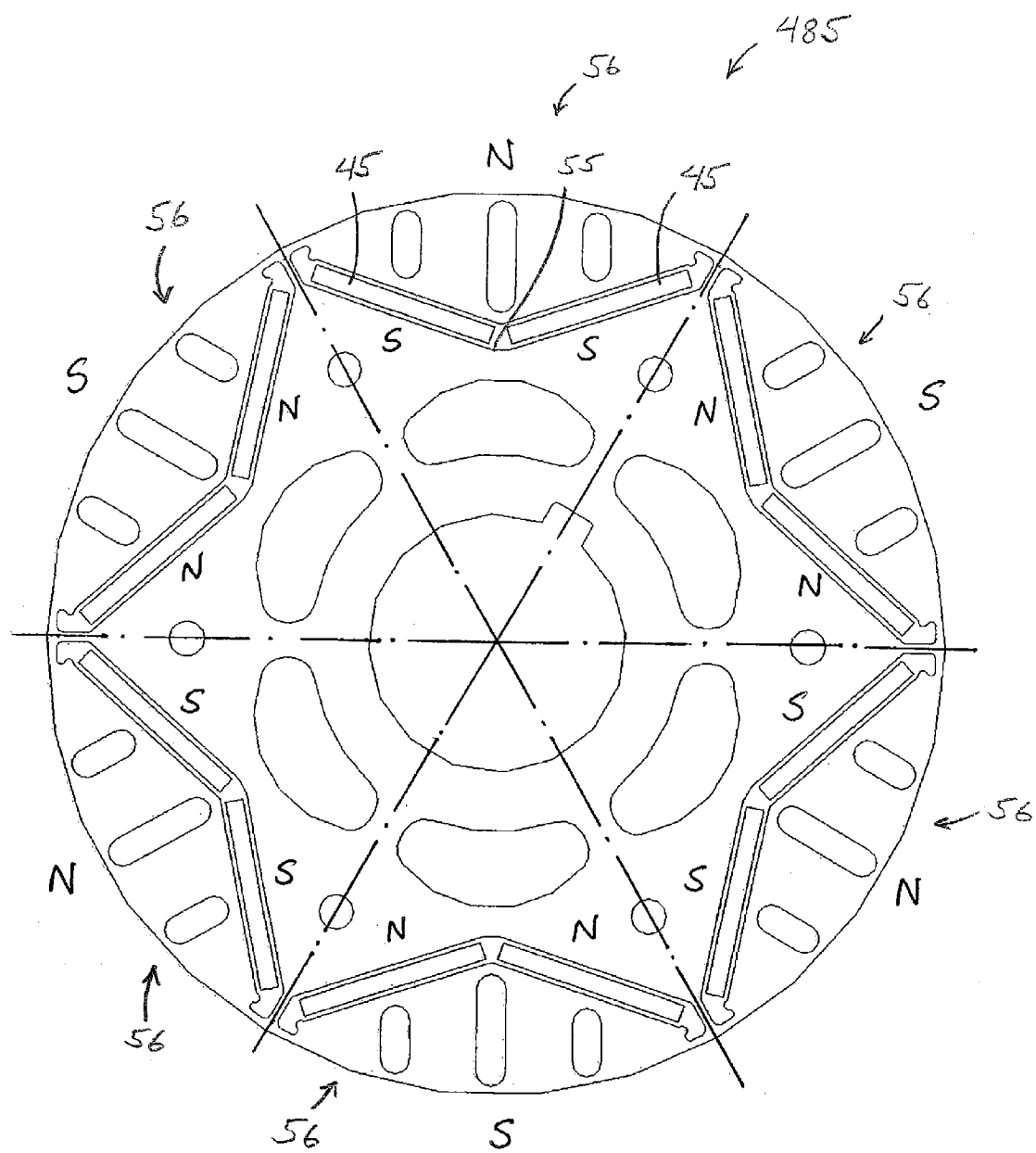
FIG. 26 is an end view of a rotor core including the laminations of FIG. 1 and with permanent magnets arranged to produce six magnetic poles.

FIGS. 26-30 illustrate rotor cores formed from laminations 50 similar to the one illustrated in FIG. 1. The rotor cores include magnets 45 arranged such that the six pole portions 56 define the desired quantity of magnetic poles. For example, FIG. 26 illustrates a construction in which each pole portion 56 defines a magnetic pole. Two magnets 45 are positioned in each magnet slot 55 with the same polarity to define the six magnetic poles of the rotor core 485.

Figure 27:
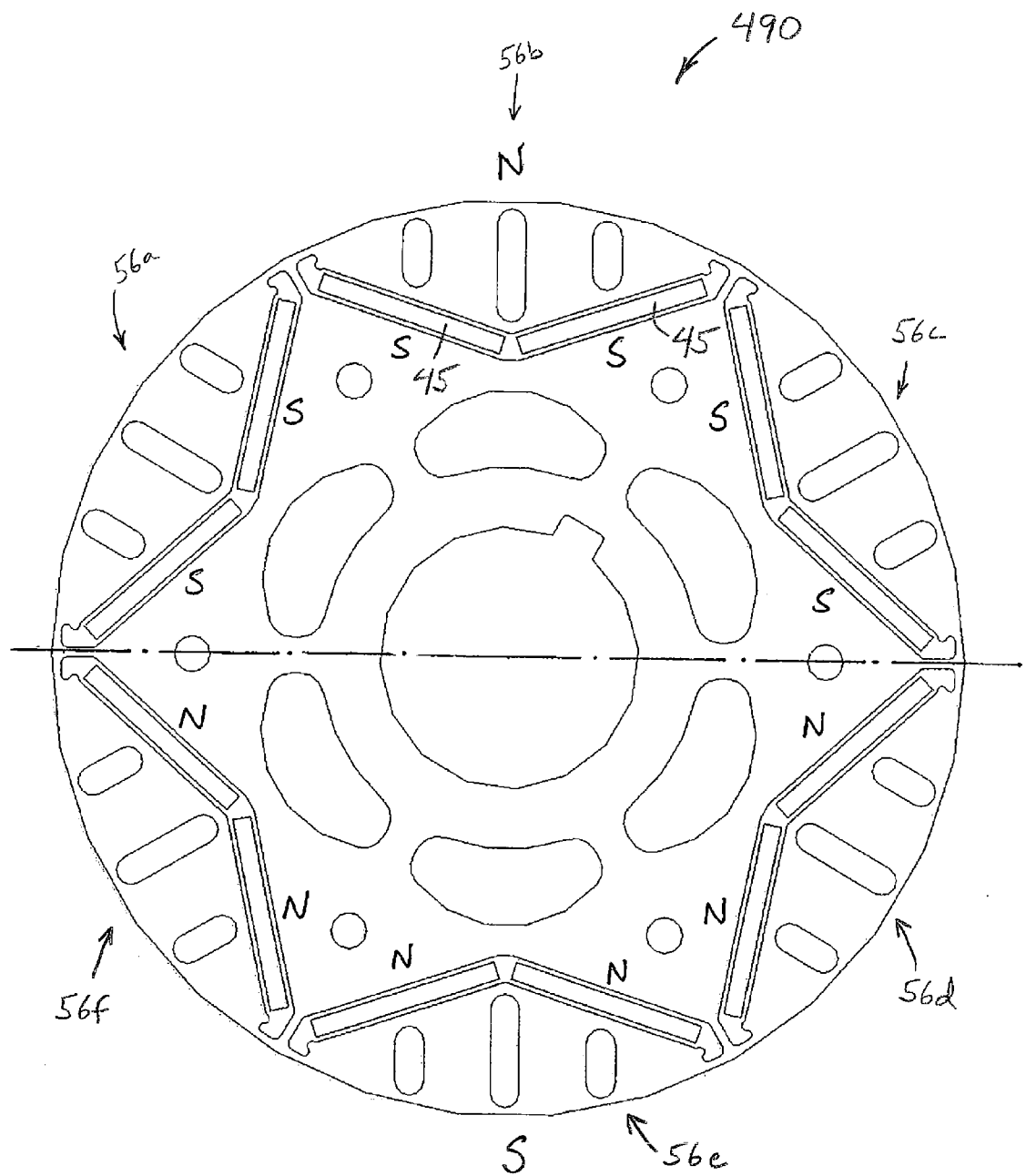
FIG. 27 is an end view of a rotor core including the laminations of FIG. 1 and with permanent magnets arranged to produce two magnetic poles.

FIG. 27 illustrates a rotor core 490 arranged to define a two-pole rotor. In this construction, three sequential pole portions 56a, 56b, 56c include magnets 45 arranged with the same polarity. The three remaining pole portions 56d, 56e 56f include magnets 45 arranged with the opposite polarity to define the opposite pole. Thus, each magnetic pole of the rotor core 490 is defined by the cooperation of three pole portions 56. As mentioned before, at least some of the kidney shaped apertures placed between the magnet slots and the shaft bore can be omitted (eliminated) and/or reshaped and/or repositioned in order to improve the 2-pole magnetic flux path.

Figure 28:
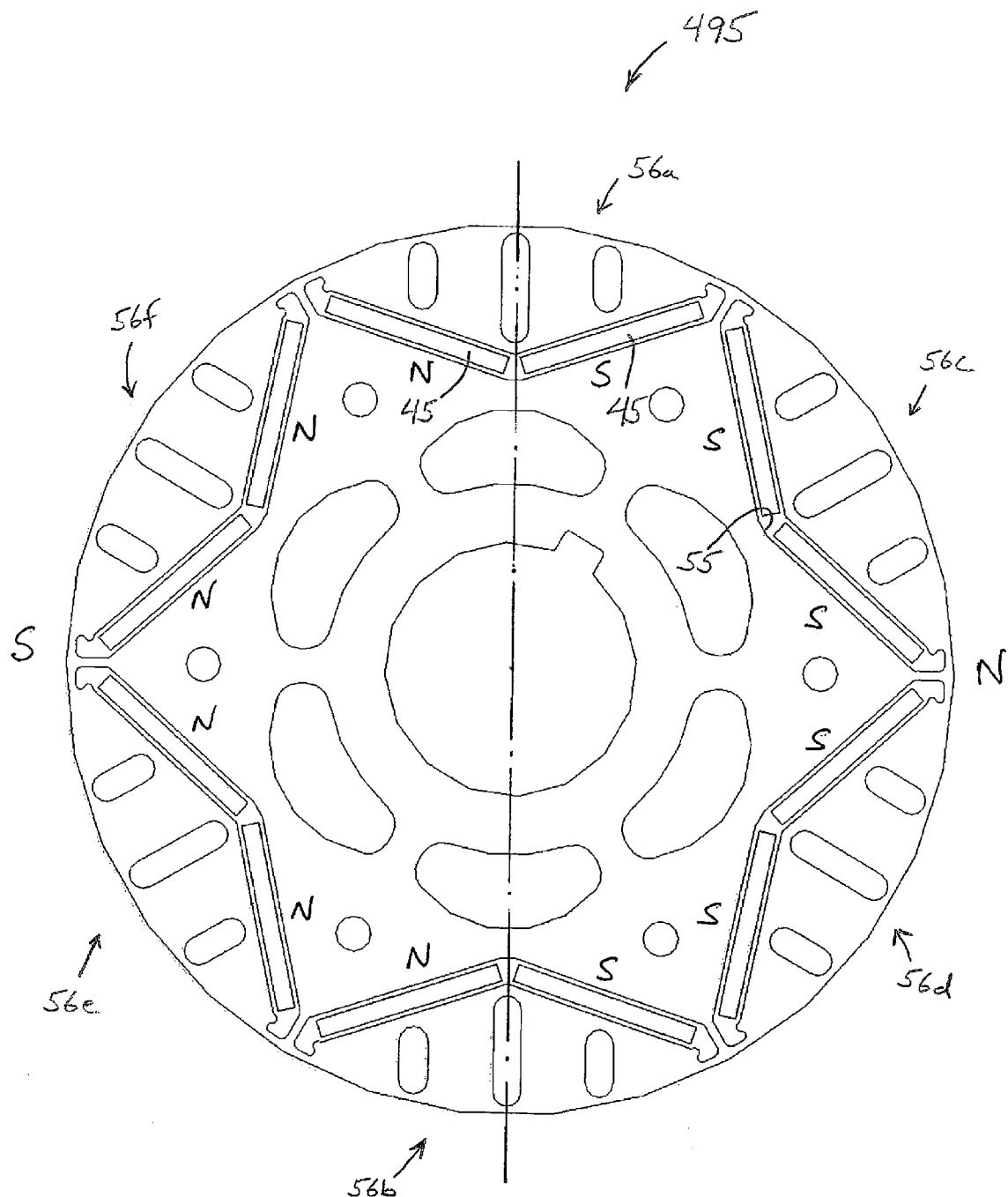
FIG. 28 is an end view of a rotor core including the laminations of FIG. 1 and with permanent magnets arranged to produce two magnetic poles.

FIG. 28 illustrates another rotor core 495 arranged to define a two-pole rotor. In this construction, two opposite pole portions 56a, 56b include magnets 45 arranged in their respective slots 55 with opposite polarities. Two of the remaining four pole portions 56c, 56d are arranged with magnets 45 oriented at a first polarity, with the remaining two pole portions 56e, 56f arranged for the opposite polarity. The two pole portions 56c, 56d arranged with the first polarity cooperate with half of the two adjacent pole portions 56a, 56b to define the first magnetic pole. The two pole portions 56e, 56f arranged with the second polarity cooperate with the remaining halves of the two adjacent pole portions 56a, 56b to define the second magnetic pole.

Figure 29:
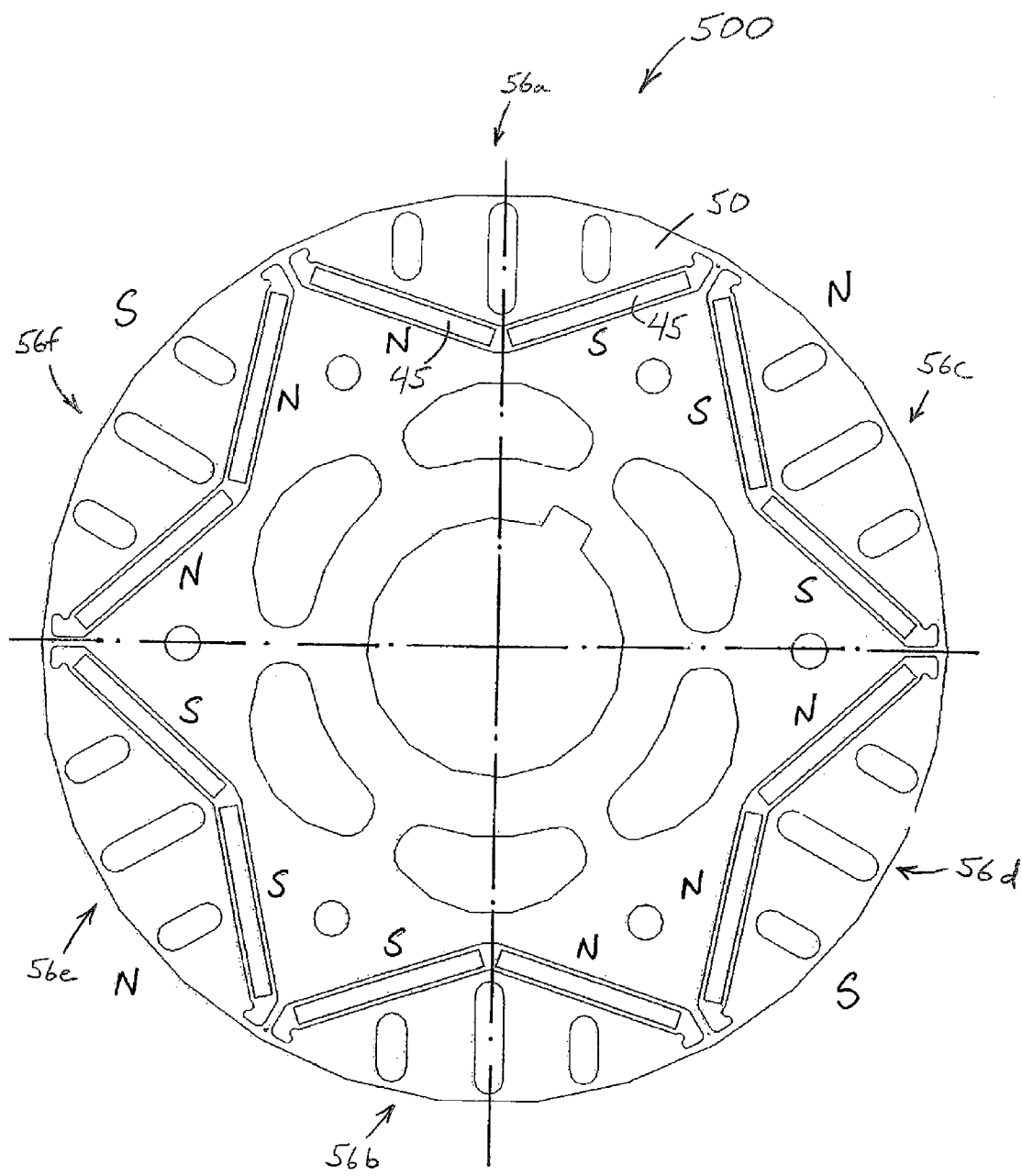
FIG. 29 is an end view of a rotor core including the laminations of FIG. 1 and with permanent magnets arranged to produce four magnetic poles.

FIG. 29 illustrates a rotor core 500 that defines four magnetic poles and employs laminations 50 that include six pole portions 56. In this construction, one and one-half pole portions 56 are employed to define each magnetic pole. Thus, two pole portions 56a, 56b are arranged with both magnets 45 having a first polarity, two pole portions 56c, 56d are arranged with both magnets 45 having the opposite polarity, and two pole portions 56e, 56f are arranged with magnets 45 having opposite polarities. The magnets 45 are arranged in groups of three having the same polarity to define four magnetic poles.

Figure 30:
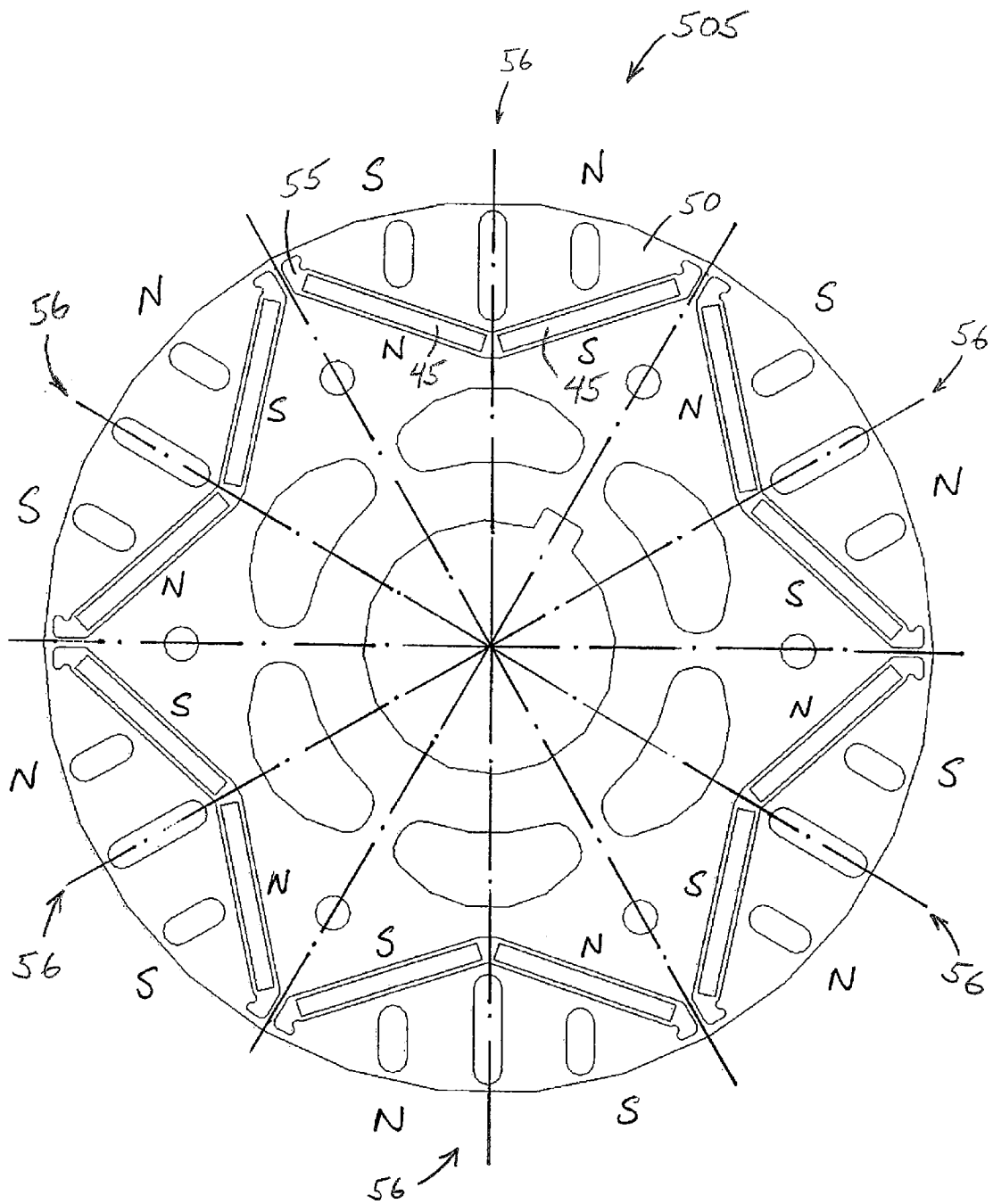
FIG. 30 is an end view of a rotor core including the laminations of FIG. 1 and with permanent magnets arranged to produce twelve magnetic poles.

FIG. 30 illustrates a rotor core 505 that defines twelve magnetic poles and employs laminations 50 that include six pole portions 56. In this construction, each magnet slot 55 includes two magnets 45 arranged with the opposite polarity. Thus, each pole portion 56 defines two magnetic poles. The concepts previously described can be further applied to produce twenty four magnetic poles by using the core 505, four magnets per each magnet slot and taking advantage of the potential pole separation enabled by the central pole-portion and side pole-portion apertures or flux barriers. In principle, the maximum number of rotor magnetic poles that can be produced using a laminated core with flux barriers positioned in between the interior magnet slot and the rotor outer surface is equal to the number of flux barriers per each pole-portion plus one times the number of pole-portions.

Figure 31:
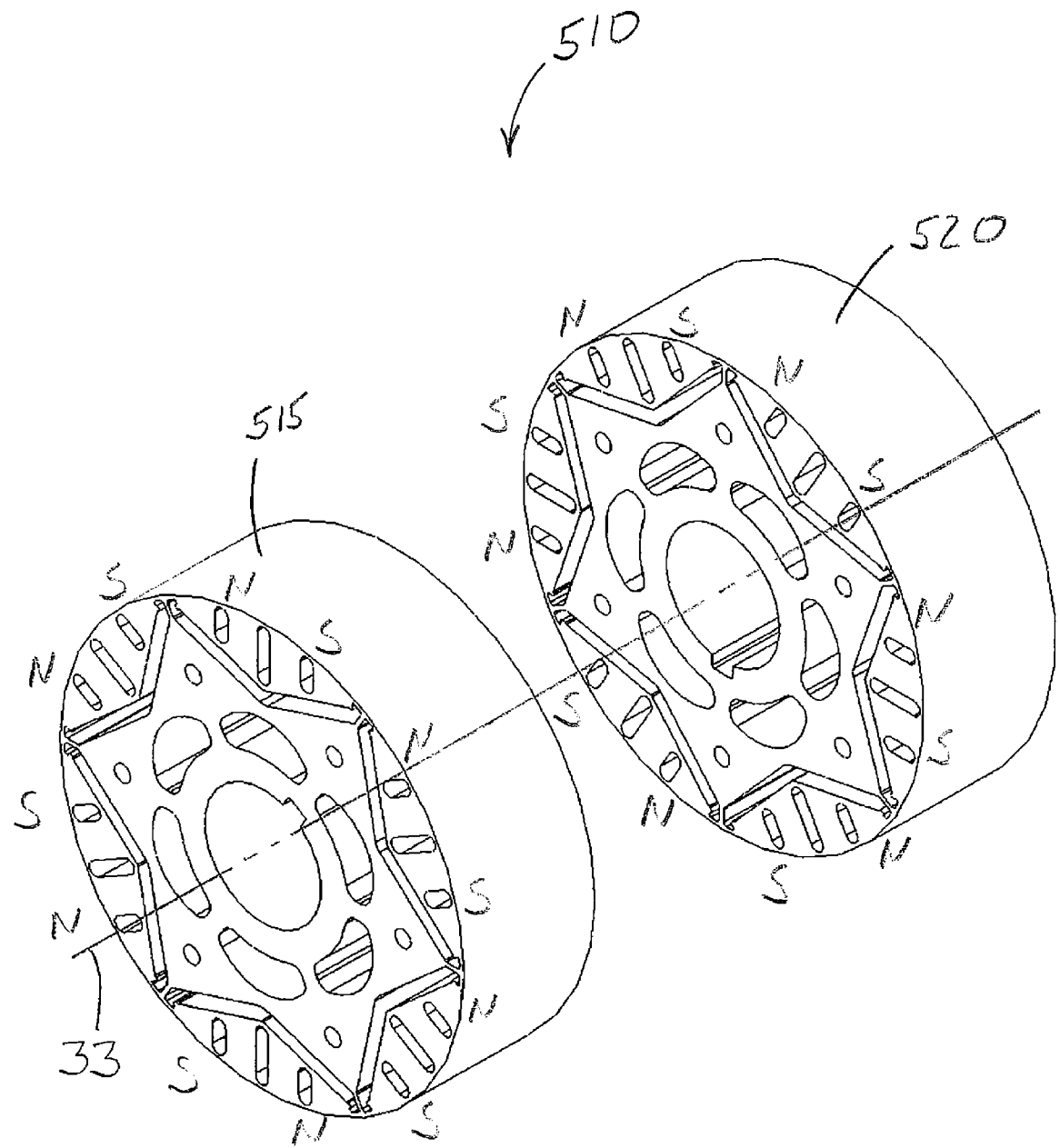
FIG. 31 is a partially exploded view of a rotor core including two core portions and the laminations of FIG. 1.

FIG. 31 illustrates a rotor core 510 that is formed from laminations 50 stacked in a stackwise direction 33 to define a first core portion 515 and a second core portion 520. The second core portion 520 is rotated one-half of a pole portion and then attached to the first core portion 515 to complete the rotor core 510. The magnetic polarity depicted in this figure for the core module 515 is the same as for the rotor core 505 of FIG. 30 and the construction of FIG. 31 can be conveniently employed to axially average or balance the configuration and the field of the North and South poles, respectively.

Figure 32:
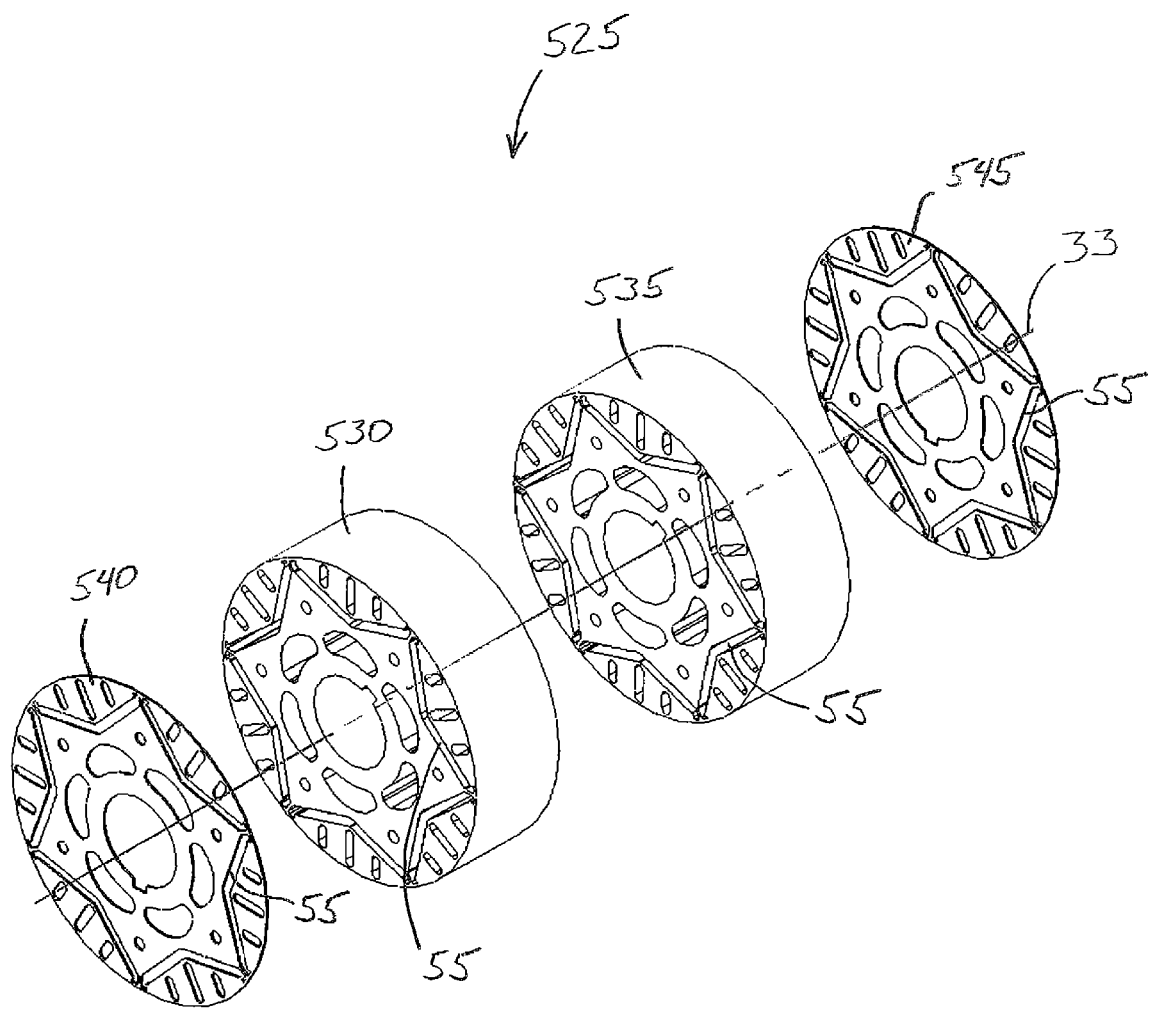
FIG. 32 is an exploded perspective view of a rotor core that includes two core portions and two end laminations positioned to retain the permanent magnets.
Figure 33:
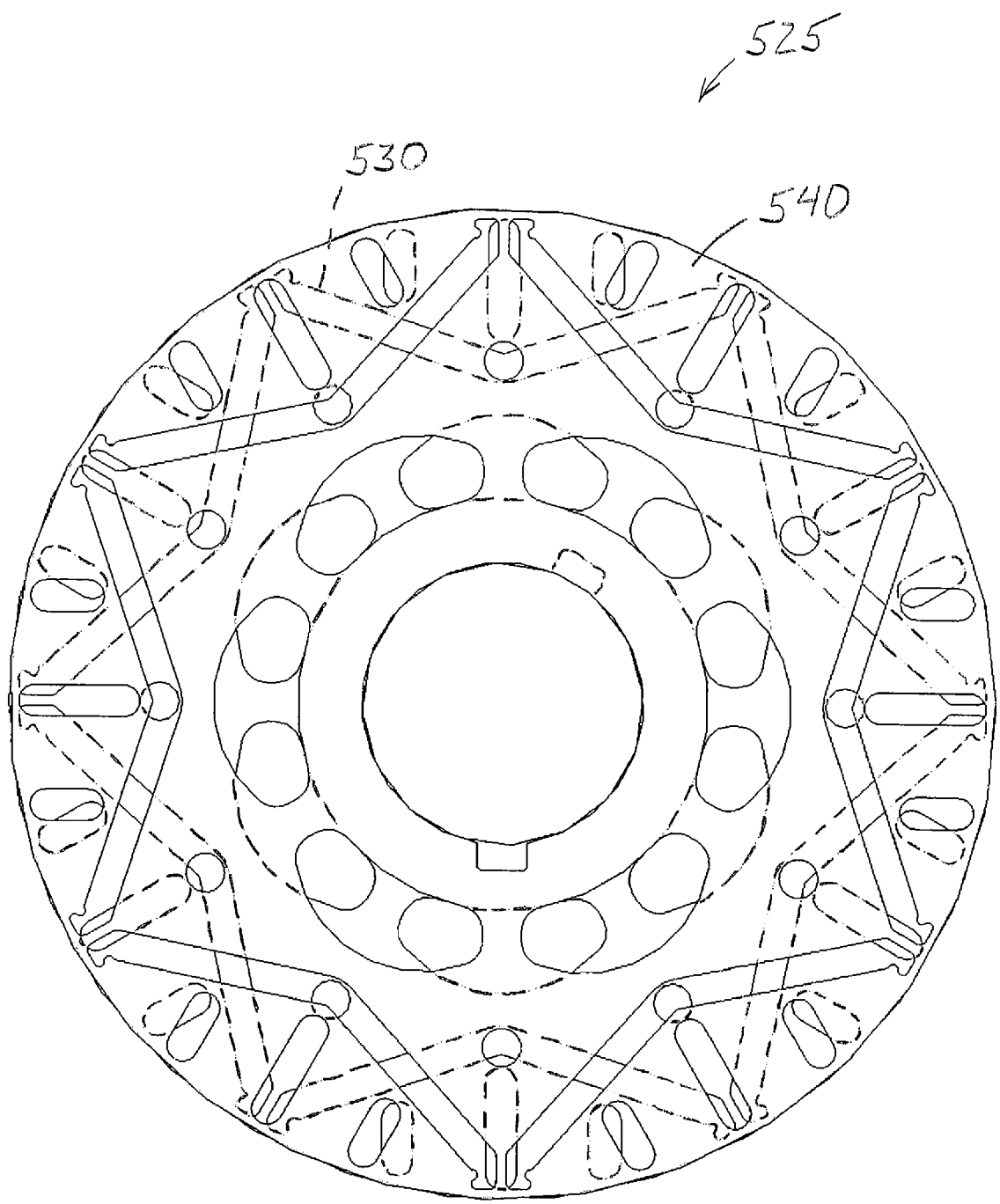
FIG. 33 is an end view of the rotor core of FIG. 32.

FIGS. 32 and 33 illustrate a rotor core 525 formed from a plurality of laminations 50 similar to those illustrated in FIG. 1. The laminations 50 are stacked in a stackwise direction 33 to define two core portions 530, 535 that are then attached to one another. As previously discussed, the laminations 50 can be aligned at the interface of the two core portions 530, 535 or could be rotated to provide some misalignment. The rotor core 525 also includes two end laminations 540, 545 that are rotated with respect to the core portions 530, 535 to which they attach. The rotated laminations 540, 545 act to retain the magnets 45 in the magnet slots 55 of the core portions 530, 535.

FIG. 33 is an end view of the assembled rotor core 525 of FIG. 32 that better illustrates the misalignment of the end lamination 540. As can be seen, the magnet slots 55 of the core portions 530 are partially covered by the end lamination 540 such that unwanted axial movement of the magnets 45 is inhibited. The configuration of the end-lamination 540, which includes substantially large apertures, is beneficial in reducing the permanent magnet axial leakage flux and improving motor output and performance.

Figure 34:
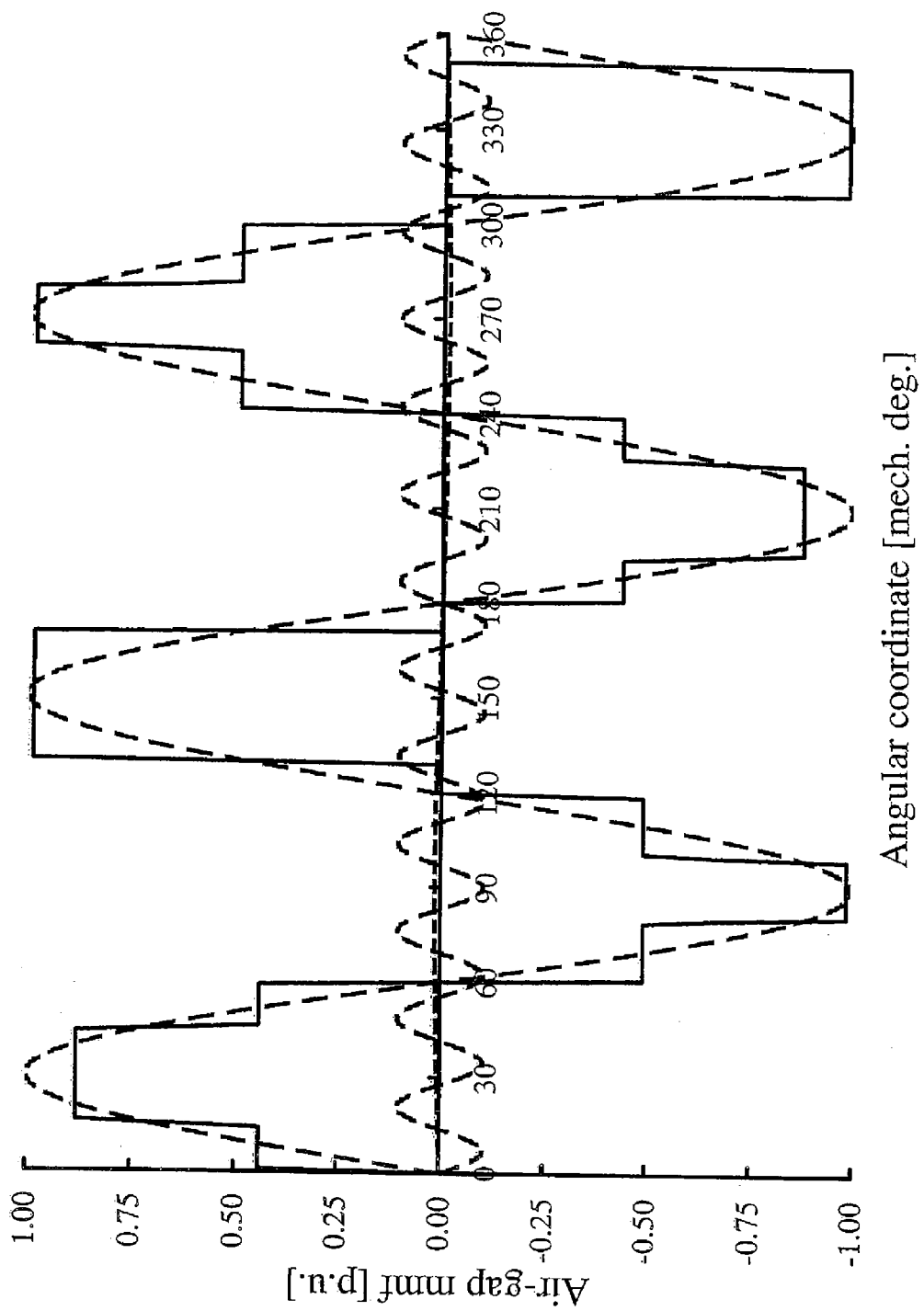
FIG. 34 is a plot of the computed air-gap mmf versus the angular coordinate for a motor including a rotor core with the laminations of FIG. 4.

FIG. 34 illustrates the computed spatial distribution of the magneto-motive force (mmf) in the air-gap of a 6-pole motor operating in open-circuit (i.e. there are no currents flowing in the stator windings and the rotor magnets are the only source of magnetic field) and having a rotor core made with the lamination shown in FIG. 4. For a motor with a circular air-gap of substantially constant width and, provided that the effect of the stator slotting and of the magnetic saturation is neglected, the air-gap mmf is also indicative of the air-gap flux density. The results shown are from a simplified magnetic field analysis based on assumptions and calculation methods known to those skilled in the art. As the permanent magnet slot extremities 60 are relatively small, their effect on the mmf distribution is neglected. Although the center pole flux barriers 210 are relatively wide, their effect is also neglected as they are invisible from the point of view of the permanent magnet main flux path (see for example FIG. 6). The inter-polar side apertures 215 are assumed to produce a "zero field" region in the air-gap portion they are facing. The other flux barriers are channeling the magnet flux and they produce step variations in the mmf distribution. The calculations are based on the relative and approximate dimensions shown in FIG. 4. Also in FIG. 4 are identified the 0 degree reference, which is placed at 12 o'clock, and the counter clockwise direction of the angular coordinate. The value of the permanent magnet flux was selected in order to provide, in a p.u. system, the unity value for the 6-pole electric fundamental wave. In light of the aforementioned, the plot of FIG. 4 is also relevant for a motor that employs the laminations of FIG. 8.

Figure 38:
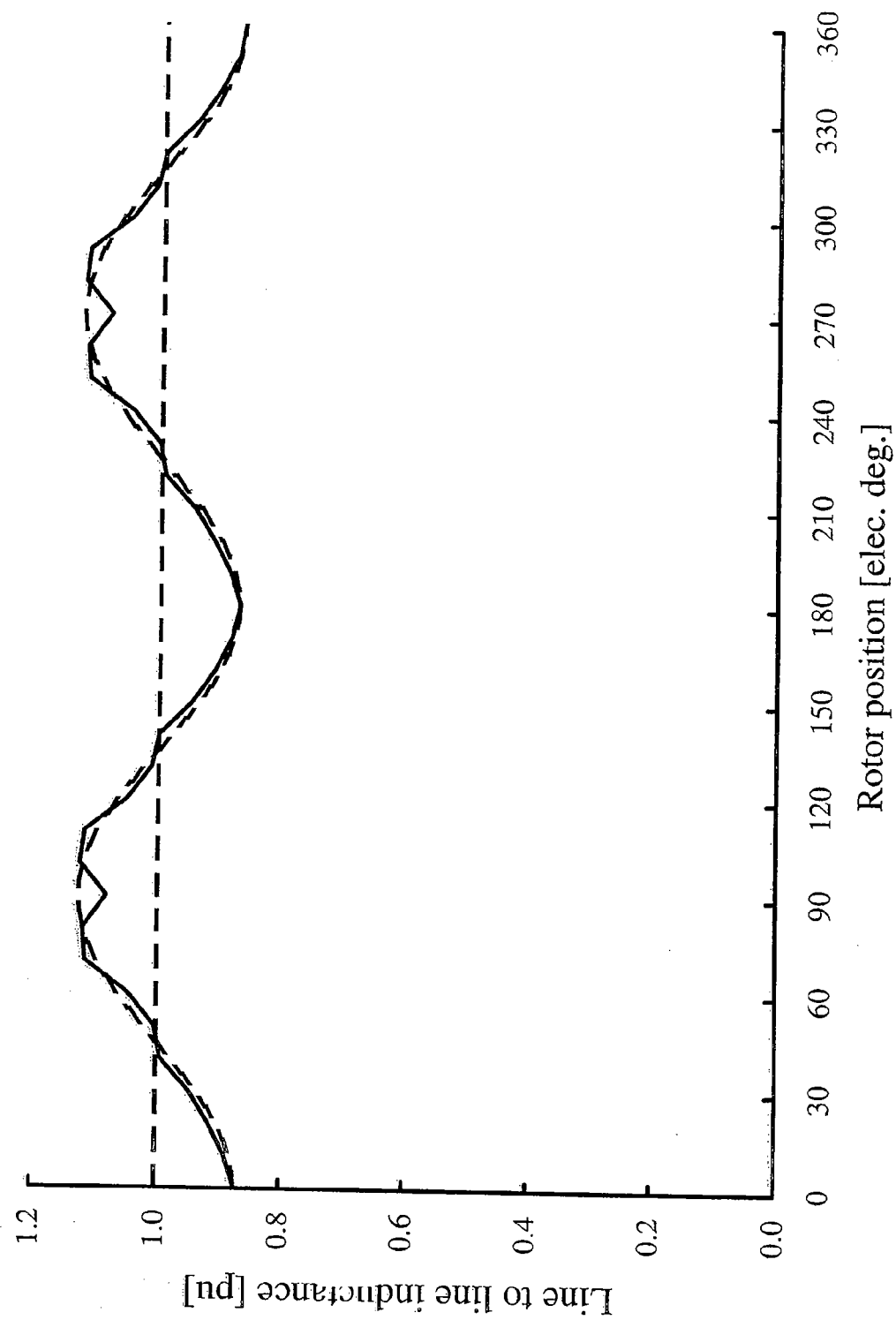
FIG. 38 is a plot of measured line-to-line inductance versus rotor position for an example motor.

In FIG. 34 the step variation of the total air-gap mmf is plotted with a continuous line and 3 example harmonics from its spectrum are plotted with dashed lines. The detailed analysis of the harmonic spectrum revealed both integral order and fractional order electrical harmonics, the later type corresponding to the mechanical harmonics having orders that are not divisible with the number of pole pairs, which is 3 in this case. The harmonic with by far the largest magnitude is the shown $3^{rd}$ order mechanical, which corresponds to the electrical fundamental wave of a 6-pole motor. Out of the first 19 mechanical harmonics the second largest, and also the only one with a magnitude higher than 0.1 p.u., is the $13^{th}$, which is also plotted in FIG. 34. The calculated mechanical fundamental harmonic, which corresponds to the electrical fundamental of a virtual 2-pole motor, is very small indeed and in the graph of FIG. 34 basically overlaps the zero-axis. The integral order electrical harmonics up to the $9^{th}$ order are smaller than 0.05 pu with the higher order harmonics, such as the $11^{th}$ and the $13^{th}$ having slightly larger magnitudes. In summary, the harmonic content of the step-waveform of FIG. 38 is rich but nevertheless the magnitude of each harmonic is relatively low, the overall result contributing to the sinusoidality of the air-gap magnetic field and the enhancement of motor performance. The use of axial modules for the rotor core, as shown for example in FIGS. 11 and 13, further reduce the harmonic content of the motor global parameters, such as the back emf and the inductance. The results of FIG. 38 are based on the relative geometrical proportions illustrated in FIG. 4. It should be noted that other configurations for the flux barriers and/or geometrical proportions can be employed in order to reduce certain harmonics, for example the $5^{th}$ and $7^{th}$, while placing less emphasis, for example, on the $3^{rd}$ harmonic and its multiples, which are anyway eliminated from the point of view of line-to-line parameters of a motor employing a stator with a balanced 3-phase wye connection.

Figure 35:
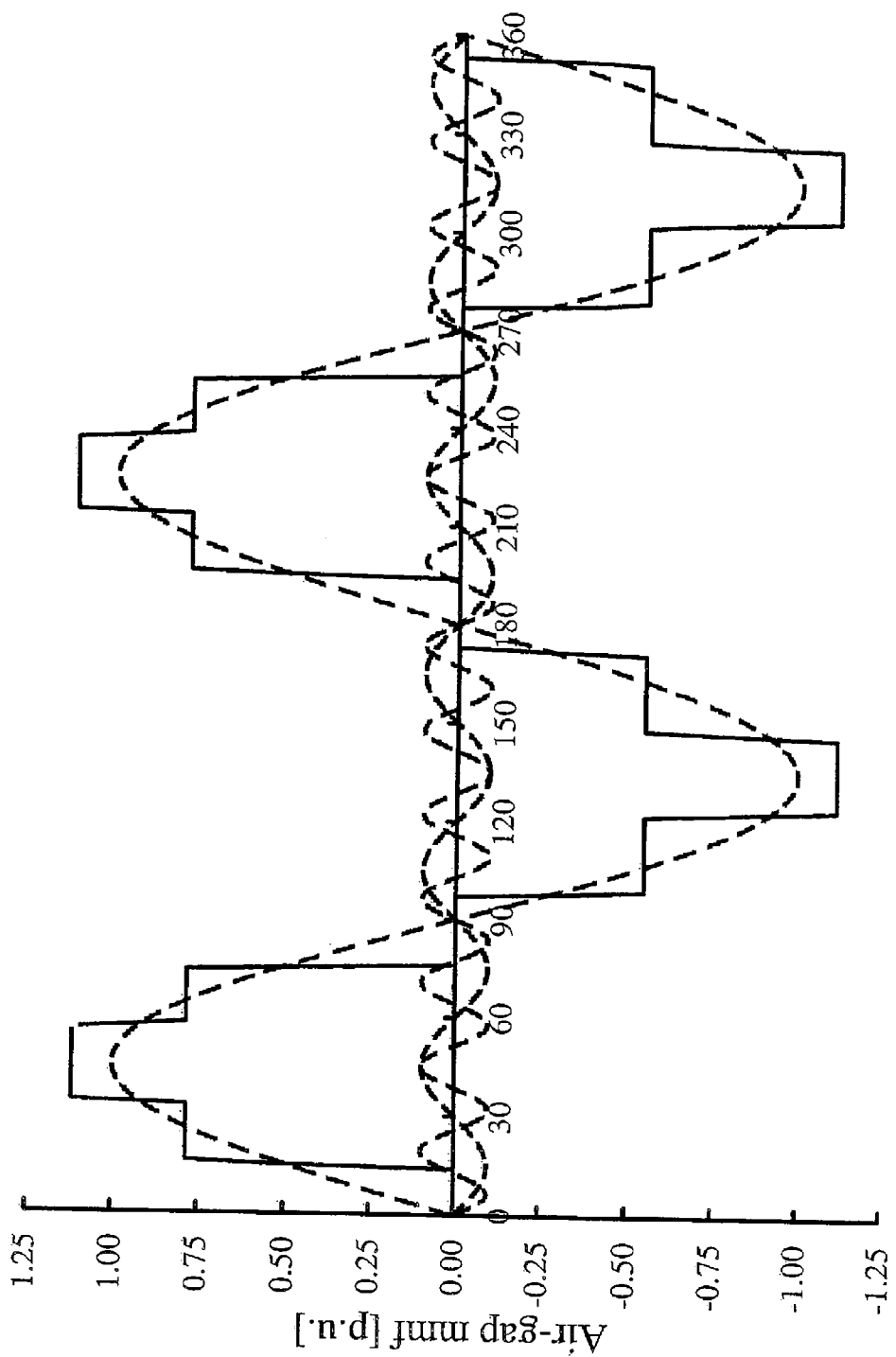
FIG. 35 is a plot of the computed air-gap mmf versus the angular coordinate for a motor including a rotor core with the laminations of FIG. 17.

FIG. 35 shows the results of a similar analysis of the air-gap mmf, this time for a 4-pole motor employing a rotor core with the lamination of FIG. 17 and the preferred geometrical proportions specified in the text in connection with FIG. 17. The 0 degree reference, which is placed halfway in between 1 and 2 o'clock, and the counter clockwise direction of the angular coordinate are also specified in FIG. 17. Because both the triangular apertures 385 and the permanent slot end portions 355 are relatively wide towards the rotor surface, their effect on the adjacent air-gap portion is modeled as a "zero field" region. In this case, the distribution of the mmf is identical under the two North poles and has a non-zero field opening, equivalent to a North pole arc opening, of approx. 60 mechanical degrees, i.e. 120 electrical degrees. The distribution of the mmf is identical under the two South poles and has a non-zero field opening, equivalent to a North pole arc opening, of approx. 75 mechanical degrees, i.e. 150 electrical degrees. In the motor cross-section, this results in an average magnetic pole opening of 135 electrical degrees, which for a 3-phase motor with 24 slots and a fully pitched distributed winding, improves motor performance and efficiency. The lamination geometry and the mmf distribution in between a North and a South pole show relatively less difference than in the case of the previous 6-pole example study. Nevertheless the effects are beneficial in improving the harmonic content and the sinusoidality of the air-gap magnetic field. Up to the $19^{th}$ order electric harmonic, only the magnitude of the $3^{rd}$ and the $7^{th}$ harmonic are greater than 0.01 pu. These harmonics are plotted in FIG. 35 with dashed lines together with the fundamental wave.

Figure 36:
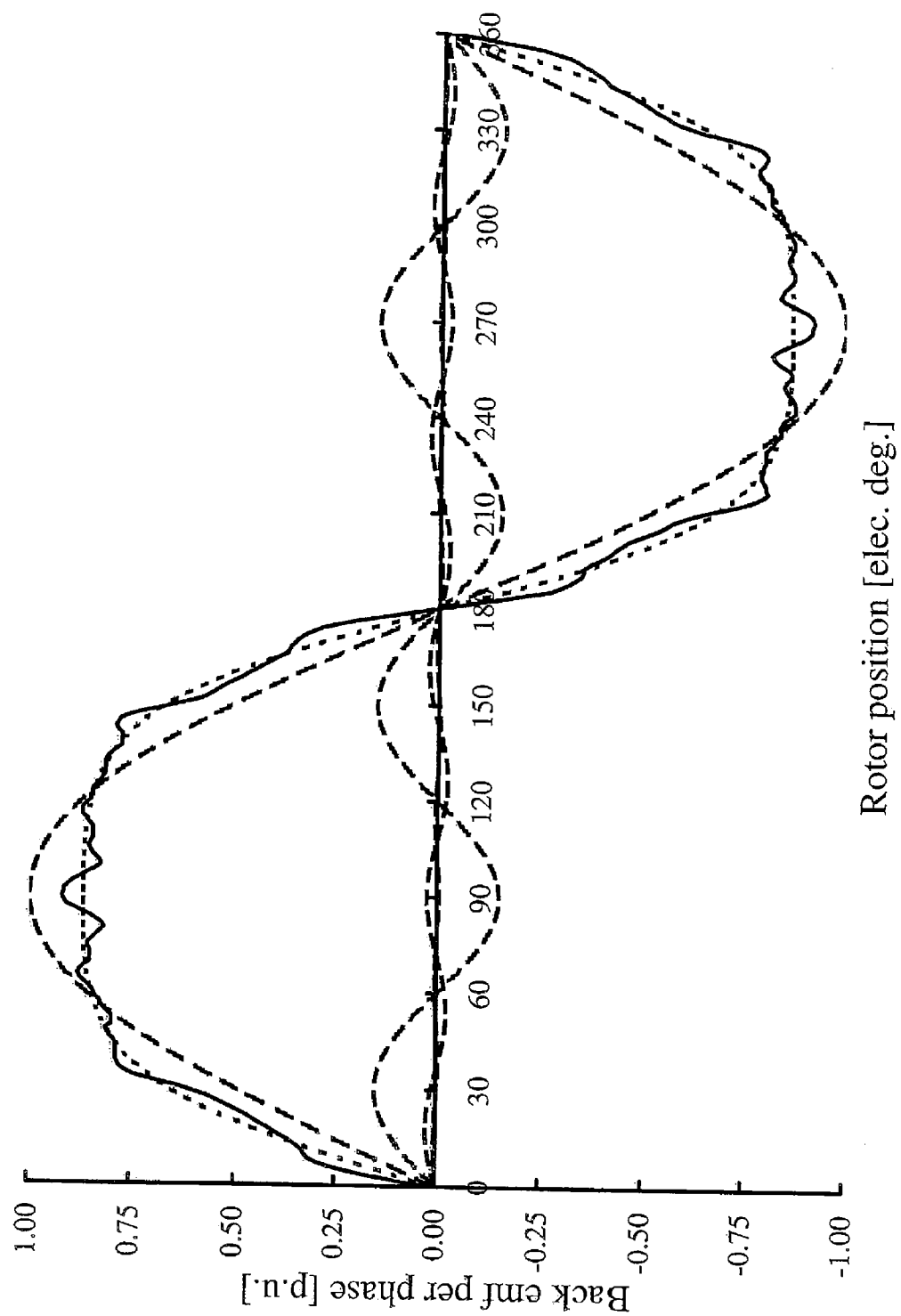
FIG. 36 is a plot of measured back emf per phase versus rotor position for an example motor.

FIG. 36 is a plot of the measured per phase back emf induced in the stator winding of a 4-pole motor with 24 equidistant stator slots and a fully pitched distributed winding. The rotor core was built with laminations as those shown in FIG. 17, which were grouped in two core modules as shown in FIG. 18. The Fourier analysis of the measured waveform, which is plotted with solid line in FIG. 36, indicates as the main components the fundamental, the $3^{rd}$, $5^{th}$ and $7^{th}$ all of which are plotted with dashed line. Their sum, plotted with a dotted line, basically makes up for the original measured waveform, with the exception of the stator slotting harmonic, which is most noticeable through a bump-peak at 90 and 270 electrical degrees. The $5^{th}$ harmonic is very small because of the small $5^{th}$ mmf harmonic as previously discussed with respect to FIG. 35. The $7^{th}$ back emf harmonic befits from a relatively low harmonic winding factor. Although the $3^{rd}$ is the largest harmonic, this is cancelled in the line-to-line back emf waveform of a balanced wye connected motor and therefore does not have a negative impact on the electronic controller, e.g. on the current regulator.

Figure 37:
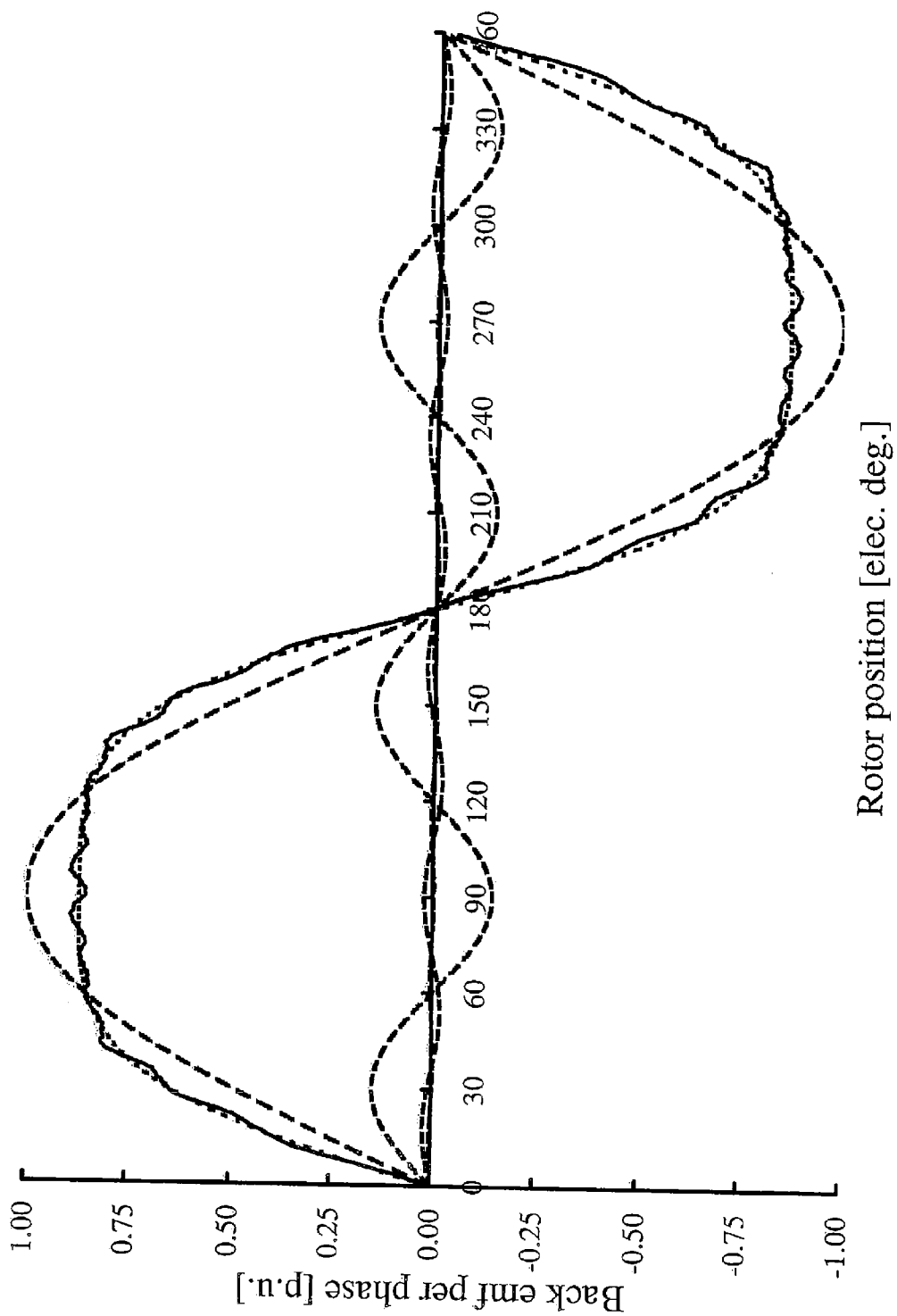
FIG. 37 is a plot of measured back emf per phase versus rotor position for another example motor.

In order to reduce the stator slotting effect from the back emf waveform of FIG. 36 the two modules of rotor core 440 and 445 of FIG. 18 were staggered skewed, i.e. axially misaligned, by an angle equal to half the slot pitch. The slot pitch in the example 24 stator slot motor is equal to 7.5 degrees. The stagger skew of half a slot pitch is equivalent to a single step approximation of a continuous skew of one slot pitch. The back emf of an example motor including the staggered rotor is shown in FIG. 37.

The stator slotting harmonics are also present in the measured waveform of the line to line inductance of the example motor with a straight non-staggered rotor core (see the solid line of FIG. 38). The staggering of the rotor core yields the dashed-line plotted smooth inductance waveform oscillating around the average value, which is also plotted with dashed line in FIG. 38. The illustrated inductance waveforms were measured at constant voltage and show a relatively small variation in between the minimum and maximum values. This is the results of the reduced saliency construction employing q-axis flux barriers. In particular, the center-pole flux barrier, which is virtually invisible from the point of view of the magnet main flux path, represents a convenient design feature for controlling the motor saliency.

The invention was described with reference to rotor laminations. It is understood that the concepts are generally applicable to other rotor components, such as axial modules made of another type of ferromagnetic material such as compacted powder steel or soft magnetic composites. The invention was described with reference with rotors that are interior to the stator. It is understood that the concepts are generally applicable also to motors having the rotor exterior to the stator, a construction typically described as an inside-out design.

It should be noted that some laminations could be arranged to include features illustrated in various figures herein but not illustrated together. Thus, a number of other arrangements are possible based on various combinations of the features described herein.

Thus, the invention provides, among other things, a new and useful rotor 20 for use in a motor 10. The rotor 20 includes internally-mounted magnets 45 and can be used, among other things, to replace a motor with permanent magnets mounted on the rotor surface and to enhance motor performance.

What is claimed is:

1. An electric machine comprising:
   a stator;
   a rotor positioned adjacent the stator and configured to rotate with respect to the stator, the rotor including
      a plurality of laminations having a circular outside diameter and stacked in a stackwise direction, each lamination including a plurality of continuous arcuate slots positioned inward of the outside diameter, each continuous arcuate slot including an inner portion spaced a first distance from the outside diameter, a first end portion disposed a second distance from the outside diameter, a second end portion disposed the second distance from the outside diameter, the second distance being smaller than the first distance, a first arcuate protrusion configured to narrow the continuous arcuate slot adjacent the first end portion, and a second arcuate protrusion configured to narrow the continuous arcuate slot adjacent the second end portion; and
      a plurality of permanent magnets, each magnet disposed in one of the continuous arcuate slots completely between the first arcuate protrusion and the second arcuate protrusion.

2. The electric machine of claim 1, wherein each of the non-linear slots includes a single continuous arcuate magnet.

3. The electric machine of claim 1, wherein each of the non-linear slots cooperates with the outside diameter to define a space, and wherein the space includes a plurality of apertures.

4. The electric machine of claim 3, wherein each space includes a central elongated aperture having a center longitudinal axis that is substantially coincident with a radial line of the lamination.

5. The electric machine of claim 4, further comprising two side elongated apertures each having a side longitudinal axis that is substantially parallel to the center longitudinal axis.

6. The electric machine of claim 4, wherein the permanent magnets each define a magnet width, and wherein each of the central aperture and side apertures defines a width, and wherein the sum of the widths of the apertures within a space is between about two and four times the magnet width.

7. The electric machine of claim 5, wherein the central aperture includes a first end approximately centered between the first end portion of the slot and the second end portion of the slot, and wherein each side elongated aperture includes a second end centered between the first end and one of the first end portion of the slot and the second end portion of the slot.

8. The electric machine of claim 5, wherein the slots cooperate with a shaft bore to define an interior space, and wherein the interior space includes a plurality of kidney-shaped apertures.

9. The electric machine of claim 8, wherein the number of kidney-shaped apertures is equal to the number of slots.

10. The electric machine of claim 3, wherein at least one space includes a central elongated aperture having a center longitudinal axis, and two side apertures each having a side longitudinal axis that is not parallel to the center longitudinal axis.

11. The electric machine of claim 10, wherein the central aperture of a first one of the spaces includes a first end approximately centered between the first end portion of the slot and the second end portion of the slot, and wherein the side apertures in the first space each include a second end centered between the first end and one of the first end portion of the slot and the second end portion of the slot, and wherein the opposite end of the side apertures is tipped toward the central aperture.

12. The electric machine of claim 11, wherein the central aperture of a second one of the spaces includes a first end approximately centered between the first end portion of the slot and the second end portion of the slot, and wherein the side apertures in the second space each include a second end positioned about two-thirds of the distance between the first end and one of the first end portion of the slot and the second end portion of the slot, and wherein the opposite end of the side apertures is tipped toward the central aperture.

13. The electric machine of claim 10, wherein the center longitudinal axis is not parallel to any radial line of the lamination that passes through the central elongated aperture and intersects the central longitudinal axis, and wherein the center longitudinal axis cooperates with the radial line to define a non-zero angle therebetween.

14. The electric machine of claim 10, wherein at least one of the central apertures includes a center longitudinal axis that is not parallel to any radial line that passes through the central aperture and intersects the center longitudinal axis such that the central aperture is tipped in a clockwise direction.

15. The electric machine of claim 14, wherein a second of the central apertures includes a center longitudinal axis that is not parallel to any radial line that passes through the central aperture and intersects the center longitudinal axis such that the central aperture is tipped in a counterclockwise direction.

16. The electric machine of claim 14, wherein the stator defines a stator slot angular pitch, and wherein the central longitudinal axis cooperates with a radial line that intersects the central longitudinal axis and the central aperture to define an angle that is equal to one of one-quarter, one-third, one-half, and two-thirds of the stator slot angular pitch.

17. The electric machine of claim 1, wherein each of the laminations defines an even number of pole portions, each pole portion including one of the slots, and wherein a first pole portion is symmetric an opposite second pole portion and is asymmetric with respect to an adjacent pole portion.

18. The electric machine of claim 1, further comprising an end lamination substantially the same as each of the plurality of laminations, the end lamination connected to the plurality of laminations and rotated a predetermined amount such that the non-linear slots of the plurality of laminations are misaligned with the non-linear slots of the end lamination such that the end lamination inhibits movement of the permanent magnets in the stackwise direction.

19. A rotor for an electric machine, the rotor comprising:
   a plurality of laminations having a plurality of apertures and stacked in a stackwise direction, each lamination defining an even number of pie-shaped pole portions, at least one pole portion including a non-linear magnet slot having a first end portion, a second end portion, a first arcuate protrusion configured to narrow the slot adjacent the first end portion, and a second arcuate protrusion configured to narrow the slot adjacent the second end, the plurality of apertures arranged such that each pole portion is symmetric to an opposite pole portion and is asymmetric with respect to an adjacent pole portion; and
   a plurality of permanent magnets, each permanent magnet disposed in one of the magnet slots of the pie-shaped pole portions such that there are no gaps between the magnets in a slot and the magnets in any one slot are not arranged linearly and are completely disposed between the first arcuate protrusion and the second arcuate protrusion.

20. The rotor of claim 19, wherein the magnet slots include two substantially linear portions that meet to define a continuous V-shaped slot.

21. The rotor of claim 19, wherein each of the magnet slots includes a single continuous arcuate slot.

22. The rotor of claim 19, wherein each of the magnet slots cooperates with an outside diameter of the lamination to define a space, and wherein the space includes at least a portion of the plurality of apertures.

23. The rotor of claim 22, wherein each space includes a central elongated aperture having a center longitudinal axis that is substantially coincident with a radial line of the lamination, and two side elongated apertures each having a side longitudinal axis that is substantially parallel to the center longitudinal axis.

24. The rotor of claim 23, wherein the central aperture includes a first end approximately centered between the first end portion of the slot and the second end portion of the slot, and wherein each side elongated aperture includes a second end centered between the first end and one of the first end portion of the slot and the second end portion of the slot.

25. The rotor of claim 23, wherein the slots cooperate with a shaft bore to define an interior space, and wherein the interior space includes a plurality of kidney-shaped apertures.

26. The rotor of claim 25, wherein the number of kidney-shaped apertures is equal to the number of slots.

27. The rotor of claim 22, wherein at least one space includes a central elongated aperture having a center longitudinal axis, and two side apertures each having a side longitudinal axis that is not parallel to the center longitudinal axis.

28. The rotor of claim 27, wherein the central aperture of a first one of the spaces includes a first end approximately centered between the first end portion of the slot and the second end portion of the slot, and wherein the side apertures in the first space each include a second end centered between the first end and one of the first end portion of the slot and the second end portion of the slot, and wherein the opposite end of the side apertures is tipped toward the central aperture.

29. The rotor of claim 28, wherein the central aperture of a second one of the spaces includes a first end approximately centered between the first end portion of the slot and the second end portion of the slot, and wherein the side apertures in the second space each include a second end positioned about two-thirds of the distance between the first end and one of the first end portion of the slot and the second end portion of the slot, and wherein the opposite end of the side apertures is tipped toward the central aperture.

30. The rotor of claim 27, wherein the center longitudinal axis is not parallel to any radial line of the lamination that passes through the central elongated aperture and intersects the central longitudinal axis, and wherein the center longitudinal axis cooperates with the radial line to define a non-zero angle therebetween.

31. The rotor of claim 27, wherein at least one of the central apertures includes a center longitudinal axis that is not parallel to any radial line that passes through the central aperture and intersects the center longitudinal axis such that the central aperture is tipped in a clockwise direction.

32. The rotor of claim 31, wherein a second of the central apertures includes a center longitudinal axis that is not parallel to any radial line that passes through the central aperture and intersects the center longitudinal axis such that the central aperture is tipped in a counterclockwise direction.

33. A rotor for an electric machine, the rotor comprising:

a first core portion formed from a first plurality of first laminations stacked in a stackwise direction, each first lamination defining an even number of pie-shaped pole portions that each include a magnet slot having a first end portion, a second end portion, a first arcuate protrusion adjacent the first end portion, and a second arcuate protrusion adjacent the second end portion, the magnet slot configured to receive a magnet disposed completely between the first arcuate protrusion and the second arcuate protrusion, a first of the pie-shaped pole portions being different than an adjacent second pie-shaped pole portion; and a second core portion formed from a second plurality of first laminations stacked in a stackwise direction, the second core portion connected to the first core portion such that the second pie-shaped pole portions of the second core portion are aligned in the stackwise direction with the first pie-shaped pole portions of the first core portion.

34. The rotor of claim 33, wherein the magnet slots include two substantially linear portions that meet to define a continuous V-shaped slot.

35. The rotor of claim 33, wherein each of the magnet slots includes a single continuous arcuate slot.

36. The rotor of claim 33, wherein each of the magnet slots cooperates with an outside diameter of the lamination to define a space, and wherein each space includes at least one aperture.

37. The rotor of claim 36, wherein each space includes a central elongated aperture having a center longitudinal axis that is substantially coincident with a radial line of the lamination, and two side elongated apertures each having a side longitudinal axis that is substantially parallel to the center longitudinal axis.

38. The rotor of claim 37, wherein the central aperture includes a first end approximately centered between the first end portion of the slot and the second end portion of the slot, and wherein each side elongated aperture includes a second end centered between the first end and one of the first end portion of the slot and the second end portion of the slot.

39. The rotor of claim 37, wherein the slots cooperate with a shaft bore to define an interior space, and wherein the interior space includes a plurality of kidney-shaped apertures.

40. The rotor of claim 39, wherein the number of kidney-shaped apertures is equal to the number of slots.

41. The rotor of claim 36, wherein at least one space includes a central elongated aperture having a center longitudinal axis, and two side apertures each having a side longitudinal axis that is not parallel to the center longitudinal axis.

42. The rotor of claim 41, wherein the central aperture of a first one of the spaces includes a first end approximately centered between the first end portion of the slot and the second end portion of the slot, and wherein the side apertures in the first space each include a second end centered between the first end and one of the first end portion of the slot and the second end portion of the slot, and wherein the opposite end of the side apertures is tipped toward the central aperture.

43. The rotor of claim 42, wherein the central aperture of a second one of the spaces includes a first end approximately centered between the first end portion of the slot and the second end portion of the slot, and wherein the side apertures in the second space each include a second end positioned about two-thirds of the distance between the first end and one of the first end portion of the slot and the second end portion of the slot, and wherein the opposite end of the side apertures is tipped toward the central aperture.

44. The rotor of claim 41, wherein the center longitudinal axis is not parallel to any radial line of the lamination that passes through the central elongated aperture and intersects the central longitudinal axis, and wherein the center longitudinal axis cooperates with the radial line to define a non-zero angle therebetween.

45. The rotor of claim 41, wherein at least one of the central apertures includes a center longitudinal axis that is not parallel to any radial line that passes through the central aperture and intersects the center longitudinal axis such that the central aperture is tipped in a clockwise direction.

46. The rotor of claim 45, wherein a second of the central apertures includes a center longitudinal axis that is not parallel to any radial line that passes through the central aperture and intersects the center longitudinal axis such that the central aperture is tipped in a counterclockwise direction.

47. A rotor for an electric machine, the rotor comprising:
a first core portion formed from a first plurality of first laminations, each first lamination having a first substantially planar side, a second substantially planar side, a plurality of magnet slots having a first end portion, a second end portion, a first arcuate protrusion adjacent the first end portion, a second arcuate protrusion adjacent the second end portion, the magnet slots configured to receive a magnet disposed completely between the first arcuate protrusion and the second arcuate protrusion, and a plurality of apertures, the first laminations stacked in a stackwise direction such that the first substantially planar surface faces in a first direction; and
a second core portion formed from a second plurality of first laminations stacked in a stackwise direction such that the second substantially planar sides of the second plurality of first laminations faces in the first direction, the second core portion connected to the first core portion such that the slots are substantially aligned and substantially all of the plurality of apertures are misaligned.

48. The rotor of claim 47, wherein the magnet slots include two substantially linear portions that meet to define a continuous V-shaped slot.

49. The rotor of claim 47, wherein each of the magnet slots includes a single continuous arcuate slot.

50. The rotor of claim 47, wherein each of the magnet slots cooperates with an outside diameter of the lamination to define a space, and wherein each space includes at least one aperture.

51. The rotor of claim 50, wherein each space includes a central elongated aperture having a center longitudinal axis that is substantially coincident with a radial line of the lamination, and two side elongated apertures each having a side longitudinal axis that is substantially parallel to the center longitudinal axis.

52. The rotor of claim 51, wherein the central aperture includes a first end approximately centered between the first end portion of the slot and the second end portion of the slot, and wherein each side elongated aperture includes a second end centered between the first end and one of the first end portion of the slot and the second end portion of the slot.

53. The rotor of claim 51, wherein the slots cooperate with a shaft bore to define an interior space, and wherein the interior space includes a plurality of kidney-shaped apertures.

54. The rotor of claim 53, wherein the number of kidney-shaped apertures is equal to the number of slots.

55. The rotor of claim 50, wherein at least one space includes a central elongated aperture having a center longitudinal axis, and two side apertures each having a side longitudinal axis that is not parallel to the center longitudinal axis.

56. The rotor of claim 55, wherein the central aperture of a first one of the spaces includes a first end approximately centered between the first end portion of the slot and the second end portion of the slot, and wherein the side apertures in the first space each include a second end centered between the first end and one of the first end portion of the slot and the second end portion of the slot, and wherein the opposite end of the side apertures is tipped toward the central aperture.

57. The rotor of claim 56, wherein the central aperture of a second one of the spaces includes a first end approximately centered between the first end portion of the slot and the second end portion of the slot, and wherein the side apertures in the second space each include a second end positioned about two-thirds of the distance between the first end and one of the first end portion of the slot and the second end portion of the slot, and wherein the opposite end of the side apertures is tipped toward the central aperture.

58. The rotor of claim 55, wherein the center longitudinal axis is not parallel to any radial line of the lamination that passes through the central elongated aperture and intersects the central longitudinal axis, and wherein the center longitudinal axis cooperates with the radial line to define a non-zero angle therebetween.

59. The rotor of claim 55, wherein at least one of the central apertures includes a center longitudinal axis that is not parallel to any radial line that passes through the central aperture and intersects the center longitudinal axis such that the central aperture is tipped in a clockwise direction.

60. The rotor of claim 59, wherein a second of the central apertures includes a center longitudinal axis that is not parallel to any radial line that passes through the central aperture and intersects the center longitudinal axis such that the central aperture is tipped in a counterclockwise direction.

61. A rotor for an electric machine, the rotor comprising:
a plurality of rotor laminations each having an outer surface and stacked in a stackwise direction, each lamination including a first pole portion that includes a first slot that cooperates with the outer surface to define a first space, the first space defining a first central aperture and a first side aperture, the first slot having a first end portion, a second end portion, a first arcuate protrusion adjacent the first end portion, and a second arcuate protrusion adjacent the second end portion, the first slot configured to receive a magnet disposed completely between the first arcuate protrusion and the second arcuate protrusion, and a second pole portion different from the first pole portion and including a second slot that cooperates with the outer surface to define a second space, the second space defining a second central aperture and a second side aperture, wherein the first side aperture is spaced a first distance from the first central aperture and the second side aperture is spaced a second distance from the second central aperture, the first distance being different than the second distance, the first aperture and the second aperture being the only side apertures on their respective sides of the first central aperture and the second central aperture within the first space and the second space.

62. The rotor of claim 61, wherein the first pole portion defines a first pole width that extends between a first pole end and a second pole end, and the first central aperture is positioned in the center of the first pole width, and wherein the second pole portion defines a second pole width that extends between a third pole end and a fourth pole end, and the second central aperture is positioned in the center of the second pole width.

63. The rotor of claim 62, wherein the first side aperture includes a first side end and the second side aperture includes a second side end, and wherein the first side end is positioned about one-half the distance between the first central aperture and the first pole end, and the second side end is positioned about one-third of the distance from the second central aperture to the third pole end.

64. The rotor of claim 63, wherein the first side aperture includes a third side end and the second side aperture includes a fourth side end, and wherein the third side end is positioned about two-thirds the distance between the first central aperture and the first pole end, and the fourth side end is positioned about one-half of the distance from the second central aperture to the third pole end.

65. The rotor of claim 62, wherein the first side aperture includes a first side end and a second side end opposite the first side end, and wherein the first side end is positioned about 27.5 percent of the way from the central aperture to the first end, and the second side end is positioned about 50 percent of the way from the central aperture to the first end.

* * * * *